US009102057B2

(12) United States Patent
Fudaba et al.

(10) Patent No.: US 9,102,057 B2
(45) Date of Patent: Aug. 11, 2015

(54) ARM CONTROL APPARATUS, ARM CONTROL METHOD, ARM CONTROL PROGRAM, ROBOT, AND INTEGRATED ELECTRONIC CIRCUIT FOR ARM CONTROL

(71) Applicant: Panasonic Corporation, Osaka (JP)

(72) Inventors: Yudai Fudaba, Osaka (JP); Yuko Tsusaka, Osaka (JP); Jun Ozawa, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/446,945

(22) Filed: Jul. 30, 2014

(65) Prior Publication Data

US 2014/0343729 A1    Nov. 20, 2014

Related U.S. Application Data

(63) Continuation of application No. PCT/JP2013/006803, filed on Nov. 20, 2013.

(30) Foreign Application Priority Data

Nov. 22, 2012    (JP) .................................. 2012-256518

(51) Int. Cl.
| | |
|---|---|
| *G05B 15/00* | (2006.01) |
| *B25J 9/00* | (2006.01) |
| *B25J 9/16* | (2006.01) |
| *B25J 13/00* | (2006.01) |
| *G06F 3/041* | (2006.01) |

(52) U.S. Cl.
CPC ................ *B25J 9/1633* (2013.01); *B25J 13/00* (2013.01); *G06F 3/041* (2013.01); *Y10S 901/09* (2013.01)

(58) Field of Classification Search
USPC .............. 700/261, 260, 262, 245; 901/46, 14; 248/309.1
See application file for complete search history.

(56) References Cited

U.S. PATENT DOCUMENTS

| 6,155,993 A | * | 12/2000 | Scott ............................. 600/595 |
| 6,428,172 B1 | * | 8/2002 | Hutzel et al. .................. 359/838 |

(Continued)

FOREIGN PATENT DOCUMENTS

| JP | 9-196055 | 7/1997 |
| JP | 9-267281 | 10/1997 |

(Continued)

OTHER PUBLICATIONS

International Search Report issued Dec. 24, 2013 in International (PCT) Application No. PCT/JP2013/006803.

*Primary Examiner* — Ronnie Mancho
(74) *Attorney, Agent, or Firm* — Wenderoth, Lind & Ponack, L.L.P.

(57) ABSTRACT

In a touch panel display with an arm, a torque calculating unit calculates a torque to be loaded on a touch panel display based on a position acquired by a touch position information acquiring unit and a force acquired by a touch force information acquiring unit, and a stiffness parameter information generating unit generates information about a stiffness parameter for controlling an arm so that the position and the orientation of the touch panel display do not change based on the calculated torque. An arm control unit controls the arm based on the generated information about the stiffness parameter.

18 Claims, 70 Drawing Sheets

(56) References Cited

U.S. PATENT DOCUMENTS

| | | |
|---|---|---|
| 7,191,191 B2 * | 3/2007 | Peurach et al. ........................ 1/1 |
| 9,038,971 B1 * | 5/2015 | Guthrie ........................ 248/121 |
| 2002/0003571 A1 * | 1/2002 | Schofield et al. ............. 348/148 |
| 2002/0149571 A1 * | 10/2002 | Roberts ........................ 345/174 |
| 2004/0108995 A1 | 6/2004 | Hoshino et al. |
| 2005/0045409 A1 * | 3/2005 | Fenelli et al. ................. 180/326 |
| 2012/0072025 A1 | 3/2012 | Takagi et al. |
| 2013/0107136 A1 * | 5/2013 | Tamura et al. ................. 348/836 |
| 2013/0172906 A1 * | 7/2013 | Olson et al. ................... 606/130 |
| 2013/0258212 A1 * | 10/2013 | Ooe et al. ...................... 348/836 |

FOREIGN PATENT DOCUMENTS

| | | |
|---|---|---|
| JP | 2000-162976 | 6/2000 |
| JP | 2004-29645 | 1/2004 |
| JP | 2004-86733 | 3/2004 |
| JP | 2008-9632 | 1/2008 |
| JP | 2010-128195 | 6/2010 |
| JP | 2012-86354 | 5/2012 |

* cited by examiner

Fig.2

| TIME (ms) | POSITION (mm) (x, y, z) | ORIENTATION (rad) (rx, ry, rz) | VELOCITY(mm/ms) (vx, vy, vz) | ANGULAR VELOCITY(rad/ms) (ωx, ωy, ωz) |
|---|---|---|---|---|
| . . . | . . . | . . . | . . . | . . . |
| 1821 | 112.2, 65.5, -8.5 | 0.07, -0.87, 1.22 | 0.11, -0.21, 0.38 | 0.015, -0.012, 0.010 |
| 1822 | 113.1, 64.8, -8.5 | 0.06, -0.85, 1.27 | 0.95, -0.73, 0.00 | -0.018, 0.022, 0.059 |
| 1823 | 113.5, 64.0, -8.0 | 0.05, -0.82, 1.28 | 0.42, -0.82, 0.50 | -0.010, 0.026, 0.017 |
| . . . | . . . | . . . | . . . | . . . |

Fig.6

| TIME(ms) | POSITION (x, y) | | | | | | |
|---|---|---|---|---|---|---|---|
| | ... | (0, -2) | (0, -1) | (0, 0) | (0, 1) | (0, 2) | ... |
| ... | .. .. | .. .. | .. .. | .. .. | .. .. | .. .. | .. .. |
| 2443 | .. .. | 0 | 0 | 0 | 0 | 0 | .. .. |
| 2444 | .. .. | 0 | 0 | 0 | 1 | 0 | .. .. |
| 2445 | .. .. | 0 | 0 | 1 | 1 | 1 | .. .. |
| 2446 | .. .. | 0 | 0 | 0 | 0 | 1 | .. .. |
| 2447 | .. .. | 0 | 0 | 0 | 0 | 0 | .. .. |
| ... | .. .. | .. .. | .. .. | .. .. | .. .. | .. .. | .. .. |

*Fig.8*

| TIME(ms) | | FORCE (Fx(N), Fy(N), Fz(N)) | | | |
|---|---|---|---|---|---|
| | | POSITION(x, y) (0, 0) | POSITION(x, y) (0, 1) | POSITION(x, y) (0, 2) | ...... |
| ...... | ...... | ...... | ...... | ...... | ...... |
| 5121 | ...... | (0.0, 0.0, 0.0) | (0.0, 0.0, 0.0) | (0.0, 0.0, 0.0) | ...... |
| 5122 | ...... | (0.0, 0.0, 0.0) | (0.0, 0.0, 0.8) | (0.0, 0.0, 0.0) | ...... |
| 5123 | ...... | (0.0, 0.0, 0.0) | (0.0, 0.0, 0.3) | (0.1, 0.0, 0.6) | ...... |
| 5124 | ...... | (0.0, 0.0, 0.0) | (0.0, 0.0, 0.0) | (0.0, 0.0, 0.2) | ...... |
| 5125 | ...... | (0.0, 0.0, 0.0) | (0.0, 0.0, 0.0) | (0.0, 0.0, 0.0) | ...... |
| ...... | ...... | ...... | ...... | ...... | ...... |

Fig.11C

| TIME(ms) | ... | (−180, −151) | (−180, −151) | (−180, −149) | ... | (0, 0) | ... |
|---|---|---|---|---|---|---|---|
| ... | ... | ... | ... | ... | ... | ... | ... |
| 333 | ... | 0 | 1 | 0 | ... | 0 | ... |
| 334 | ... | 0 | 1 | 0 | ... | 0 | ... |
| 335 | ... | 0 | 1 | 0 | ... | 0 | ... |
| 336 | ... | 0 | 1 | 0 | ... | 0 | ... |
| 337 | ... | 0 | 1 | 0 | ... | 0 | ... |
| ... | ... | ... | ... | ... | ... | ... | ... |

POSITION (x, y)

*Fig. 11D*

| TIME(ms) | | FORCE (Fx(N), Fy(N), Fz(N)) | | |
|---|---|---|---|---|
| | | POSITION(x, y) (−180, −150) | | POSITION(x, y) (0, 0) |
| ...... | ...... | ...... | ...... | ...... |
| ... .. | ... .. | ... .. | ... .. | ... .. |
| 333 | ... .. | (0.0, 0.0, +1.0) | ... .. | (0.0, 0.0, 0.0) |
| 334 | ... .. | (0.0, 0.0, +1.0) | ... .. | (0.0, 0.0, 0.0) |
| 335 | ... .. | (0.0, 0.0, +1.0) | ... .. | (0.0, 0.0, 0.0) |
| 336 | ... .. | (0.0, 0.0, +1.0) | ... .. | (0.0, 0.0, 0.0) |
| 337 | ... .. | ... .. | ... .. | (0.0, 0.0, 0.0) |
| ... .. | ... .. | ... .. | ... .. | ... .. |

Fig.11E

| TIME(ms) | COEFFCIENT OF STIFFNESS OF FORCE(N/mm) | | | | | | TORQUE(Nmm/mm) | | | | | |
|---|---|---|---|---|---|---|---|---|---|---|---|---|
| | +x | -x | +y | -y | +z | -z | +rx | -rx | +ry | -ry | +rz | -rz |
| .. .. | .. .. | .. .. | .. .. | .. .. | .. .. | .. .. | .. .. | .. .. | .. .. | .. .. | .. .. | .. .. |
| 333 | 0.05 | 0.05 | 0.05 | 0.05 | 0.4 | 0.05 | 60 | 5 | 5 | 72 | 5 | 5 |
| 334 | 0.05 | 0.05 | 0.05 | 0.05 | 0.4 | 0.05 | 60 | 5 | 5 | 72 | 5 | 5 |
| 335 | 0.05 | 0.05 | 0.05 | 0.05 | 0.4 | 0.05 | 60 | 5 | 5 | 72 | 5 | 5 |
| 336 | 0.05 | 0.05 | 0.05 | 0.05 | 0.4 | 0.05 | 60 | 5 | 5 | 72 | 5 | 5 |
| 337 | 0.05 | 0.05 | 0.05 | 0.05 | 0.4 | 0.05 | 60 | 5 | 5 | 72 | 5 | 5 |
| .. .. | .. .. | .. .. | .. .. | .. .. | .. .. | .. .. | .. .. | .. .. | .. .. | .. .. | .. .. | .. .. |

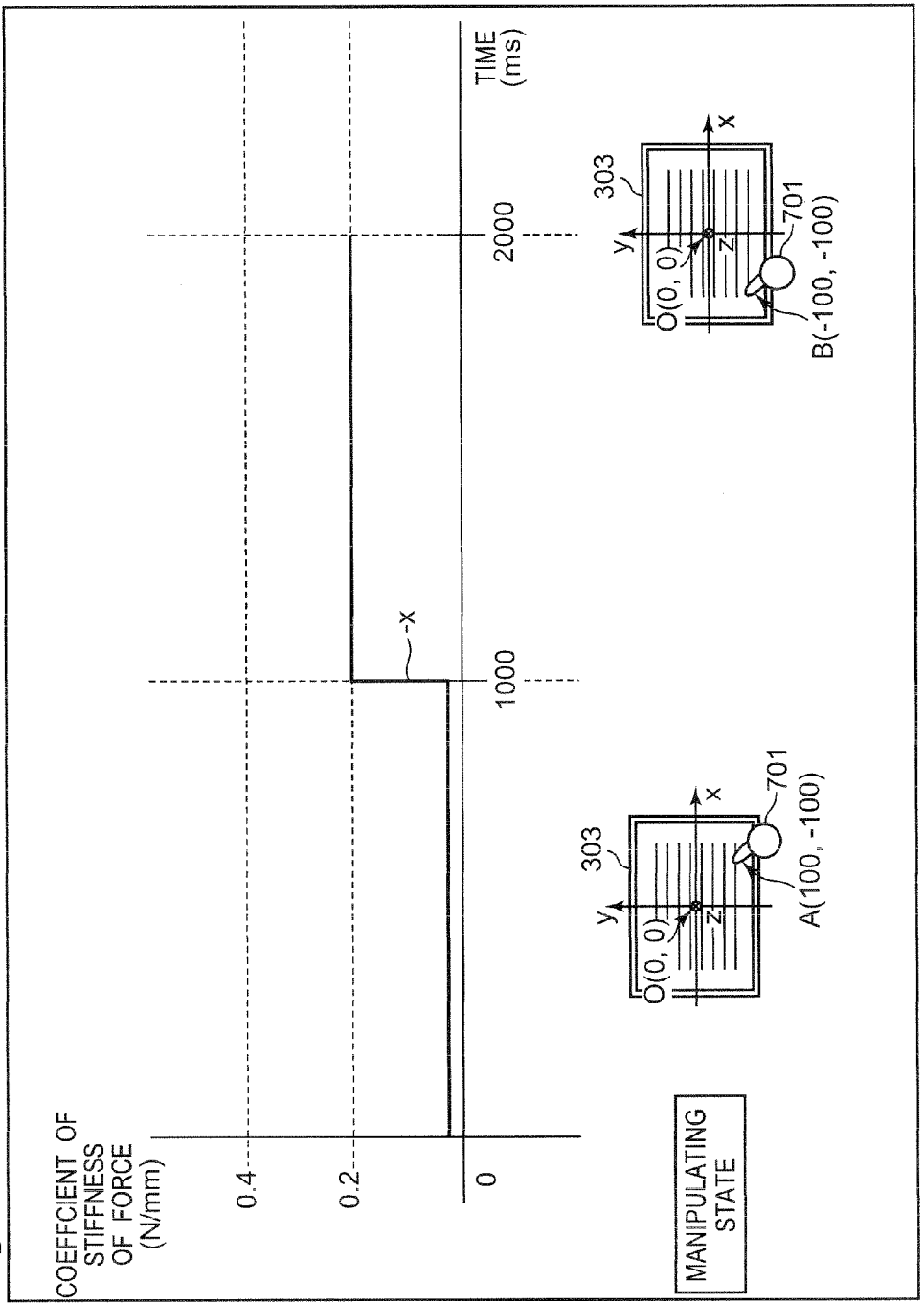

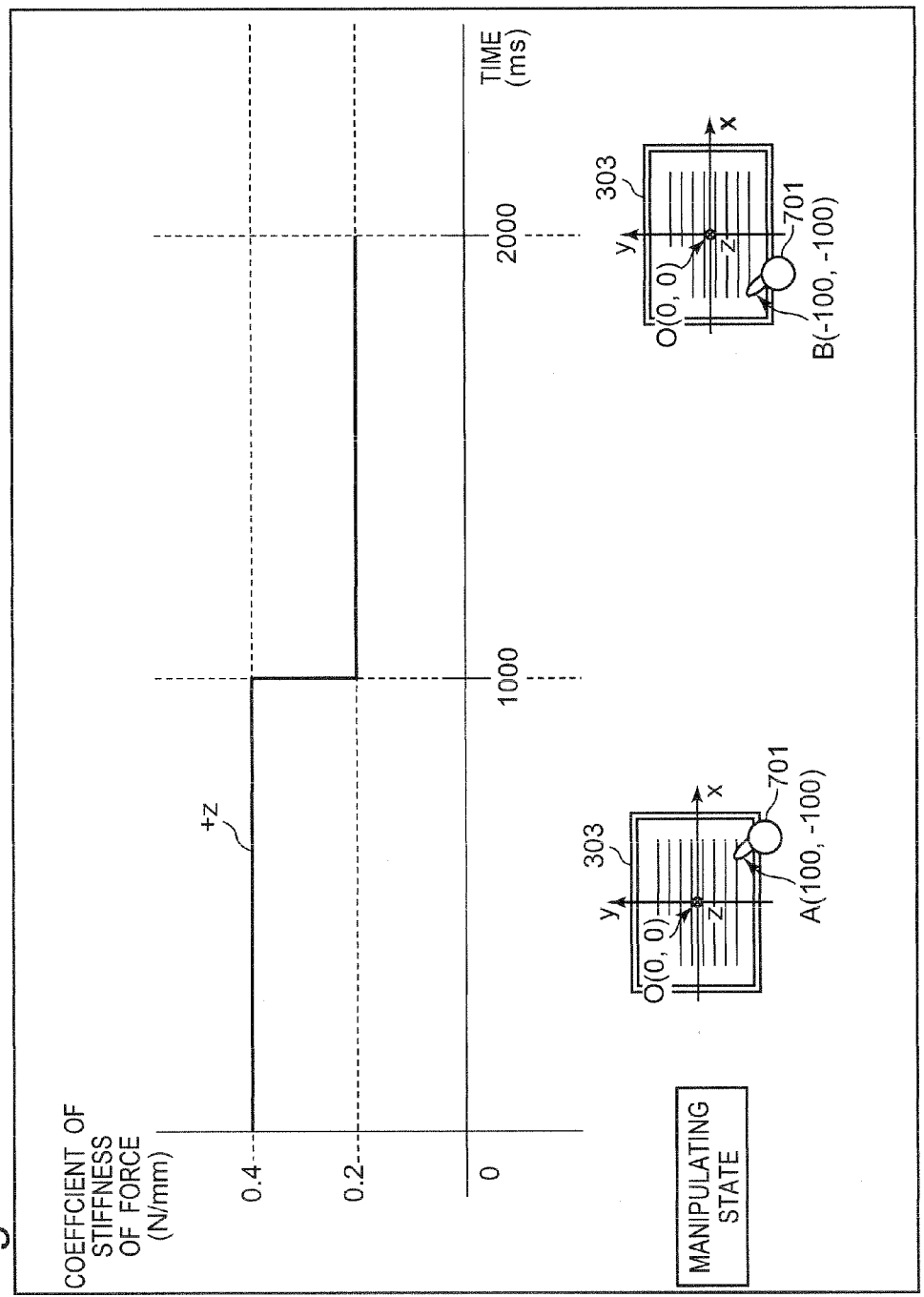

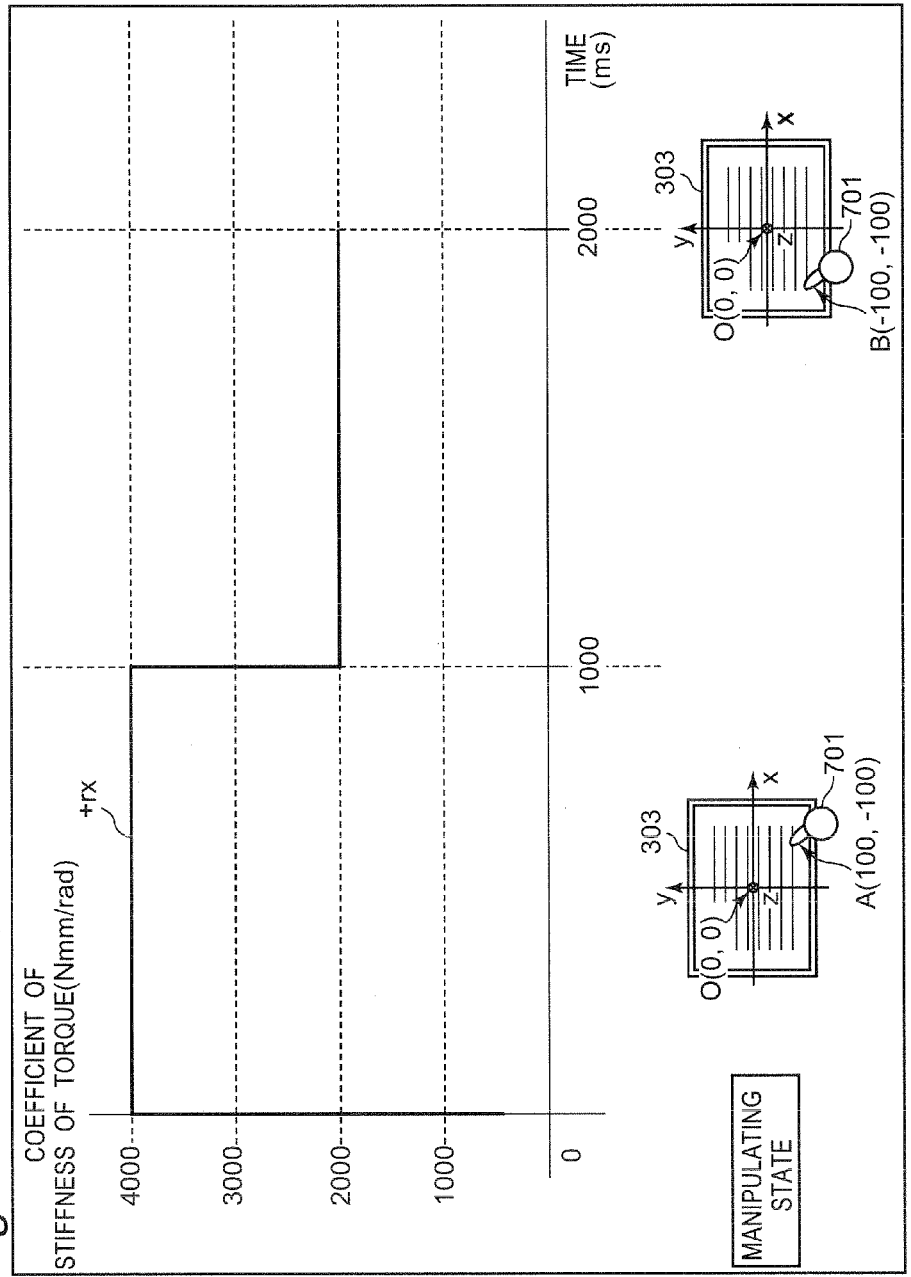

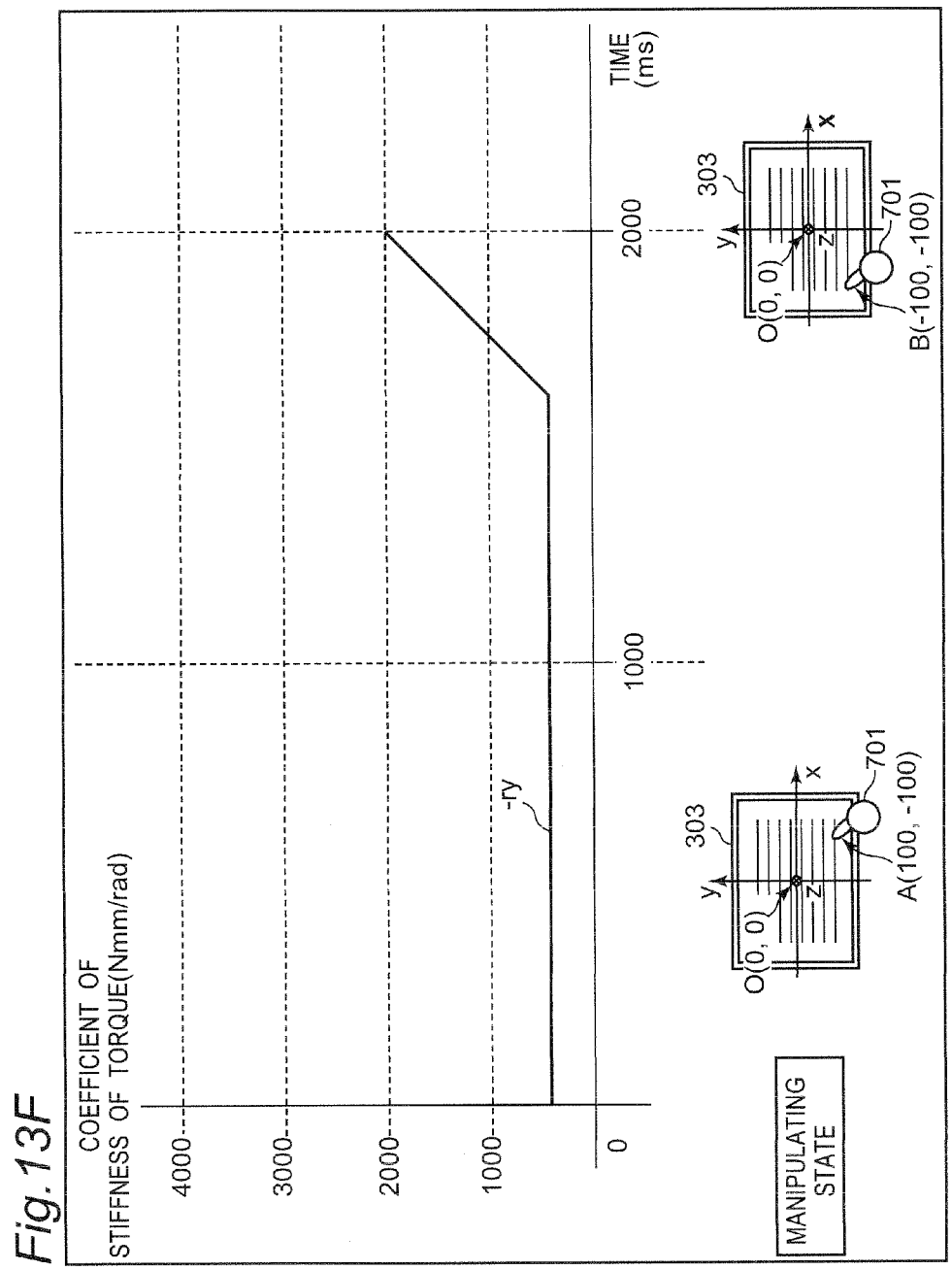

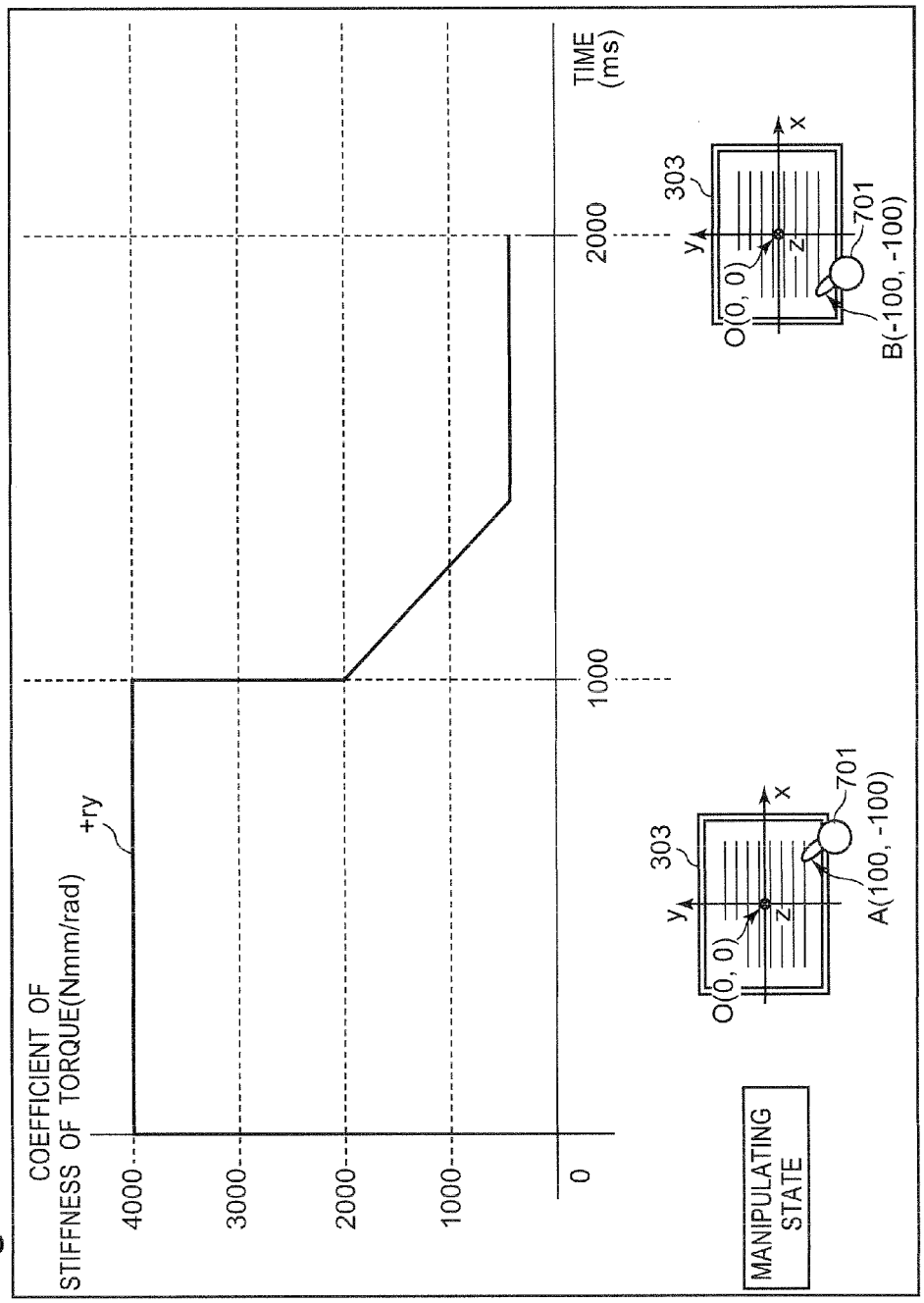

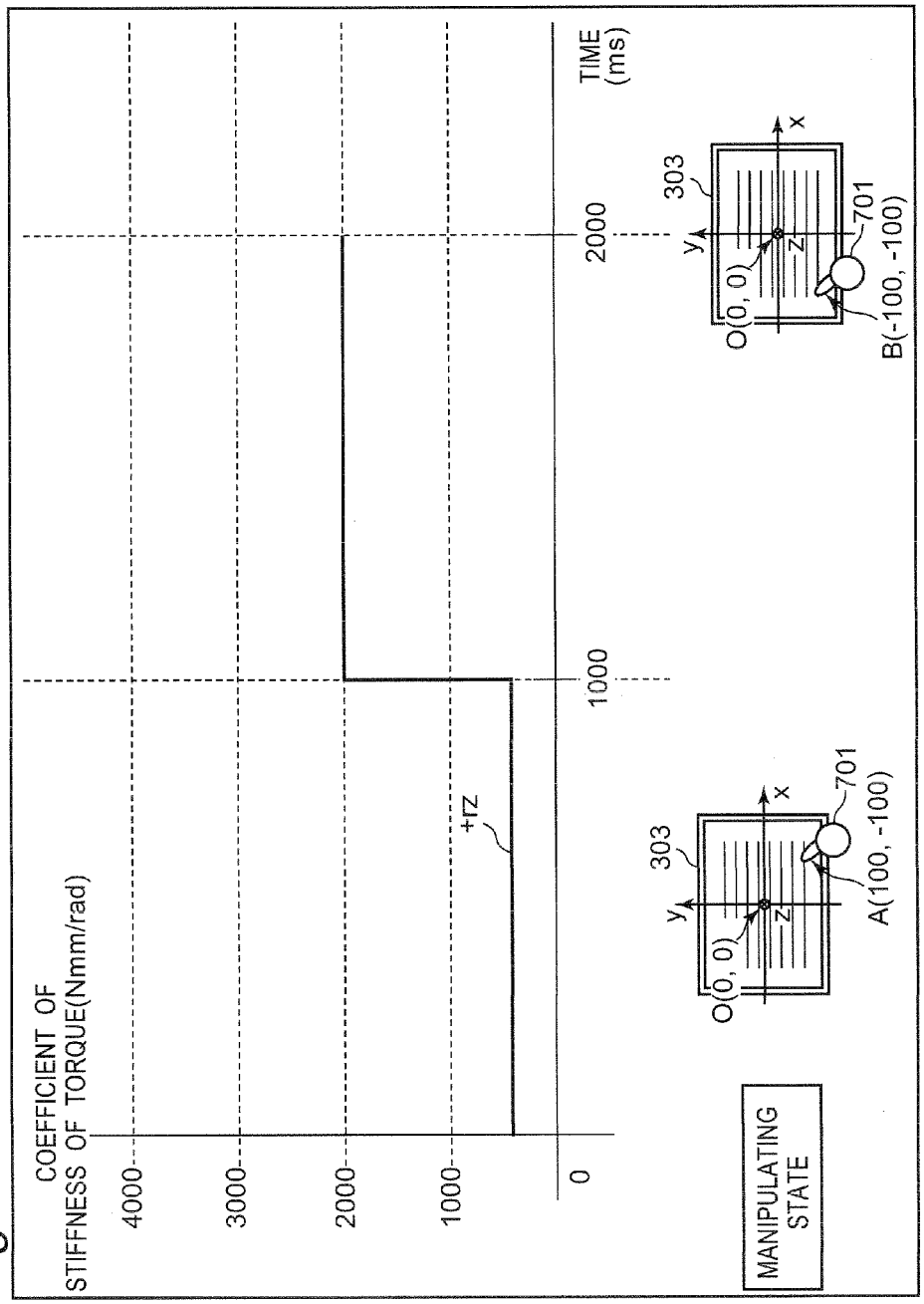

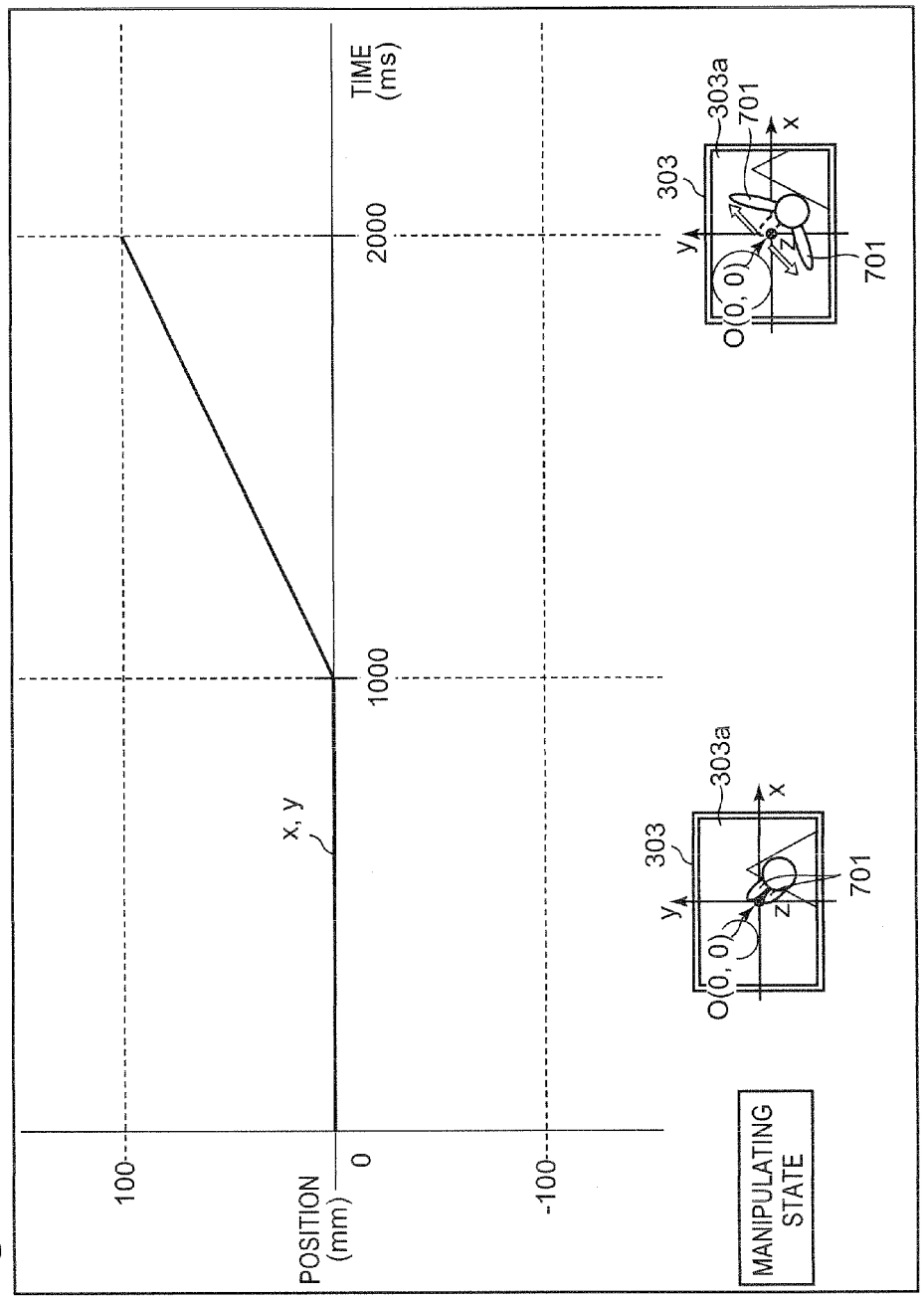

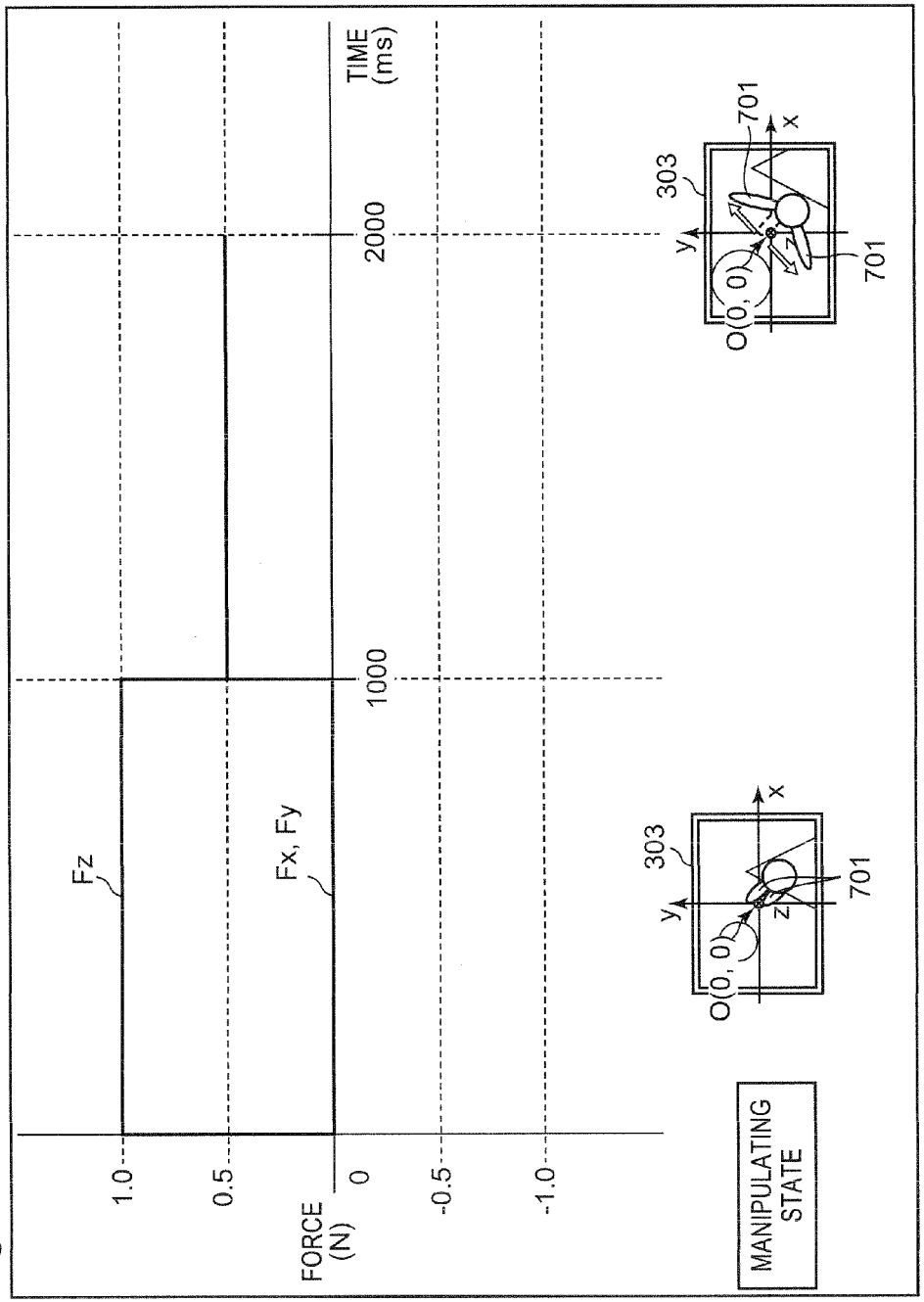

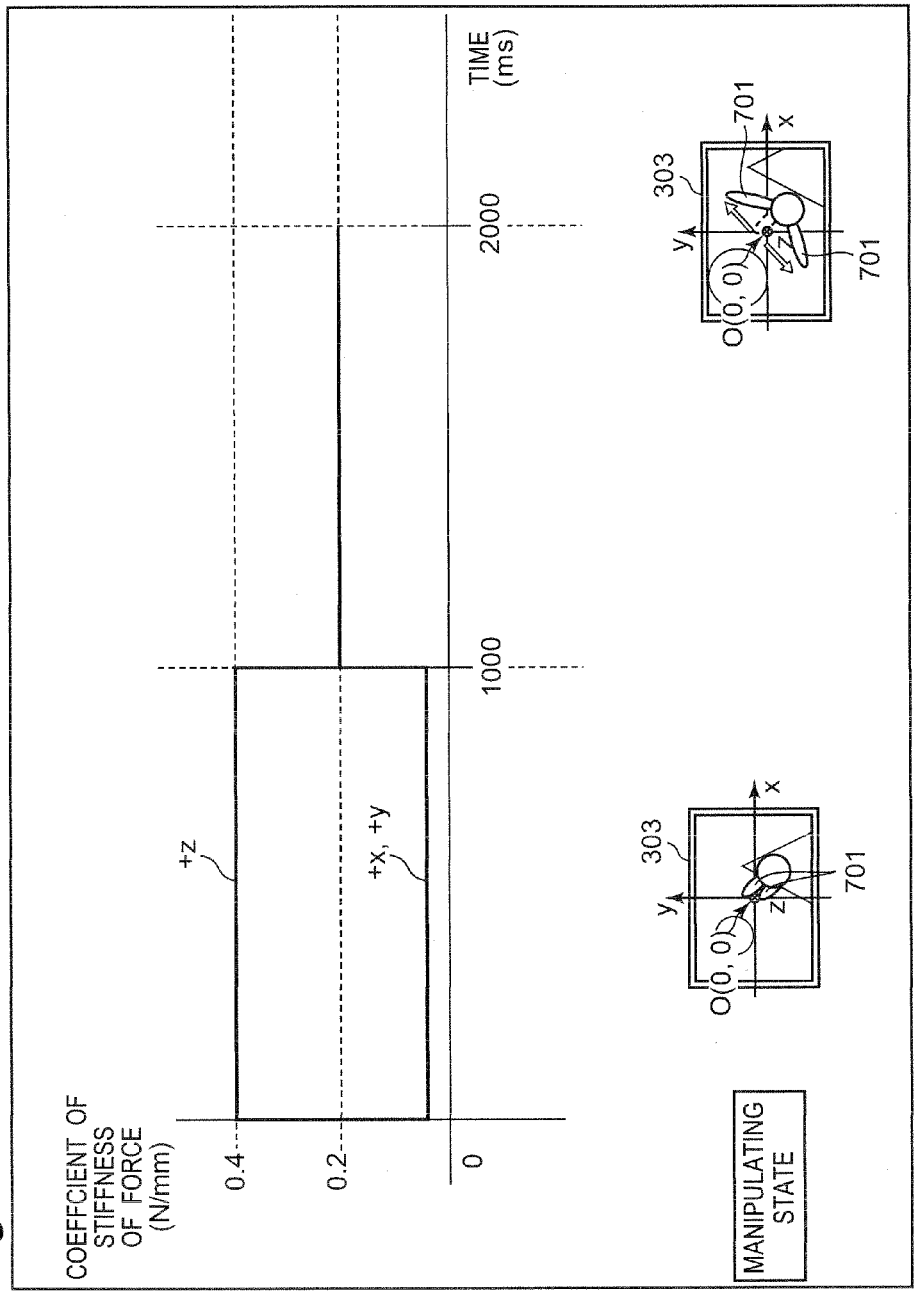

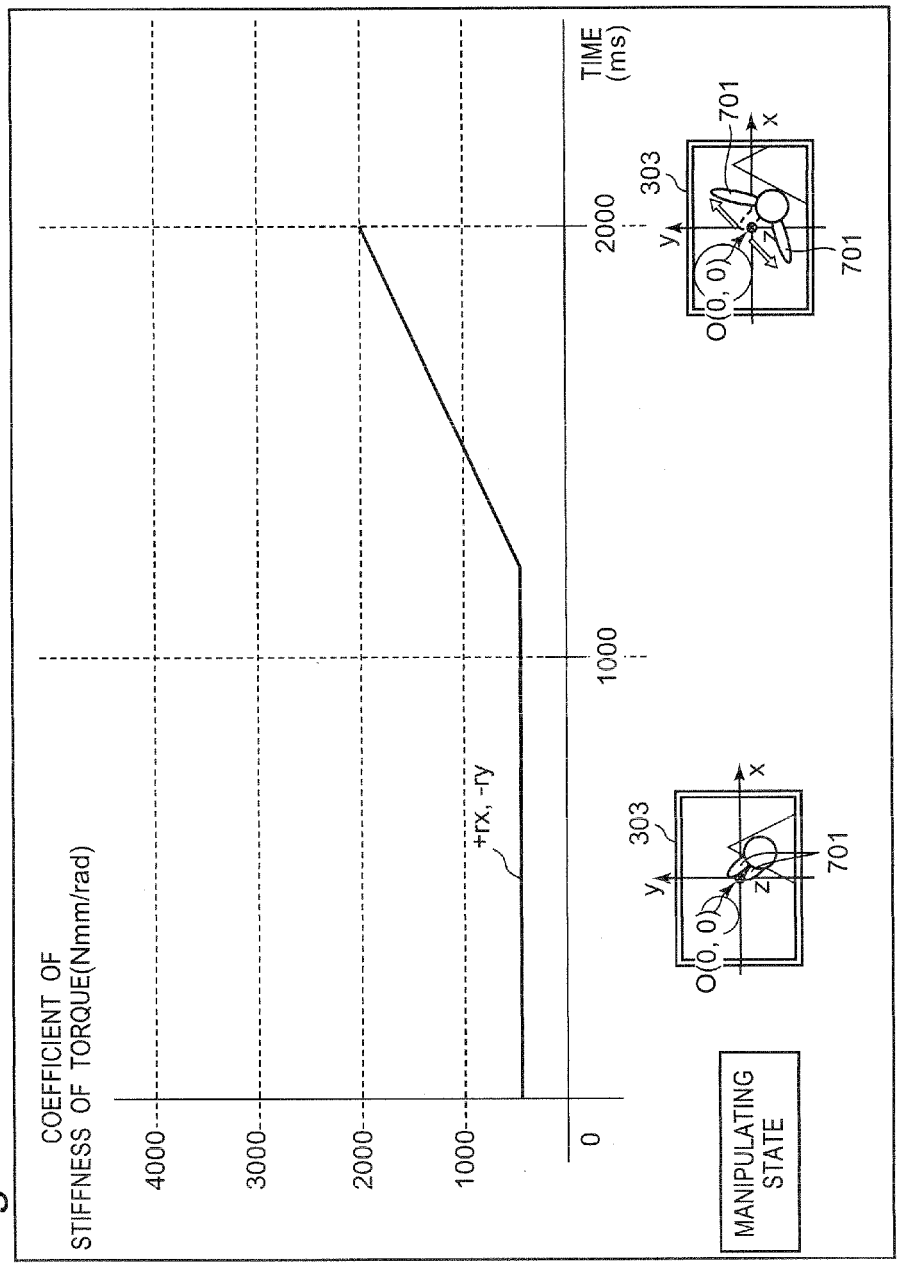

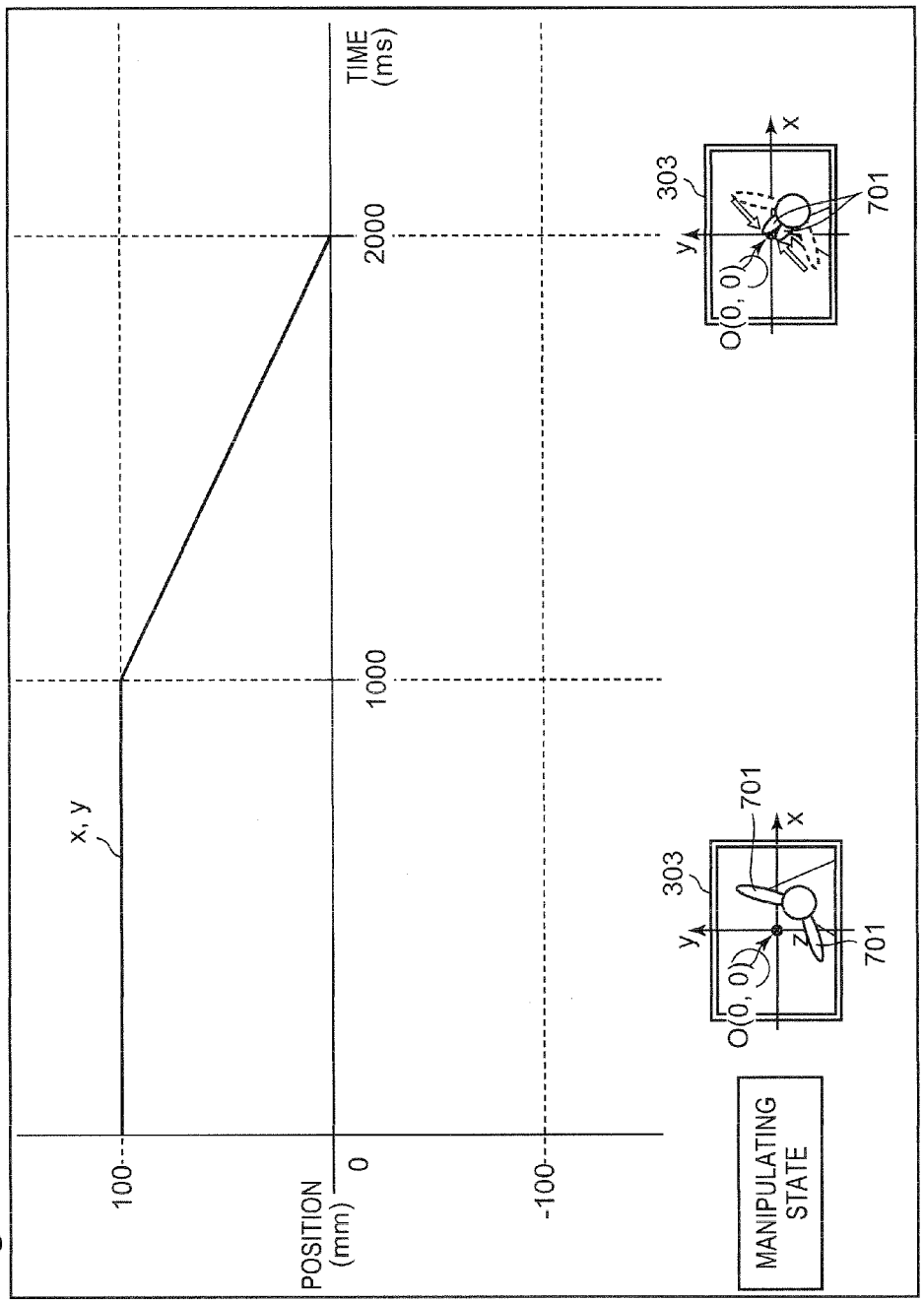

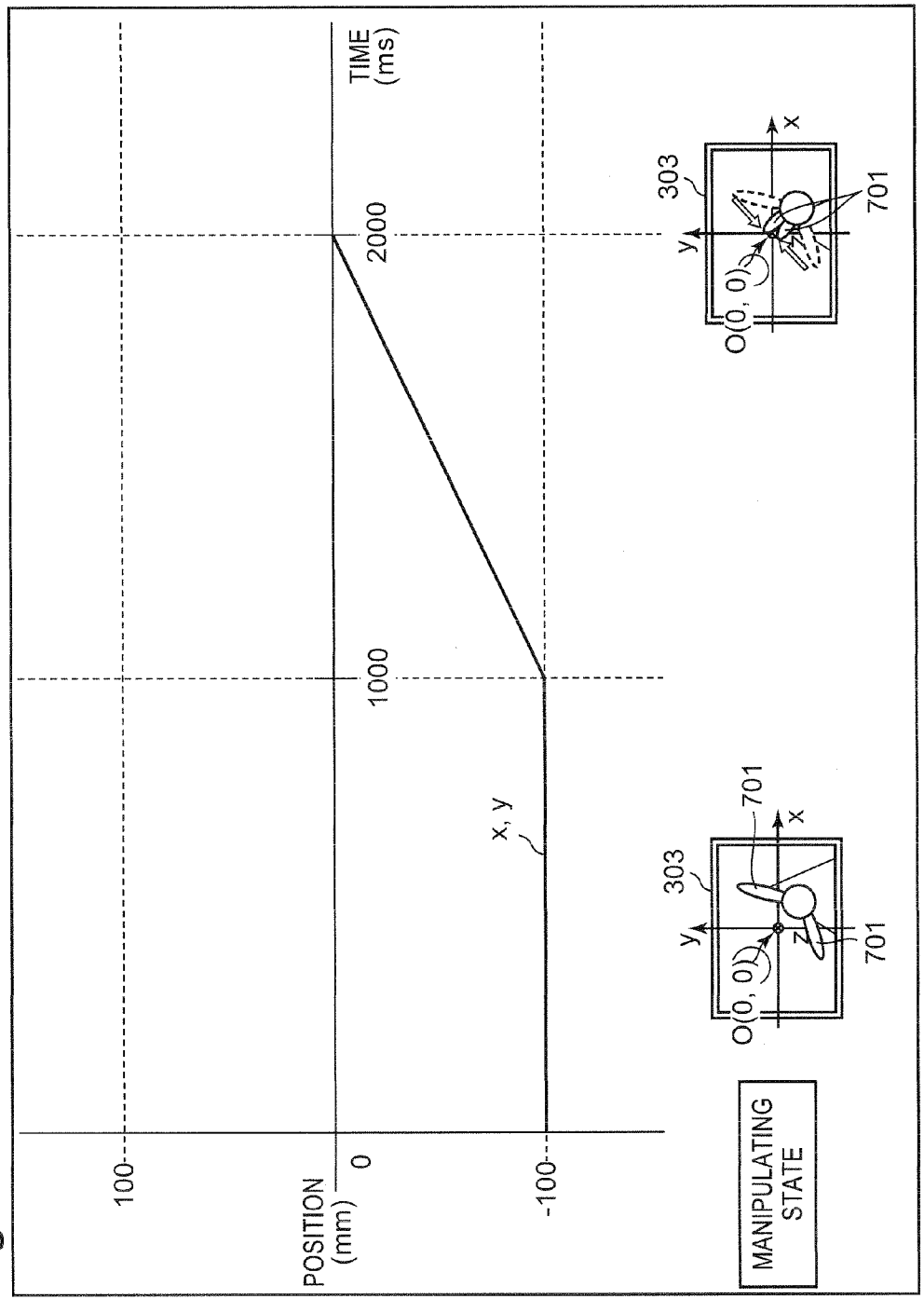

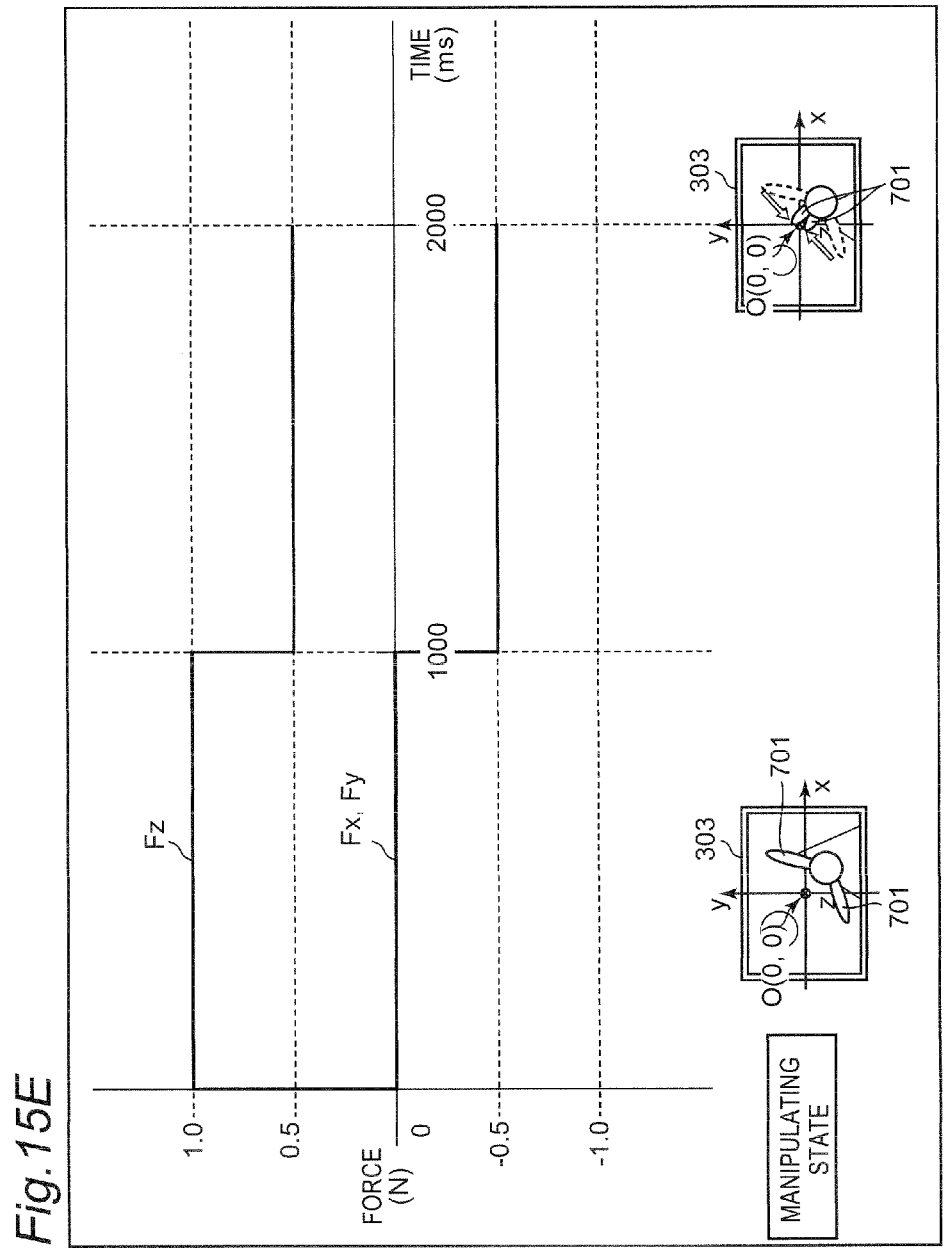

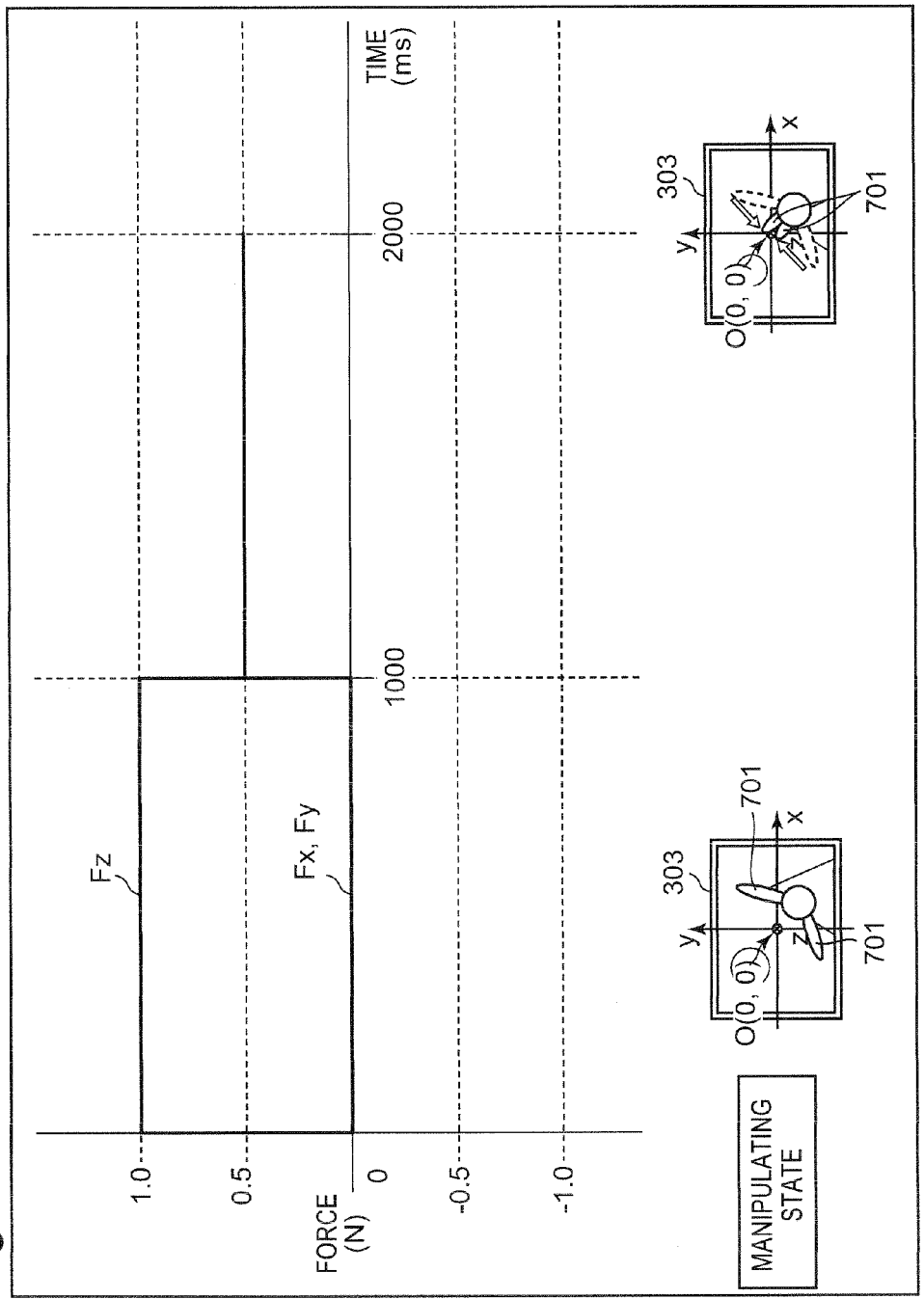

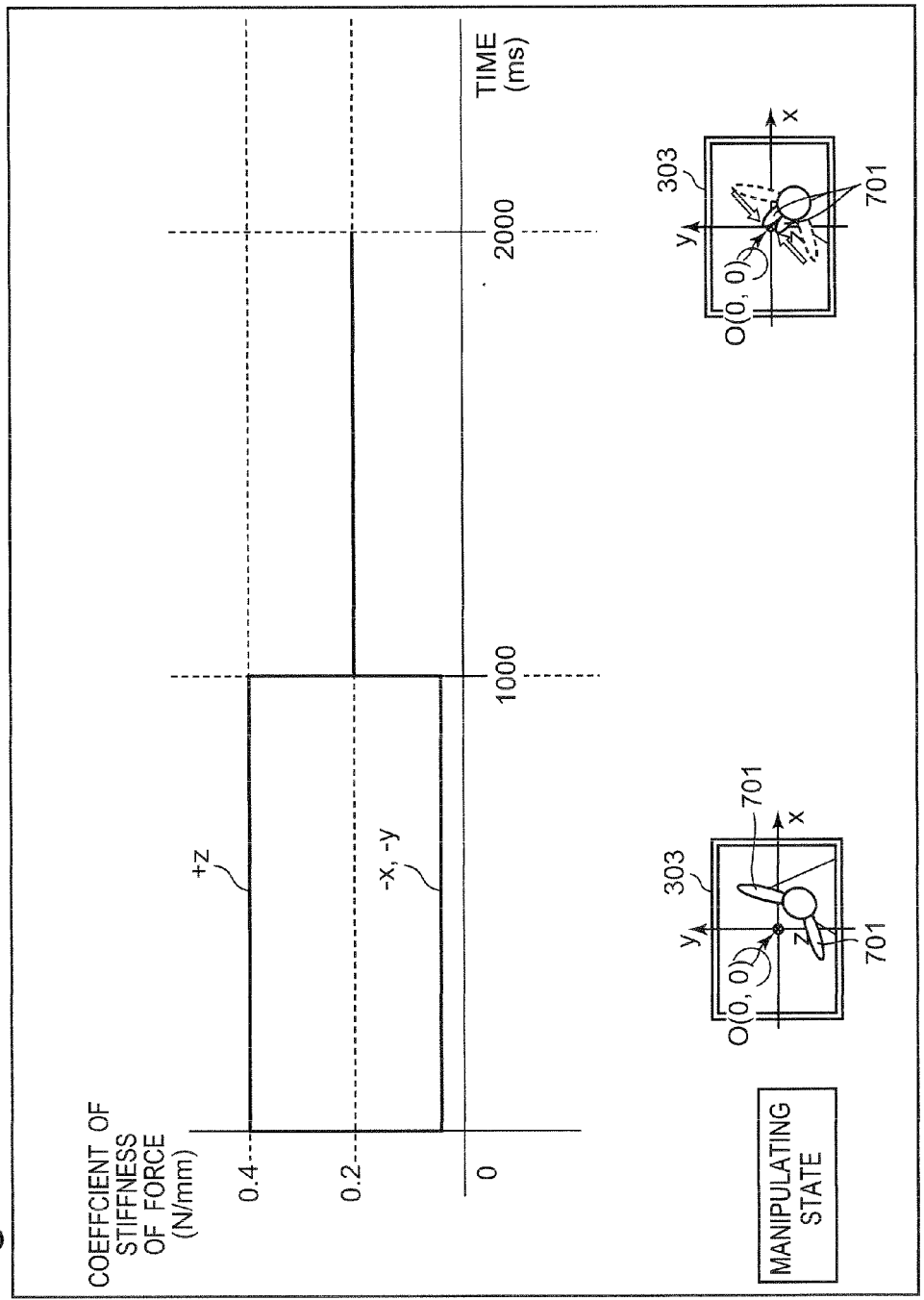

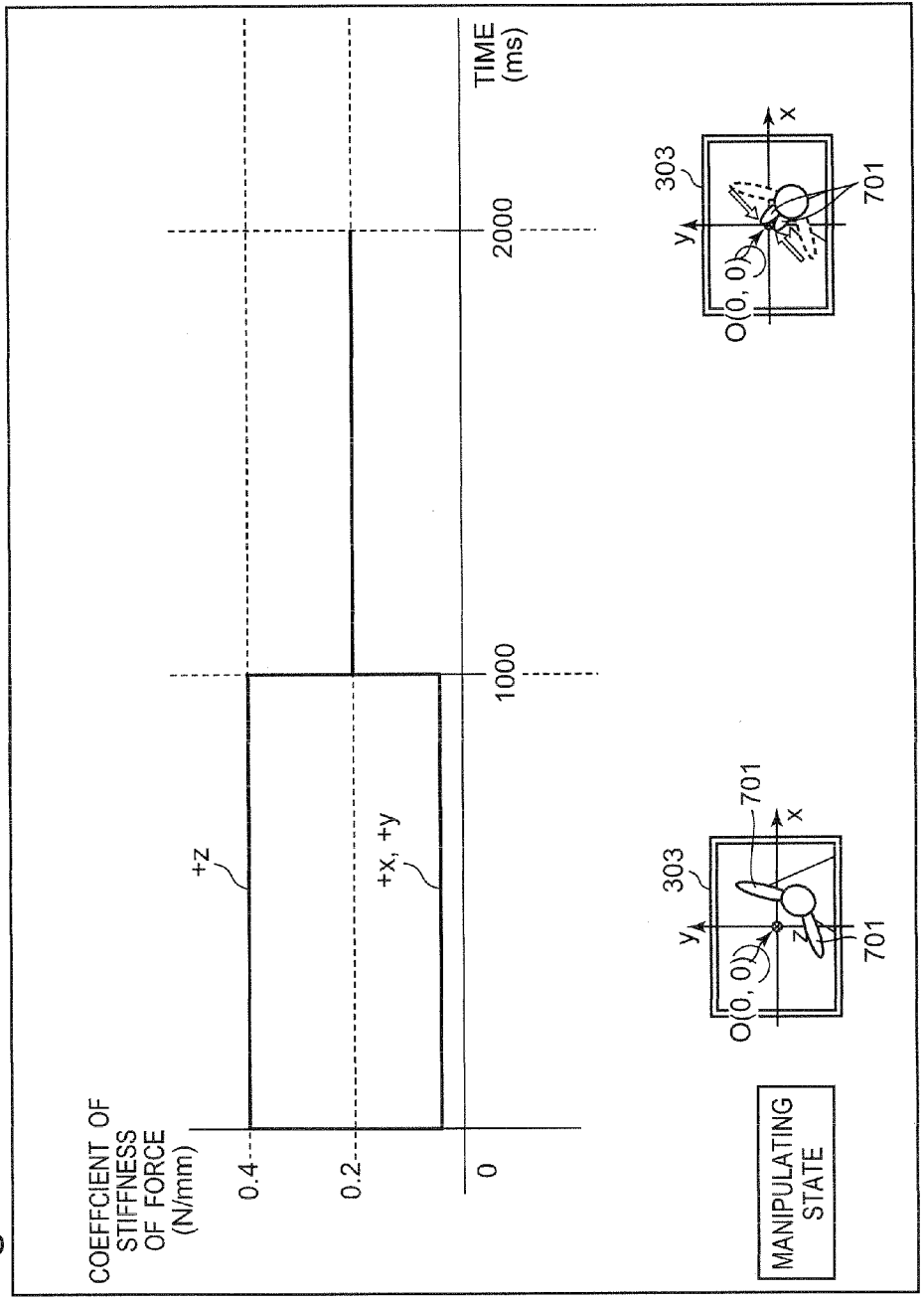

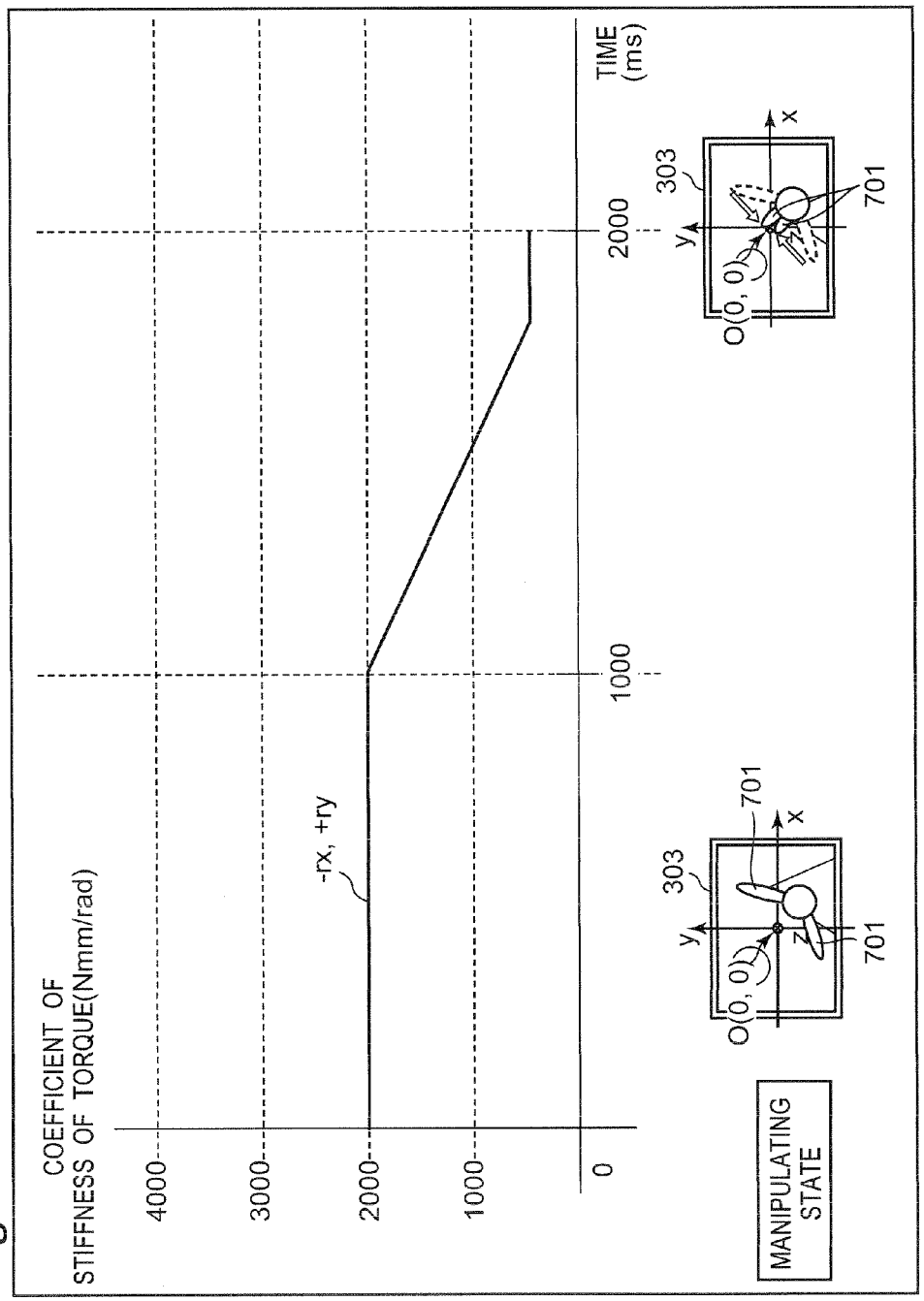

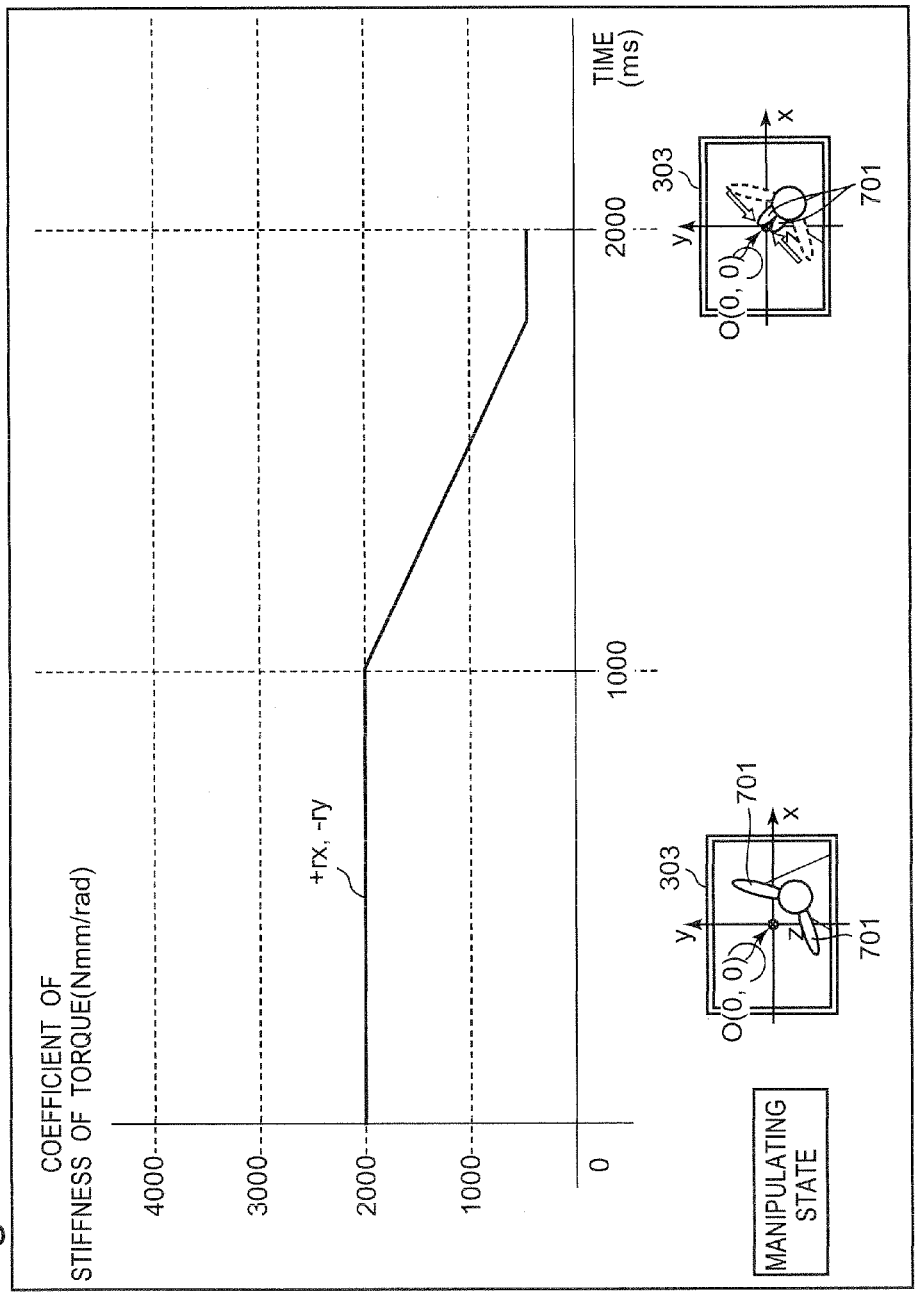

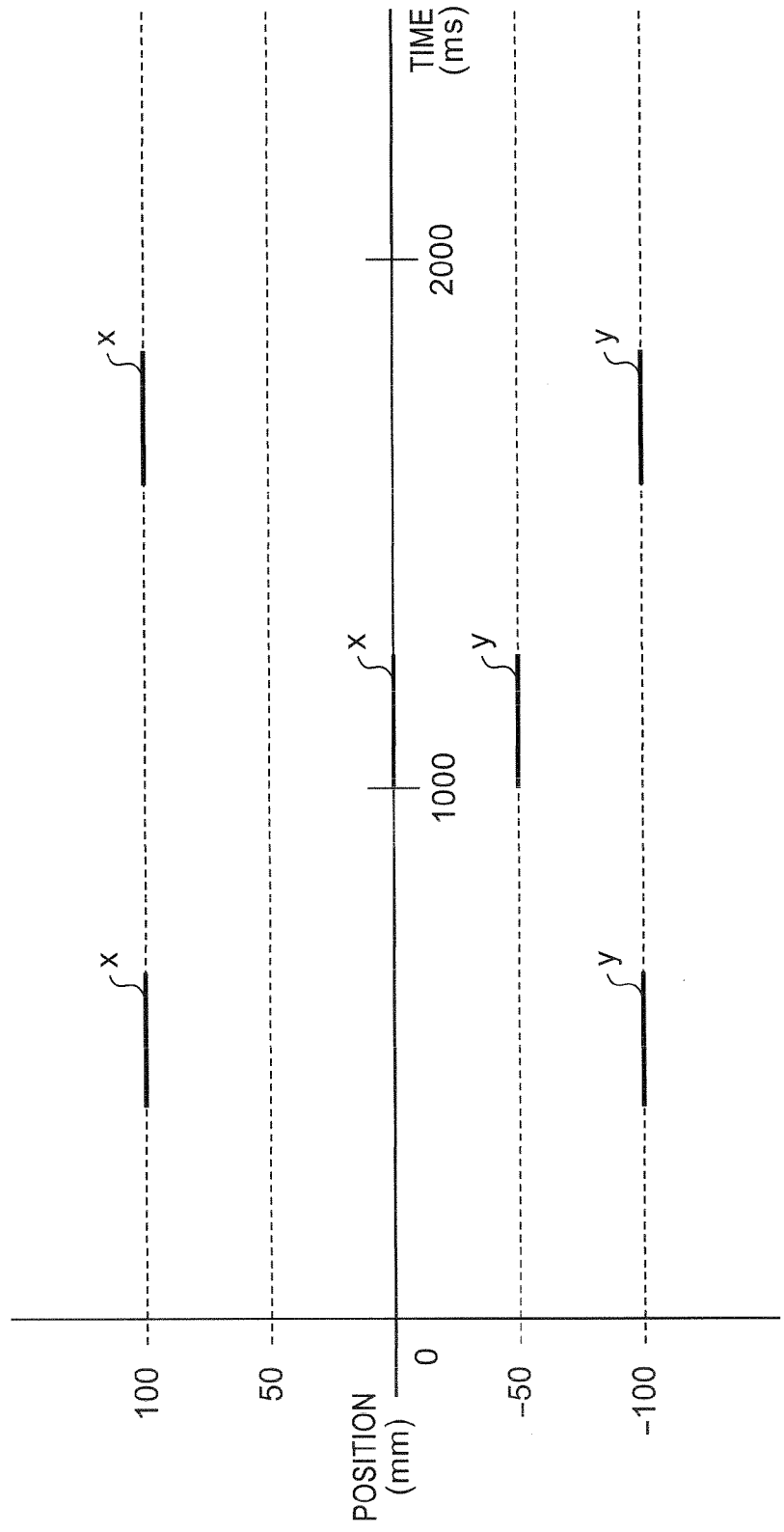

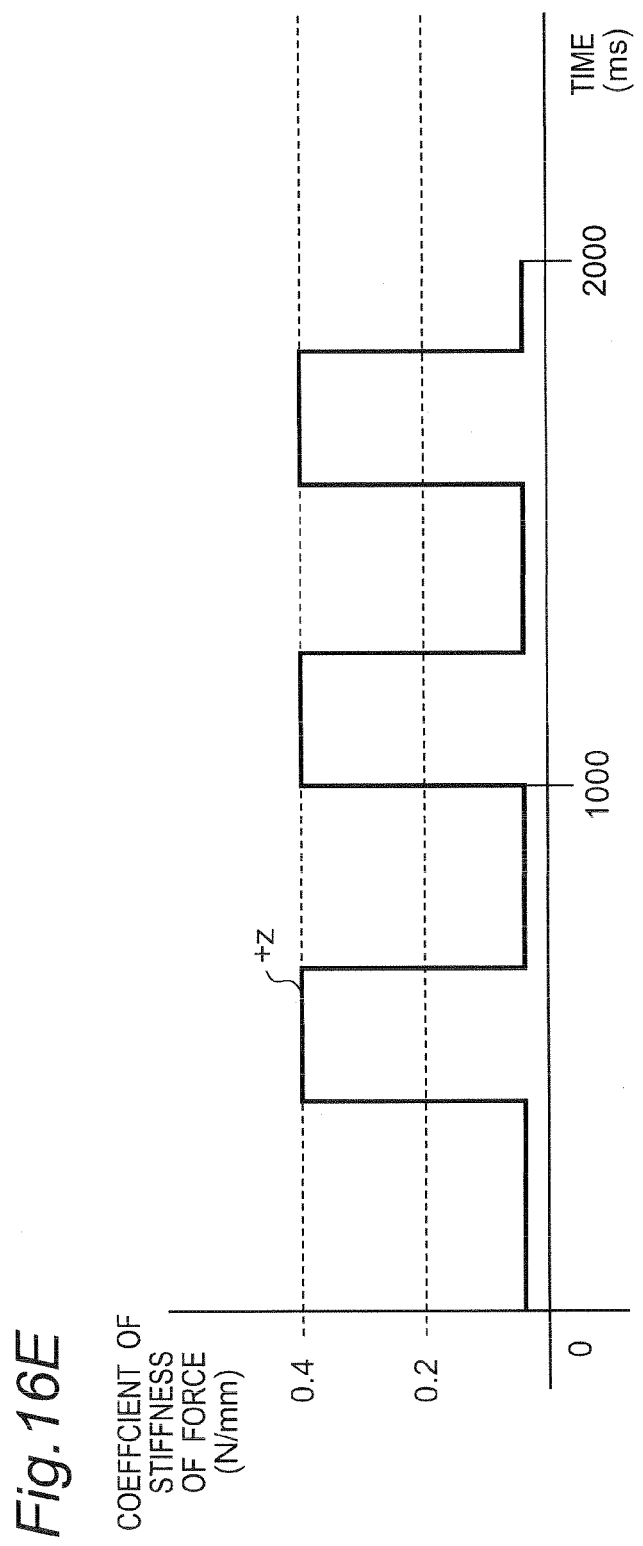

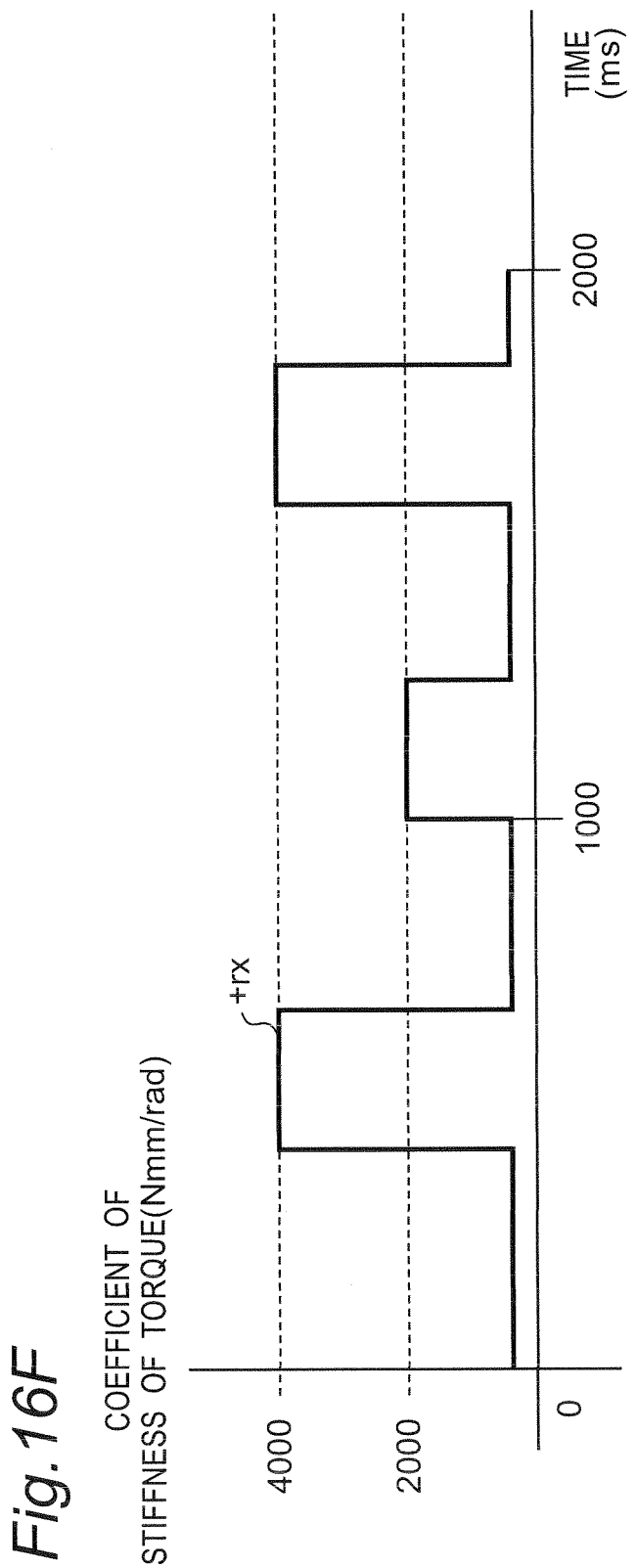

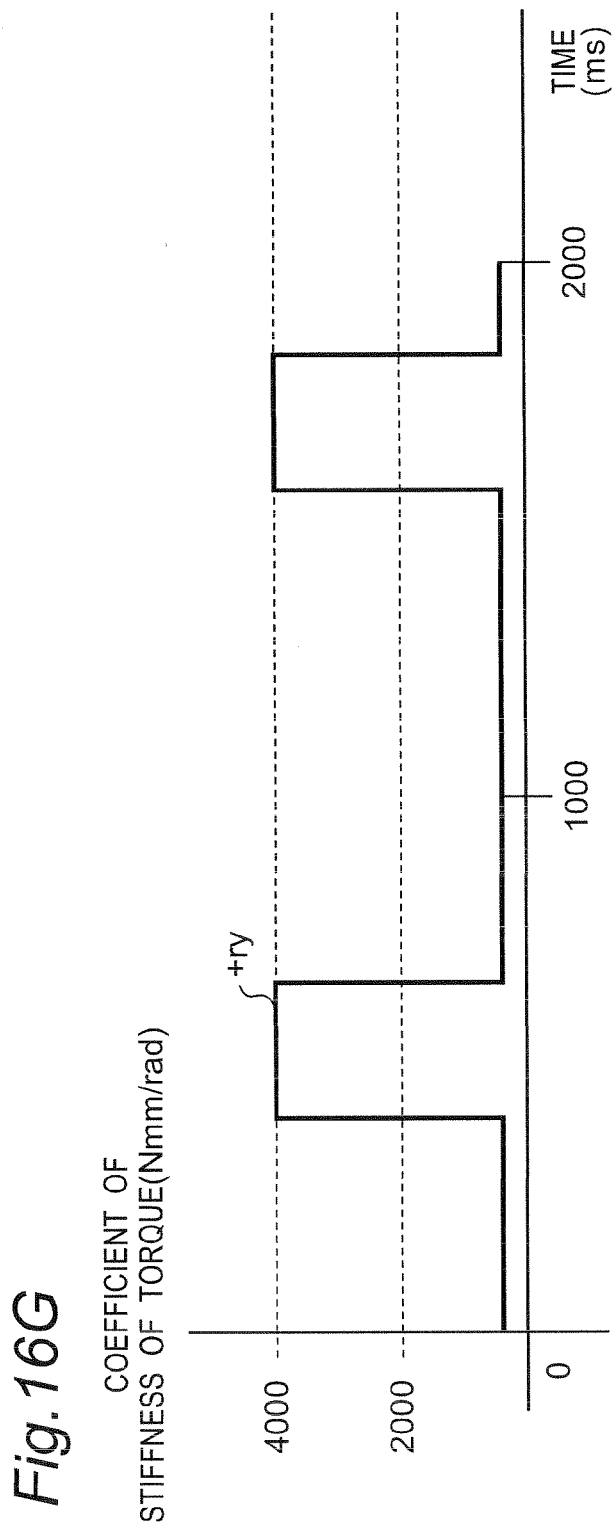

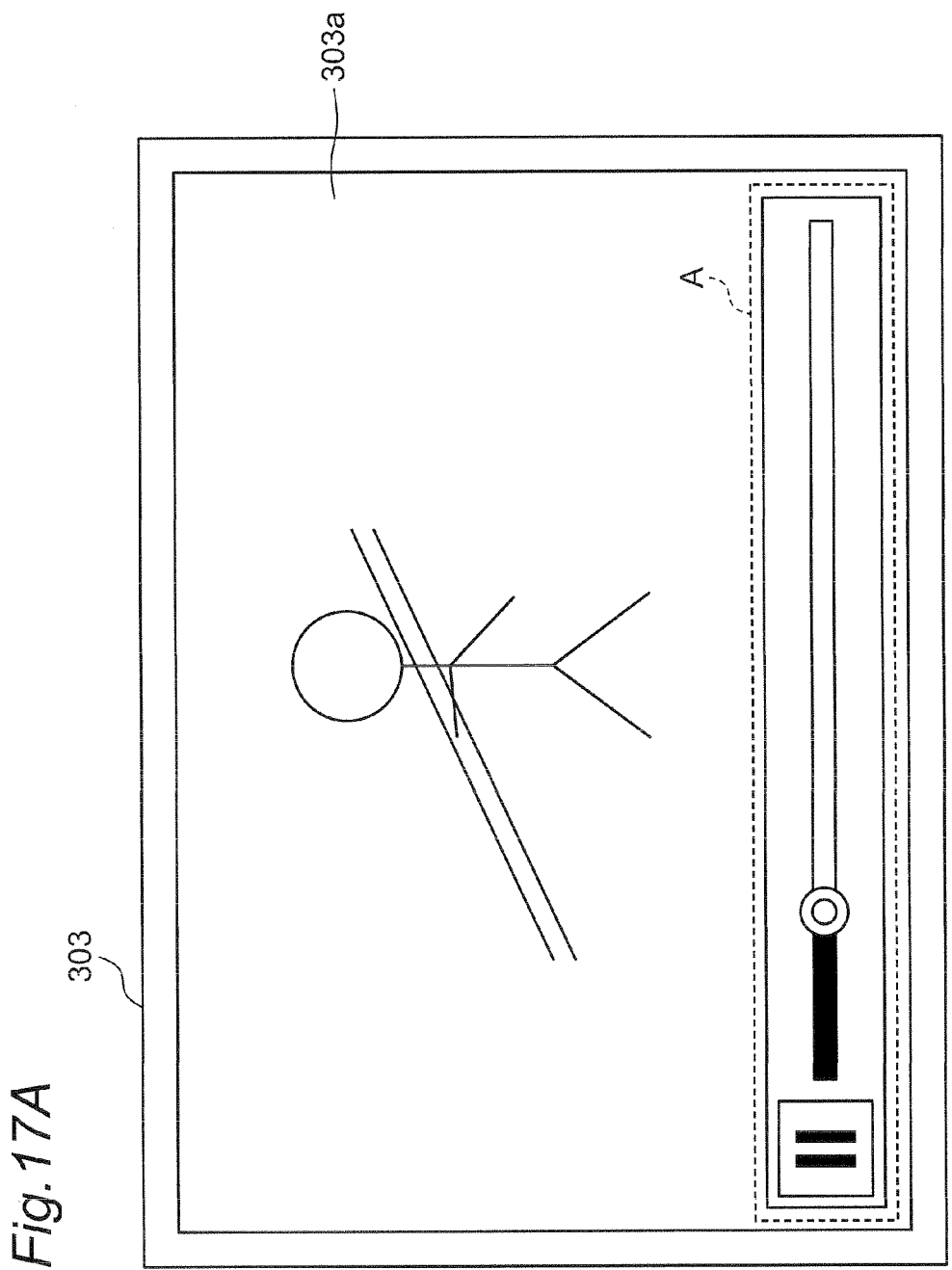

Fig.24A

| TIME(ms) | FORCE (Fx(N), Fy(N), Fz(N)) | | | | |
|---|---|---|---|---|---|
| | ... | POSITION(x, y) (0, -1) | POSITION(x, y) (0, 0) | POSITION(x, y) (0, 1) | ... |
| ⋮ | ⋮ | | | | |
| 1353 | ... | (0.0, 0.0, 0.0) | (0.0, 0.0, 0.0) | (0.0, 0.0, 0.0) | ... |
| 1354 | ... | (0.0, 0.0, +1.0) | (0.0, 0.0, 0.0) | (0.0, 0.0, 0.0) | ... |
| 1355 | ... | (0.0, 0.0, +3.0) | (0.0, 0.0, 0.0) | (0.0, 0.0, 0.0) | ... |
| 1356 | ... | (0.0, 0.0, +2.0) | (0.0, +0.5, +1.0) | (0.0, 0.0, 0.0) | ... |
| 1357 | ... | (0.0, 0.0, +2.0) | (0.0, +0.7, +1.0) | (0.0, +0.5, +1.0) | ... |
| ⋮ | ⋮ | ... | ... | ... | ... |

Fig.24B

| TIME(ms) | | DISPLACEMENT OF FORCE ($\Delta Fx(N/ms)$, $\Delta Fy(N/ms)$, $\Delta Fz(N/ms)$) | | | |
|---|---|---|---|---|---|
| | | POSITION (x, y) (0, -1) | POSITION (x, y) (0, 1) | POSITION (x, y) (0, 1) | ..... |
| ..... | ..... | ..... | ..... | ..... | ..... |
| 1353 | ..... | (0.0, 0.0, 0.0) | (0.0, 0.0, 0.0) | (0.0, 0.0, 0.0) | ..... |
| 1354 | ..... | (0.0, 0.0, +1.0) | (0.0, 0.0, 0.0) | (0.0, 0.0, 0.0) | ..... |
| 1355 | ..... | (0.0, 0.0, +2.0) | (0.0, 0.0, 0.0) | (0.0, 0.0, 0.0) | ..... |
| 1356 | ..... | (0.0, 0.0, -1.0) | (0.0, +0.5, +1.0) | (0.0, 0.0, 0.0) | ..... |
| 1357 | ..... | (0.0, 0.0, 0.0) | (0.0, +0.2, 0.0) | (0.0, +0.5, +1.0) | ..... |

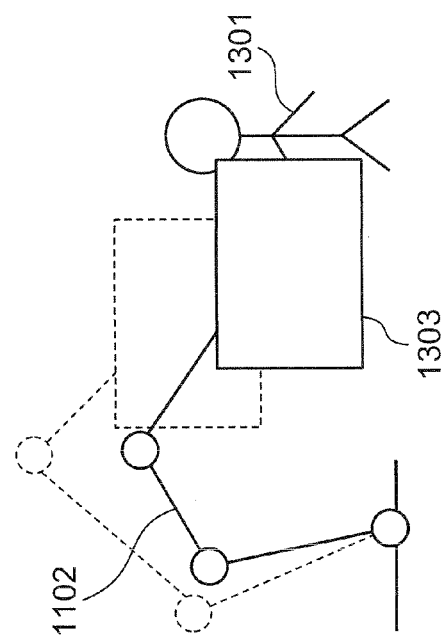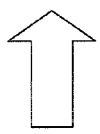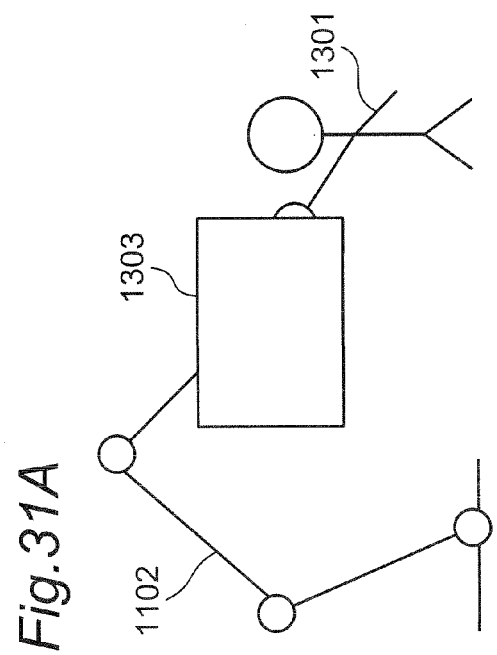
Fig.31A

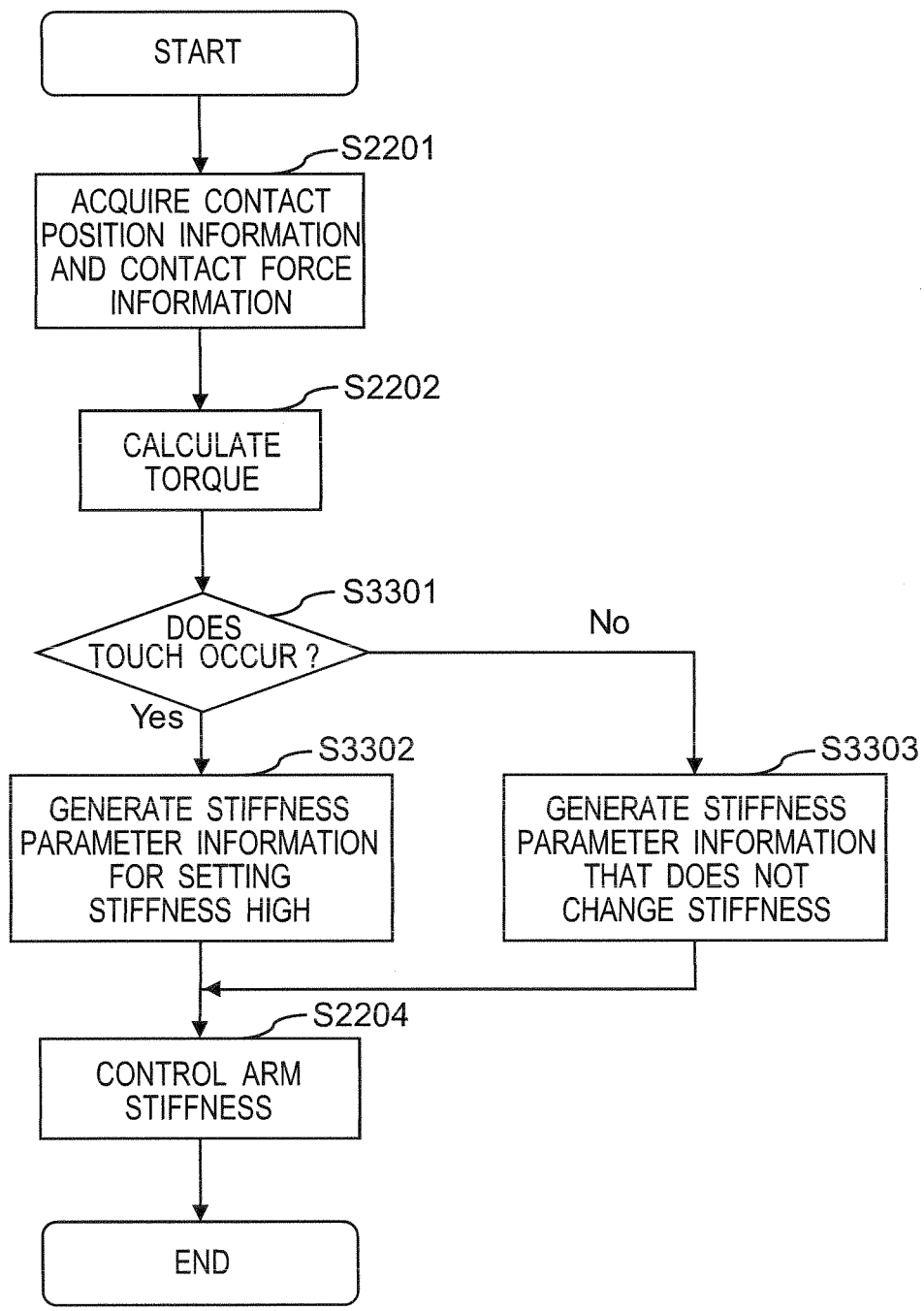

ARM CONTROL APPARATUS, ARM CONTROL METHOD, ARM CONTROL PROGRAM, ROBOT, AND INTEGRATED ELECTRONIC CIRCUIT FOR ARM CONTROL

CROSS-REFERENCE TO RELATED APPLICATIONS

This is a continuation application of International Application No. PCT/JP2013/006803, with an international filing date of Nov. 20, 2013, which claims priority of Japanese Patent Application No.: 2012-256518 filed on Nov. 22, 2012, the content of which is incorporated herein by reference.

TECHNICAL FIELD

The technical field relates to an arm control apparatus and a control method, a robot having the arm control apparatus, an arm control program, and an integrated electronic circuit for arm control, for controlling stiffness of an arm with a touch panel display and generating motions thereof.

BACKGROUND ART

The following technique is proposed as a technique with which a person moves a display device to a desired position.

The display device has a detector for detecting contact of a person with a bezel portion. When the detector detects that the person makes contact with the bezel portion in order to move a display portion, a link portion is made turnable, and the display portion can be moved to a desired position. Further, when a situation that the contact between the person and the bezel portion is broken in order to hold a position of the display portion is detected, the link portion is made unturnable, and the position of the display portion is held (see Patent Literature 1).

CITATION LIST

Patent Literature

Patent Literature 1: Japanese Unexamined Patent Publication No. 2010-128195

SUMMARY OF INVENTION

Technical Problem

In Patent Literature 1, however, only when the person makes contact with the bezel portion, the link portion is turnable. For this reason, when the person collides with a portion other than the bezel portion, the link portion is not turnable and thus this situation is dangerous.

One non-limiting and exemplary embodiment provides an arm control apparatus and a control method, a robot, an arm control program, and an integrated electronic circuit for an arm control, with each of which, in an arm with a touch panel display, a person can move the touch panel display through light force even when the person collides with a portion other than a bezel portion and can touch the touch panel display with the touch panel display not being moved to a touch direction when the person touches the touch panel display.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

In one general aspect, the techniques disclosed here feature: An arm control apparatus for controlling a position and an orientation of a touch panel display, the apparatus comprising:

a touch position information acquiring unit that acquires a position on a screen of the touch panel display touched by a person;

a touch force information acquiring unit that acquires a force on the screen touched by the person;

a torque calculating unit that calculates a torque to be applied to the touch panel display based on the position acquired by the touch position information acquiring unit and the force acquired by the touch force information acquiring unit;

a stiffness parameter information generating unit that generates information about a stiffness parameter for controlling the arm so that the position and the orientation of the touch panel display do not change based on the torque calculated by the torque calculating unit; and an arm control unit that controls the arm based on the information about the stiffness parameter generated by the stiffness parameter information generating unit.

These general and specific aspects may be implemented using a system, a method, and a computer program, and any combination of systems, methods, and computer programs.

With the arm control apparatus, the arm control method, the robot, the arm control program, and the integrated electronic circuit for arm control from the above aspect of the present disclosure, stiffness can be adjusted so that the touch panel display can be moved by light force at a moving time, and the person can touch the touch panel display without moving the touch panel display to a pushing direction. For this reason, maneuverability of the touch manipulation is improved.

BRIEF DESCRIPTION OF DRAWINGS

These and other aspects and features of the present disclosure will become clear from the following description taken in conjunction with the embodiments thereof with reference to the accompanying drawings, in which:

FIG. 2 is an explanatory view illustrating data about motion information in the robot according to the first embodiment of the present disclosure;

FIG. 6 is an explanatory view illustrating data about touch position information in the robot according to the first embodiment of the present disclosure;

FIG. 8 is an explanatory view illustrating data about touch force information in the robot according to the first embodiment of the present disclosure;

FIG. 11C is an explanatory view illustrating data about the touch position information (touch) in the robot according to the first embodiment of the present disclosure;

FIG. 11D is an explanatory view illustrating data about the touch force information (touch) in the robot according to the first embodiment of the present disclosure;

FIG. 11E is an explanatory view illustrating data about stiffness parameter information (touch) in the robot according to the first embodiment of the present disclosure;

FIG. 13C is an explanatory view including a graph of stiffness parameter information (page turning) about +x in the robot according to the first embodiment of the present disclosure;

FIG. 13D is an explanatory view including a graph of the stiffness parameter information (page turning) about −z in the robot according to the first embodiment of the present disclosure;

FIG. 13E is an explanatory view including a graph of the stiffness parameter information (page turning) about a −rx direction in the robot according to the first embodiment of the present disclosure;

FIG. 13F is an explanatory view including a graph of the stiffness parameter information (page turning) about a +ry direction in the robot according to the first embodiment of the present disclosure;

FIG. 13G is an explanatory view including a graph of the stiffness parameter information (page turning) about a −ry direction in the robot according to the first embodiment of the present disclosure;

FIG. 13H is an explanatory view including a graph of the stiffness parameter information (page turning) about a −rz direction in the robot according to the first embodiment of the present disclosure;

FIG. 14C is an explanatory view including a graph of the touch position information (enlargement) about a position A in the robot according to the first embodiment of the present disclosure;

FIG. 14E is an explanatory view including a graph of the touch force information (enlargement) about the position A in the robot according to the first embodiment of the present disclosure;

FIG. 14G is an explanatory view including a graph of stiffness parameter information (enlargement) in a translation direction about the position A in the robot according to the first embodiment of the present disclosure;

FIG. 14I is an explanatory view including a graph of the stiffness parameter information (enlargement) in a rotational direction about the position A in the robot according to the first embodiment of the present disclosure;

FIG. 15C is an explanatory view including a graph of touch position information (reduction) about the position A in the robot according to the first embodiment of the present disclosure;

FIG. 15D is an explanatory view including a graph of the touch position information (reduction) about the position B in the robot according to the first embodiment of the present disclosure;

FIG. 15E is an explanatory view including a graph of the touch force information (reduction) about the position A in the robot according to the first embodiment of the present disclosure;

FIG. 15F is an explanatory view including a graph of the touch force information (reduction) about the position B in the robot according to the first embodiment of the present disclosure;

FIG. 15G is an explanatory view including a graph of stiffness parameter information (reduction) in the translation direction about the position A in the robot according to the first embodiment of the present disclosure;

FIG. 15H is an explanatory view including a graph of the stiffness parameter information (reduction) in the translation direction about the position B in the robot according to the first embodiment of the present disclosure;

FIG. 15I is an explanatory view including a graph of the stiffness parameter information (reduction) in the rotational direction about the position A in the robot according to the first embodiment of the present disclosure;

FIG. 15J is an explanatory view including a graph of the stiffness parameter information (reduction) in the rotational direction about the position B in the robot according to the first embodiment of the present disclosure;

FIG. 16C is a graph of the touch position information (keyboard input) in the robot according to the first embodiment of the present disclosure;

FIG. 16E is a graph of stiffness parameter information (keyboard input) in a translation direction in the robot according to the first embodiment of the present disclosure;

FIG. 16F is a graph of the stiffness parameter information (keyboard input) about the −rx direction in the robot according to the first embodiment of the present disclosure;

FIG. 16G is a graph of the stiffness parameter information (keyboard input) about the −ry direction in the robot according to the first embodiment of the present disclosure;

FIG. 17A is an explanatory view illustrating contents of a hospital in the robot according to the first embodiment of the present disclosure;

FIG. 24A is an explanatory view illustrating data about touch force information in the robot according to the second embodiment of the present disclosure;

FIG. 24B is an explanatory view illustrating data about touch force displacement information in the robot according to the second embodiment of the present disclosure;

FIG. 31A is an explanatory view illustrating a problem of the touch panel display with the arm in the conventional robot;

FIG. 33 is a flowchart illustrating an operating procedure of a control apparatus in the robot according to the fourth embodiment.

DETAILED DESCRIPTION

In this description, "touch" means that a person (user) 1301 or 301 intentionally touches a display 1303 or 303 with a finger 701 or a stylus pen in order that the person (user) 1301 or 301 manipulates contents. That is, "touch" means motion until the finger 701 or the stylus pen makes contact with the display 1303 or 303, and does not include a motion for releasing the finger 701 or the stylus pen from the display 1303 or 303 after the contact.

Further, in this description, "person leaves" means that the person (user) 1301 or 301 removes the finger 701 or the stylus pen from the display 1303 or 303, and does not means that the person (user) 1301 or 301 actually leaves the display 1303 or 303.

Further, in this description, "multi-touch" means a state that a plurality of fingers 701 simultaneously make contact with the panel display 1303 or 303. That is, "multi-touch" means a plurality of touches on a plurality of positions on the touch panel display 1303 or 303, and thus a plurality of touches in a temporally overlapping manner. Therefore, "multi-touch" includes not only the plurality of touches started simultaneously but also a plurality of touches started at different times and detected simultaneously at a certain time point. Concretely, when a second touch is started while a first touch continues after a first touch is started, the first touch and the second touch correspond to the multi-touch at a starting time of the second touch.

Further, in this description, "collision" means that the touch panel display and the person unintentionally make contact with each other.

Embodiments of the present disclosure are described in detail below with reference to the drawings.

Before the detailed description of the embodiments of the present disclosure with reference to the drawings, a knowledge that is the basis of the present disclosure is described, and then various aspects of the present disclosure are described.

(Knowledge that is the Basis of the Present Disclosure)
(Contents and Problem of Prior Literature)
(Contents of Prior Literature)

Figure 30A:
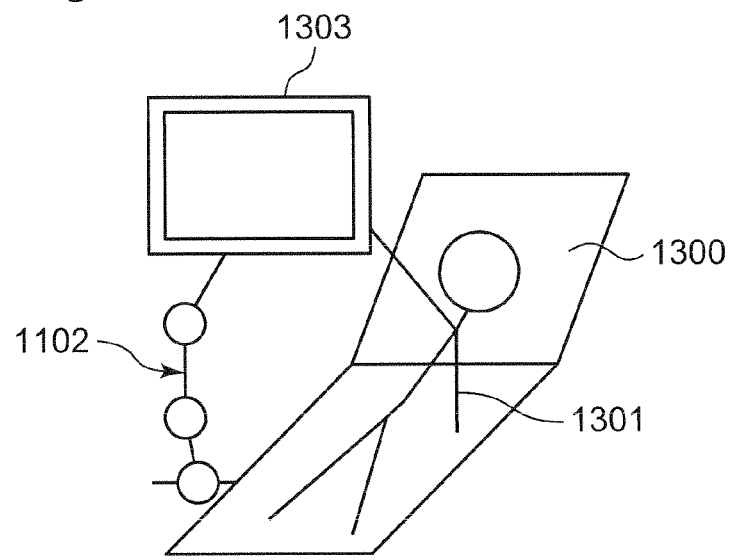
FIG. 30A is an explanatory view illustrating a touch panel display with an arm in a conventional robot.
Figure 30B:
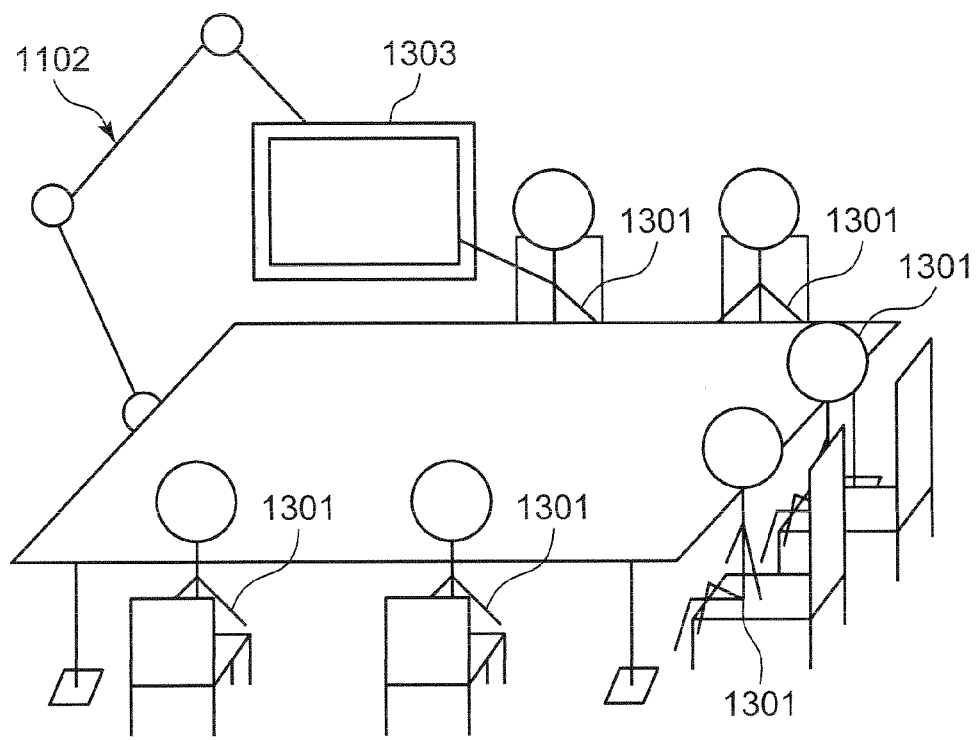
FIG. 30B is an explanatory view illustrating the touch panel display with the arm in the conventional robot.

The touch panel display 1303 can be used in various ways, and usage examples thereof include a case where the person 1301 manipulates the touch panel display 1303 while lying on a bed 1300 and a case where the touch panel display 1303 is shared by attendees 1301 in a meeting. In the above examples, since the person 1301 holds the touch panel display 1303 with one hand and manipulates the touch panel display 1303 with the other hand, the person 1301 will always hold the touch panel display 1303 with the one hand. For this reason, when an arm 1102 is attached to the touch panel display 1303, the person 1301 does not have to hold the touch panel display 1303 with a hand so as to be capable of manipulating the touch panel display 1303 with one hand. As a usage example of the touch panel display 1303 with the arm, FIG. 30A illustrates a usage example on the bed 1300 or a sofa and FIG. 30B illustrates a usage example in a meeting. A problem of the touch panel display 1303 in such cases is as follows.

Figure 31B:
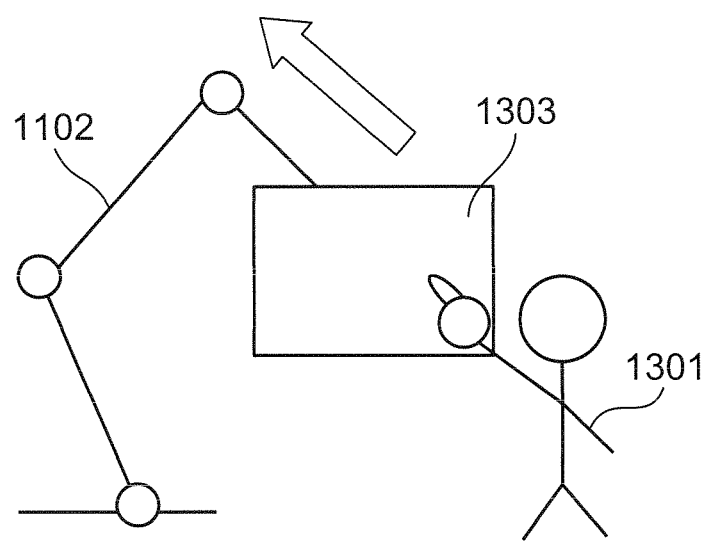
FIG. 31B is an explanatory view illustrating the problem of the touch panel display with the arm in the conventional robot.

When the arm 1102 is enabled to be slightly moved, the arm 1102 moves towards a direction where the person 1301 pushes at a time when the person 1301 performs a touching manipulation (see FIG. 31B). For this reason, it is difficult for the person 1301 to touch the touch panel display 1303 with the touch panel display 1303 not being moved. That is, it is difficult for the person 1301 to touch the touch panel display 1303.

The following technique has been proposed for a problem of a difficulty in touching the touch panel display 1303 at the time of performing the touching manipulation.

When the touch panel display is provided with a detector for detecting a person's contact with a bezel portion and the detector detects that the person makes contact with the bezel portion in order to try to move the touch panel display, a link portion is made to be turnable, and the touch panel display can be moved to a desired position. Further, when the detector detects that the person releases the contact with the bezel portion in order to hold the position of the touch panel display, the link portion is made unturnable, so that the position of the touch panel display is held (see Patent Literature 1)

(Problem of Prior Literature)

In Patent Literature 1, when the person makes contact with the bezel portion, the touch panel display is rotatable and can be moved. On the other hand, when the person does not make contact with the bezel portion, the touch panel display is not rotatable and does not move. For this reason, when the person touches only the touch panel display without touching the bezel portion, the person can touch the touch panel display with the touch panel display being unmoved. However, when the person touches the touch panel display while touching the bezel portion, the touch panel display moves to the pushing direction, and thus it is difficult to perform the touching manipulation.

In order to solve this problem, therefore, the following invention is devised.

Examples of the disclosed technique are as follows.

1st aspect: An arm control apparatus for controlling a position and an orientation of a touch panel display, the apparatus comprising:

a touch position information acquiring unit that acquires a position on a screen of the touch panel display touched by a person;

a touch force information acquiring unit that acquires a force on the screen touched by the person;

a torque calculating unit that calculates a torque to be applied to the touch panel display based on the position acquired by the touch position information acquiring unit and the force acquired by the touch force information acquiring unit;

a stiffness parameter information generating unit that generates information about a stiffness parameter for controlling the arm so that the position and the orientation of the touch panel display do not change based on the torque calculated by the torque calculating unit; and an arm control unit that controls the arm based on the information about the stiffness parameter generated by the stiffness parameter information generating unit.

According to the above aspect, adjustment of the stiffness enables the touch panel display to be moved by light force at the time of moving the touch panel display, and stiffness can be adjusted so that the person can touch the touch panel display with the touch panel display unmoving to the pushing direction. For this reason, maneuverability of the touch manipulation is improved.

2nd aspect: The arm control apparatus according to the 1st aspect, wherein the touch force information acquiring unit acquires force information about a pushing force to be vertically applied to a surface of the screen of the touch panel display and a frictional force to be horizontally applied to the surface of the screen of the touch panel display, the touch position information acquiring unit acquires position information that is changed when the person traces along the screen of the touch panel display while touching, the torque calculating unit:

calculates a torque whose axis is horizontal to the surface of the screen of the touch panel display based on the force information about the pushing force to be vertically applied to the surface of the screen of the touch panel display and the position information acquired by the touch position information acquiring unit; and calculates a torque whose axis is vertical to the screen of the touch panel display based on the force information about the frictional force to be horizontally applied to the screen of the touch panel display and the position information acquired by the touch position information acquiring unit.

According to the above aspect, when the person performs a manipulation for tracing the screen of the touch panel display, namely, applying a frictional force, the adjustment of the stiffness enables the person to touch the touch panel display with the touch panel display unmoving to the tracing direction.

3rd aspect: The arm control apparatus according to the 2nd aspect, wherein the touch force information acquiring unit acquires the force information that changes such that:

(1) the pushing force is applied that vertically pushes to the surface of the screen of the touch panel display;

(2) the pushing force is applied that pushes vertically to the surface of the screen of the touch panel display and the frictional force is applied that is horizontally applied to the surface of the screen of the touch panel display; and (3) the force is not applied to the touch panel display, the touch position information acquiring unit acquires the position information that changes such that:

(1) the screen of the touch panel display is touched;

(2) a position on the screen of the touch panel display touched while being traced by the person changes in any direction; and (3) the person leaves the screen of the touch panel display, the stiffness parameter information generating unit generates the stiffness parameter that changes such that:

(1) the torque calculating unit calculates the torque whose axis is horizontal to the surface of the screen of the touch panel display based on the force for vertically pushing the surface of the screen of the touch panel display acquired by the touch force information acquiring unit, and the stiffness parameter information generating unit calculates the stiffness parameter of the arm based on the calculated torque so that the position and the orientation of the touch panel display do not change;

(2) the torque calculating unit calculates the torque whose axis is horizontal to the surface of the screen of the touch panel display and the torque whose axis is vertical to the surface of the screen of the touch panel display based on the force for vertically pushing the surface of the screen of the touch panel display and the frictional force horizontally applied to the touch panel display, and the stiffness parameter information generating unit calculates the stiffness parameter of the arm based on the calculated torque so that the position and the orientation of the touch panel display do not change; and (3) the stiffness parameter information generating unit calculates the stiffness parameter of the arm of a case where the force is not applied to the touch panel display.

According to the above aspect, when the person performs a page turning, the adjustment of the stiffness enables the person to touch the touch panel display with the touch panel display unmoving to the tracing direction.

4th aspect: The arm control apparatus according to the 2nd aspect, wherein the touch force information acquiring unit acquires the force information that changes such that:

(1) the pushing force is applied that pushes vertically to the surface of the screen of the touch panel display;

(2) the pushing force is applied that pushes vertically to the surface of the screen of the touch panel display and the frictional force is applied that is horizontally applied to the surface of the screen of the touch panel display; and (3) the force is not applied to the touch panel display, the touch position information acquiring unit acquires the position information that changes such that:

(1) the person multi-touches the screen of the touch panel display;

(2) positions on the screen of the touch panel display multi-touched by the person are shifted so as to be separated from each other; and (3) the person leaves the screen of the touch panel display, the stiffness parameter information generating unit generates the stiffness parameter that changes such that:

(1) the torque calculating unit calculates the torque whose axis is horizontal to the surface of the screen of the touch panel display based on the force for vertically pushing the surface of the screen of the touch panel display, and the stiffness parameter information generating unit calculates the stiffness parameter of the arm based on the calculated torque so that the position and the orientation of the touch panel display do not change;

(2) the torque calculating unit calculates the torque whose axis is horizontal to the surface of the screen of the touch panel display and the torque whose axis is vertical to the surface of the screen of the touch panel display based on the force for vertically pushing the surface of the screen of the touch panel display and the frictional force horizontally applied to the surface of the screen of the touch panel display, and the stiffness parameter information generating unit calculates the stiffness parameter of the arm based on the calculated torque so that the position and the orientation of the touch panel display do not change; and (3) the stiffness parameter information generating unit calculates the stiffness parameter of the arm of a case where the force is not applied to the touch panel display.

According to the above aspect, when the person performs an enlarging manipulation, the adjustment of the stiffness enables the person to touch the touch panel display with the touch panel display unmoving to the tracing direction.

5th aspect: The arm control apparatus according to the 2nd aspect, wherein the touch force information acquiring unit acquires the force information that changes such that:

(1) the pushing force is applied that pushes vertically to the surface of the screen of the touch panel display;

(2) the pushing force is applied that pushes vertically to the surface of the screen of the touch panel display and the frictional force is applied that is horizontally applied to the surface of the screen of the touch panel display; and (3) the force is not applied to the touch panel display, the touch position information acquiring unit acquires the position information that changes such that:

(1) the person multi-touches the screen of the touch panel display;

(2) positions on the screen of the touch panel display multi-touched by the person are shifted so as to come closer to each other; and (3) the person leaves the screen of the touch panel display, the stiffness parameter information generating unit calculates the stiffness parameter that changes such that:

(1) the torque calculating unit calculates the torque whose axis is horizontal to the surface of the screen of the touch panel display based on the force for vertically pushing the surface of the screen of the touch panel display, and the stiffness parameter information generating unit calculates the stiffness parameter of the arm based on the calculated torque so that the position and the orientation of the touch panel display do not change;

(2) the torque calculating unit calculates the torque whose axis is horizontal to the surface of the screen of the touch panel display and a torque whose axis is vertical to the surface of the screen of the touch panel display based on the force for vertically pushing the surface of the screen of the touch panel display and the frictional force horizontally applied to the surface of the screen of the touch panel display, and the stiffness parameter information generating unit calculates the stiffness parameter of the arm based on the calculated torque so that the position and the orientation of the touch panel display do not change; and (3) the stiffness parameter information generating unit generates the stiffness parameter of the arm of a case where a force is not applied to the touch panel display.

According to the above aspect, when the person performs a reducing manipulation, the adjustment of the stiffness enables the person to touch the touch panel display with the touch panel display unmoving to the tracing direction.

6th aspect: The arm control apparatus according to the 1st aspect, wherein the touch force information acquiring unit acquires force information about a pushing force vertically applied to a surface of the screen of the touch panel display and about a case where the force is not applied to the screen of the touch panel display, the touch position information acquiring unit acquires position information of a case where the person repeats touch on the screen of the touch panel display at a plurality of times, the stiffness parameter information generating unit generates the stiffness parameter that changes such that:

(1) the torque calculating unit calculates a torque whose axis is horizontal to the surface of the screen of the touch panel display based on the force information about the pushing force vertically applied to the surface of the screen of the touch panel display and the position information acquired by the touch position information acquiring unit, and the stiffness parameter information generating unit calculates the stiffness parameter of the arm based on the calculated torque so that the position and the orientation of the touch panel display do not change; and (2) when the force is not applied to the touch panel display, the torque calculating unit does not calculate the torque and the stiffness parameter information generating unit calculates the stiffness parameter of the arm.

According to the above aspect, when the person performs a manipulation for continuously touching the screen of the touch panel display, the adjustment of the stiffness enables the person to touch the touch panel display with the touch panel display unmoving to the touching direction.

7th aspect: The arm control apparatus according to the 2nd aspect, wherein the touch force information acquiring unit acquires the force information that changes such that:

(1) the pushing force is applied that is vertically applied to the surface of the screen of the touch panel display; and (2) no force is applied to the screen of the touch panel display, the touch position information acquiring unit acquires the position information that repeatedly changes at a plurality of times such that:

(1) the person touches the screen of the touch panel display; and (2) the person leaves the screen of the touch panel display, the stiffness parameter information generating unit generates the stiffness parameter that changes such that:

(1) the torque calculating unit calculates the torque whose axis is horizontal to the surface of the screen of the touch panel display based on the force for vertically pushing the surface of the screen of the touch panel display, and the stiffness parameter information generating unit calculates the stiffness parameter of the arm based on the calculated torque so that the position and the orientation of the touch panel display do not change; and (2) the stiffness parameter information generating unit calculates the stiffness parameter of the arm of a case where no force is applied to the screen of the touch panel display.

According to the above aspect, when the person performs a keyboard input manipulation, the adjustment of the stiffness enables the person to touch the touch panel display with the touch panel display unmoving to the touching direction.

8th aspect: The arm control apparatus according to the 1st aspect, further comprising:

a touch force displacement calculating unit that acquires force information from the touch force information acquiring unit and calculates a displacement of the force based on the acquired force information, wherein the stiffness parameter information generating unit generates the stiffness parameter of the arm so that the position and the orientation of the touch panel display change in a case where the displacement of the force exceeds a predetermined threshold value, and generates the stiffness parameter of the arm so that the position and the orientation of the touch panel display do not change in a case where the displacement of the force does not exceed the predetermined threshold value, based on the displacement of the force acquired from the touch force displacement calculating unit.

According to the above aspect, when a force displacement is large, the stiffness is adjusted so that the touch panel display moves. As a result, safety is secured also in a case where the person collides with the touch panel display.

9th aspect: The arm control apparatus according to the 1st aspect, further comprising:

a touch area calculating unit that acquires position information from the touch position information acquiring unit and calculates a touch area based on the acquired position information, wherein the stiffness parameter information generating unit generates the stiffness parameter of the arm so that the position and the orientation of the touch panel display change in a case where the touch area exceeds a predetermined threshold value, and generates the stiffness parameter of the arm so that the position and the orientation of the touch panel display do not change in a case where the touch area does not exceed the predetermined threshold value, based on the touch area acquired from the touch area calculating unit.

According to the above aspect, when a touch area is large, the stiffness is adjusted so that the touch panel display moves. As a result, the safety is secured also in the case where the person collides with the touch panel display.

10th aspect: The arm control apparatus according to the 1st aspect, further comprising:

a touch deciding unit that decides that contact occurs in a case where the contact is detected based on the position acquired by the touch position information acquiring unit and the contact is detected based on the force acquired by the touch force information acquiring unit, and decides that no contact occurs in other cases, wherein the stiffness parameter information generating unit generates the stiffness parameter information for controlling the arm so that the position and the orientation of the touch panel display do not change only in a case where the touch deciding unit decides that the contact occurs.

According to the above aspect, the touch deciding unit decides presence/non-presence of a touch, and only when the touch deciding unit decides that the touch is present, stiffness parameter information is generated by the stiffness parameter information generating unit so that the stiffness is high. For this reason, maneuverability of the touch panel display can be improved more reliably.

11th aspect: A robot comprising:

the arm control apparatus according to any one of claims 1-10 for controlling the arm; and the arm.

According to the above aspect, adjustment of the stiffness enables the touch panel display to be moved by light force at the time of moving the touch panel display, and stiffness can be adjusted so that the person can touch the touch panel display with the touch panel display unmoving to the pushing direction. For this reason, maneuverability of the touch manipulation is improved.

12th aspect: An arm control method for controlling a position and an orientation of a touch panel display, the method comprising:

acquiring a position on a screen of the touch panel display touched by a person through a touch position information acquiring unit, acquiring a force on the screen touched by the person through a touch force information acquiring unit;

calculating a torque to be applied to the touch panel display through a torque calculating unit based on the position acquired by the touch position information acquiring unit and the force acquired by the touch force information acquiring unit;

generating information about a stiffness parameter for controlling the arm through a stiffness parameter information generating unit so that the position and the orientation of the touch panel display do not change based on the torque calculated by the torque calculating unit; and controlling the arm through an arm control unit based on the information about the stiffness parameter generated by the stiffness parameter information generating unit.

According to the above aspect, adjustment of the stiffness enables the touch panel display to be moved by light force at the time of moving the touch panel display, and stiffness can be adjusted so that the person can touch the touch panel display with the touch panel display unmoving to the pushing direction. For this reason, maneuverability of the touch manipulation is improved.

13rd: A computer-readable recording medium including an arm control program for controlling a position and an orientation of a touch panel display, the program allows a computer to function as:

a touch position information acquiring unit that acquires a position on a screen of the touch panel display touched by a person;

a touch force information acquiring unit that acquires a force on the screen touched by the person;

a torque calculating unit that calculates a torque to be applied to the touch panel display based on the position acquired by the touch position information acquiring unit and the force acquired by the touch force information acquiring unit;

a stiffness parameter information generating unit that generates information about a stiffness parameter for controlling the arm so that the position and the orientation of the touch panel display do not change based on the torque calculated by the torque calculating unit; and an arm control unit that controls the arm based on the information about the stiffness parameter generated by the stiffness parameter information generating unit.

According to the above aspect, adjustment of the stiffness enables the touch panel display to be moved by light force at the time of moving the touch panel display, and stiffness can be adjusted so that the person can touch the touch panel display with the touch panel display unmoving to the pushing direction. For this reason, maneuverability of the touch manipulation is improved.

14th: An arm control integrated electronic circuit for controlling a position and an orientation of a touch panel display, the circuit configured to:

acquires a position on a screen of the touch panel display touched by a person through a touch position information acquiring unit;

acquires a force on the screen touched by the person through a touch force information acquiring unit;

calculates a torque to be applied to the touch panel display through a torque calculating unit based on the position acquired by the touch position information acquiring unit and the force acquired by the touch force information acquiring unit;

generates information about a stiffness parameter for controlling the arm through a stiffness parameter information generating unit so that the position and the orientation of the touch panel display do not change based on the torque calculated by the torque calculating unit; and controls the arm through an arm control unit based on the information about the stiffness parameter generated by the stiffness parameter information generating unit.

According to the above aspect, adjustment of the stiffness enables the touch panel display to be moved by light force at the time of moving the touch panel display, and stiffness can be adjusted so that the person can touch the touch panel display with the touch panel display unmoving to the pushing direction. For this reason, maneuverability of the touch manipulation is improved.

First Embodiment

Figure 1:
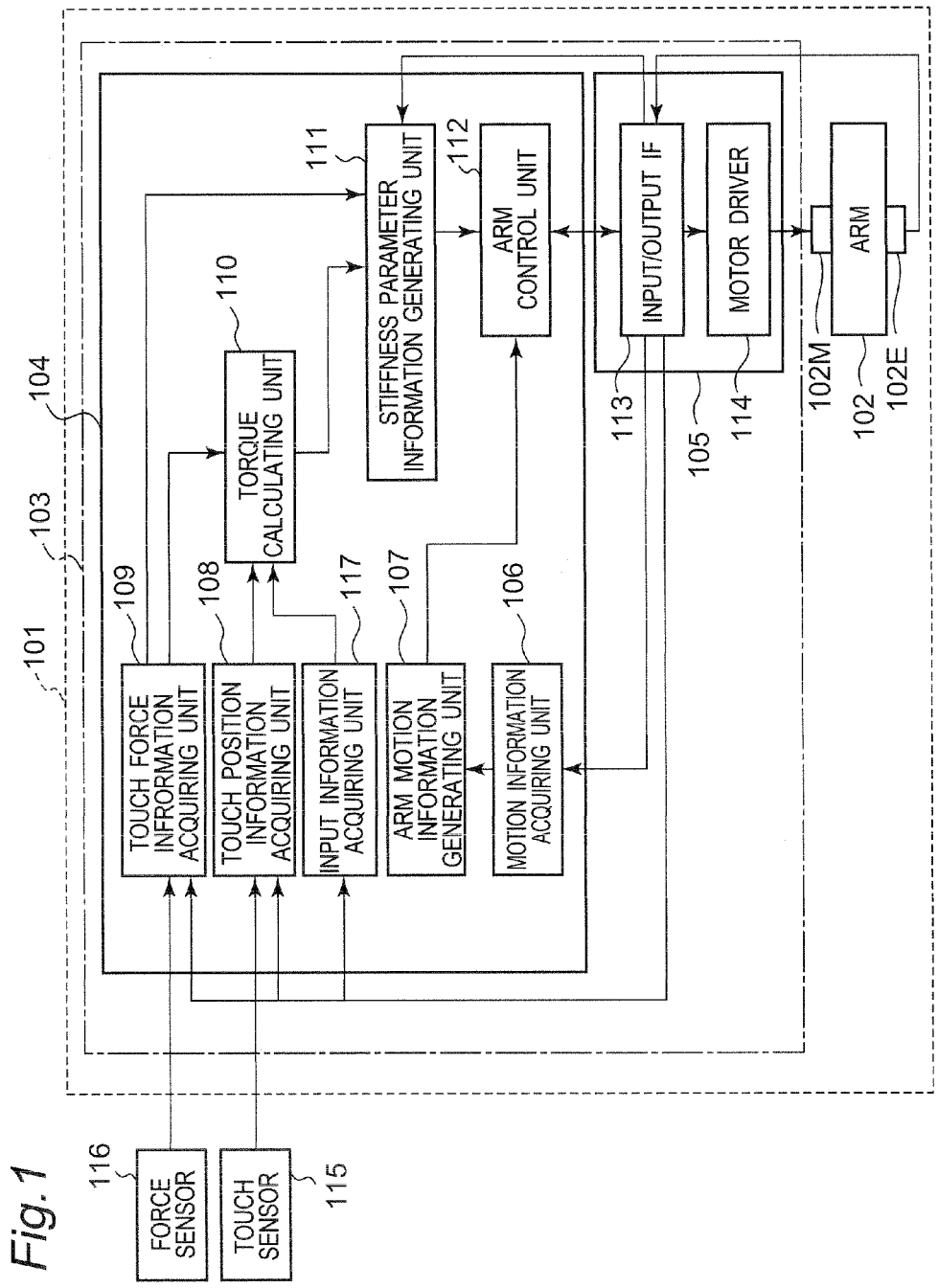
FIG. 1 is a block diagram illustrating a robot arm in a robot according to a first embodiment of the present disclosure.

FIG. 1 is a block diagram illustrating a robot 101 having an arm control apparatus 103 according to a first embodiment of the present disclosure. In FIG. 1, the robot 101 is composed of an arm 102, and a control apparatus 103 of the arm 102.

The control apparatus 103 of the arm 102 is a control apparatus of the arm for controlling a position and an orientation of a touch panel 303 as one example of the display device. The control apparatus 103 of the arm 102 includes at least a touch position information acquiring unit 108, a touch force information acquiring unit 109, a torque calculating unit 110, a stiffness parameter information generating unit 111, and an arm control unit 112.

A main constitution of the control apparatus 103 of the arm 102 is simply described below.

The touch position information acquiring unit 108 acquires a position on a screen 303*a* of the touch panel touched by the person.

The touch force information acquiring unit 109 acquires a force on the screen touched by the person.

The torque calculating unit 110 calculates a torque loaded on the touch panel based on the position acquired by the touch position information acquiring unit and the force acquired by the touch force information acquiring unit.

The stiffness parameter information generating unit 111 generates (calculates) information for controlling the arm so that the position and the orientation of the touch panel do not change based on the torque calculated by the torque calculating unit.

The arm control unit 112 controls the arm based on the information generated by the stiffness parameter information generating unit.

As a result, in order to prevent the touch panel display 303 from moving to the touching direction when the person 301 touches the touch panel display 303, the arm 102 is controlled so that the position of the touch panel display 303 is fixed at the touching time. Particularly in the first embodiment, a force applied to the touch panel display 303 and a position thereon are detected, and the stiffness is adjusted in a direction where the force (torque) is canceled, so that the arm 102 is controlled.

The first embodiment is described in detail below.

<Description about the Arm Control Apparatus>

The control apparatus 103 of the arm 102 is composed of a control apparatus main body 104 and a peripheral device 105.

<Description about the Control Apparatus Main Body>

The control apparatus main body 104 is composed of a motion information acquiring unit 106, an arm motion information generating unit 107, the touch position information acquiring unit 108, the touch force information acquiring unit 109, the torque calculating unit 110, the stiffness parameter information generating unit 111, the arm control unit 112, and an input information acquiring unit 117.

The peripheral device 105 is composed of an input/output IF (interface) 113 and a motor driver 114. Respective functions are described below.

The position information and orientation information about the arm 102 from the input/output IF 113, and time information from a timer built in the input/output IF 113 are input into the motion information acquiring unit 106. Further, the motion information acquiring unit 106 differentiates the position information acquired from the input/output IF 113 by the time information so as to acquire velocity information. Further, the motion information acquiring unit 106 differentiates the orientation information by the time information so as to acquire angular velocity information. FIG. 2 illustrates the time information, the position information, the orientation information, the velocity information, and the angular velocity information acquired by the motion information acquiring unit 106.

The motion information is information for generating motions of the arm 102 at a time of moving the arm 102, and is independent from a stiffness parameter, described later.

The motion information acquiring unit 106 outputs the acquired position information, orientation information, velocity information, angular velocity information about the arm 102, and time information to the arm motion information generating unit 107.

Figure 3A:
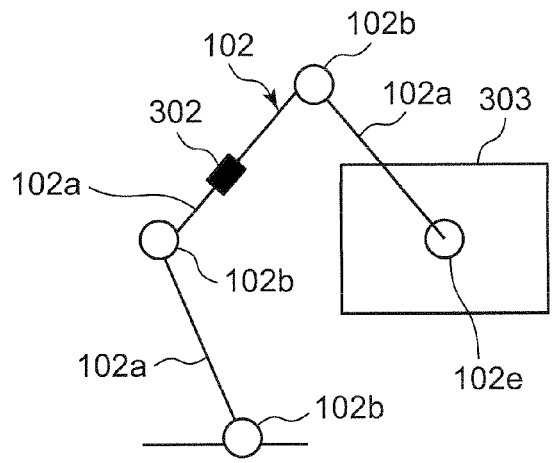
FIG. 3A is an explanatory view illustrating an arm movement in the robot according to the first embodiment of the present disclosure.
Figure 3B:
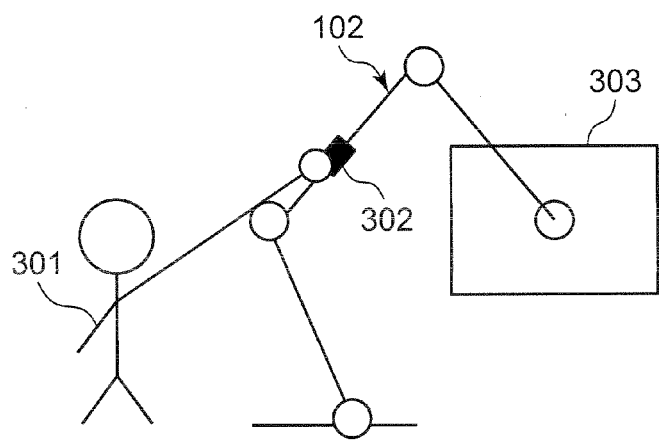
FIG. 3B is an explanatory view illustrating an arm movement in the robot according to the first embodiment of the present disclosure.
Figure 3C:
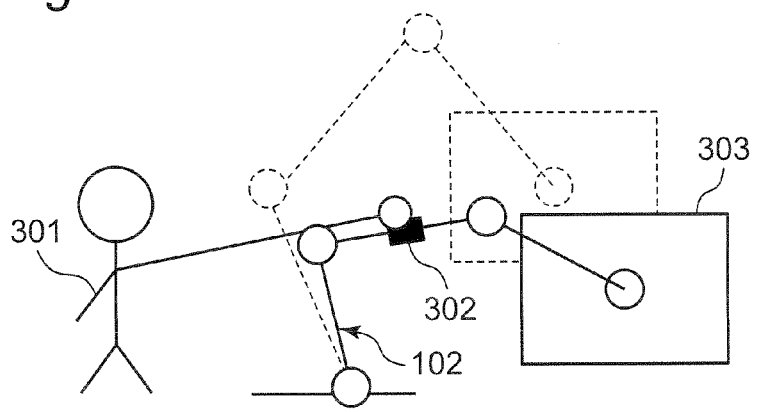
FIG. 3C is an explanatory view illustrating an arm movement in the robot according to the first embodiment of the present disclosure.

The arm motion information generating unit 107 acquires the position information, the orientation information, the velocity information, the angular velocity information about the arm 102, and the time information from the motion information acquiring unit 106. The arm motion information generating unit 107 generates motion information for moving the arm 102 based on the acquired information. The motion information is generated when the person 301 directly touches the arm 102 and moves the arm 102. In order that the person 301 moves the arm 102 (see FIG. 3B), the stiffness of the arm 102 is helpful to be set low. For example, a force sensor is attached to the arm 102, and the arm motion information generating unit 107 multiplies a strength of a force applied to the arm 102 from the person 301 by a gain so as to derive a moving amount of the arm 102. At this time, a value of the gain is increased by the arm motion information generating unit 107 so that the arm 102 can be moved by a light force. FIG. 3A illustrates one example where the force sensor 302 is attached to the arm 102. Further, FIG. 3B and FIG. 3C illustrate an example where the person 301 applies a force to the force sensor 302 to move the arm 102. Here, the arm 102 is composed of three arm members 102*a* and four rotary joint portions 102*b*, and the touch panel display 303 as one example of the display device is disposed at a distal end of the arm 102 via the rotary joint portion 102*b*. The force sensor 302 is disposed on the middle arm member 102*a* of the three arm members 102*a*. When the person 301 directly grips the force sensor 302 or makes contact with any arm member 102*a* of the three arm members 102*a*, while the force sensor 302 detects the force, the arm 102 is moved.

Further, when the force sensor 302 detects that the person 301 contacts with a portion other than a display portion (screen) 303*a* (see FIG. 5B) of the touch panel display 303 or the arm 102, the stiffness parameter information generating unit 111 sets the stiffness low. For this reason, the arm 102 can be moved with a light force. Therefore, an impact force applied to the person 301 at the collision time can be reduced.

In this manner, when the person 301 makes contact with a portion other than the display portion 303*a* of the touch panel display 303, the stiffness parameter information generating unit 111 sets the stiffness of the arm 102 low.

As one example of the generation of the motion information in the arm motion information generating unit 107, motion information about the motions shown in FIG. 4A to FIG. 4D is generated.

Figure 4A:
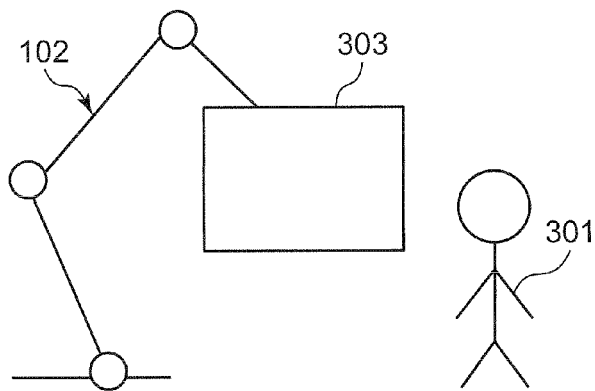
FIG. 4A is an explanatory view illustrating generation of the motion information in the robot according to the first embodiment of the present disclosure.

In FIG. 4A, the person 301 touches neither the arm 102 nor the touch panel display 303, and neither the arm 102 nor the touch panel display 303 moves.

Figure 4B:
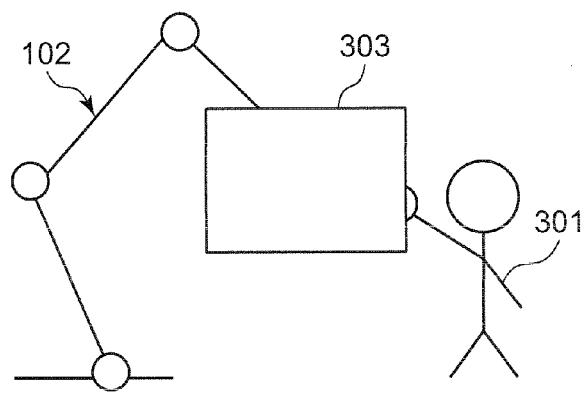
FIG. 4B is an explanatory view illustrating generation of the motion information in the robot according to the first embodiment of the present disclosure.

In FIG. 4B, the person 301 touches the touch panel display 303, and applies a force to the arm 102 via the touch panel display 303 in a direction where the touch panel display 303 is desired to be moved.

Figure 4C:
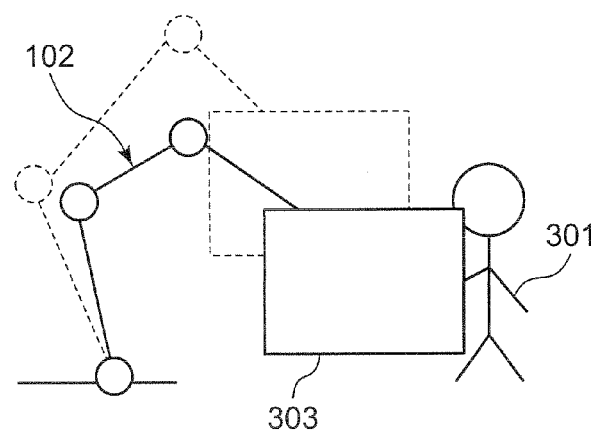
FIG. 4C is an explanatory view illustrating generation of the motion information in the robot according to the first embodiment of the present disclosure.

In FIG. 4C, the touch panel display 303 is moving via the arm 102 to a direction where the person 301 desires to move the touch panel display 303.

Figure 4D:
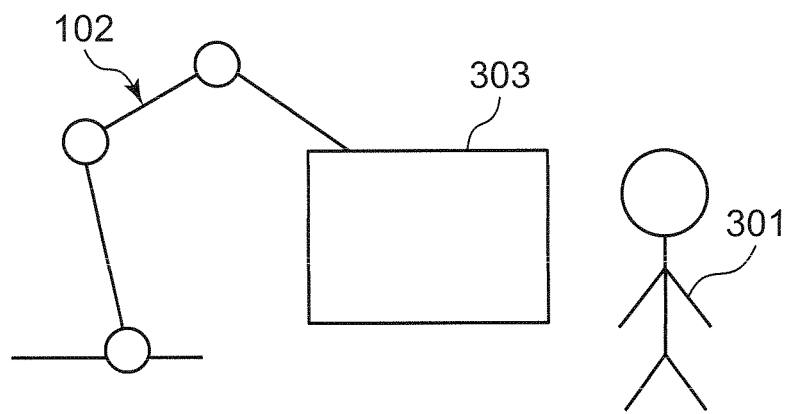
FIG. 4D is an explanatory view illustrating generation of the motion information in the robot according to the first embodiment of the present disclosure.

In FIG. 4D, movements of the arm 102 and the touch panel display 303 are completed, the person 301 touches neither the arm 102 nor the touch panel display 303, and neither the arm 102 nor the touch panel display 303 moves.

The method for generating the motion information includes any methods such as a remote moving method using a remote control unit such as a pendant, and a moving method by teaching a motion in advance, in addition to a method in which the person 301 directly touches the arm 102 or the touch panel display 303 to generate the motion information.

The arm motion information generating unit 107 outputs the generated position information, orientation information, velocity information, angular velocity information about the arm 102, and time information as the motion information to the arm control unit 112. The motion information and the time information to be output are information similar to the information shown in FIG. 2.

Figure 5A:
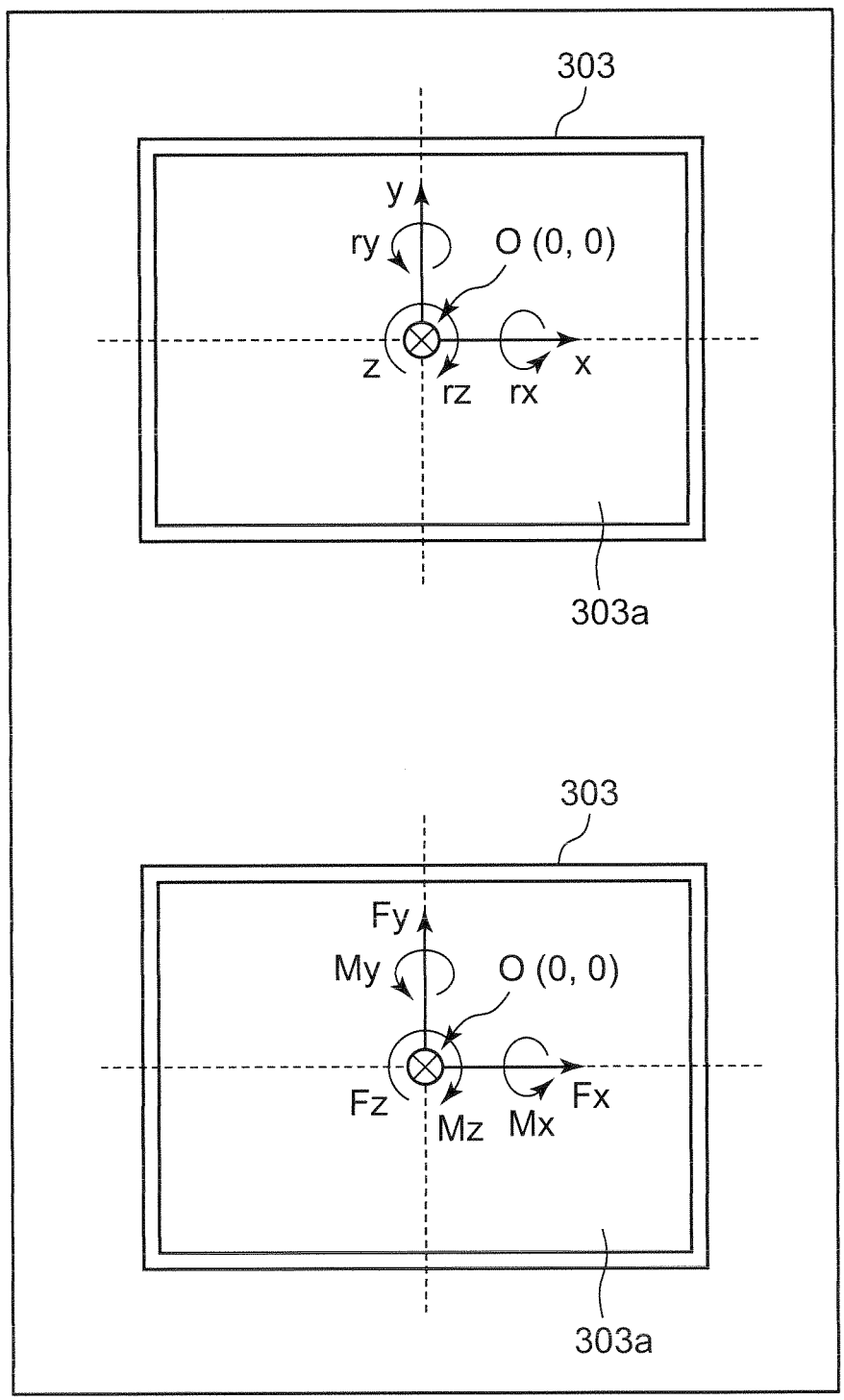
FIG. 5A is an explanatory view illustrating a coordinate system of a touch panel display in the robot according to the first embodiment of the present disclosure.
Figure 5B:
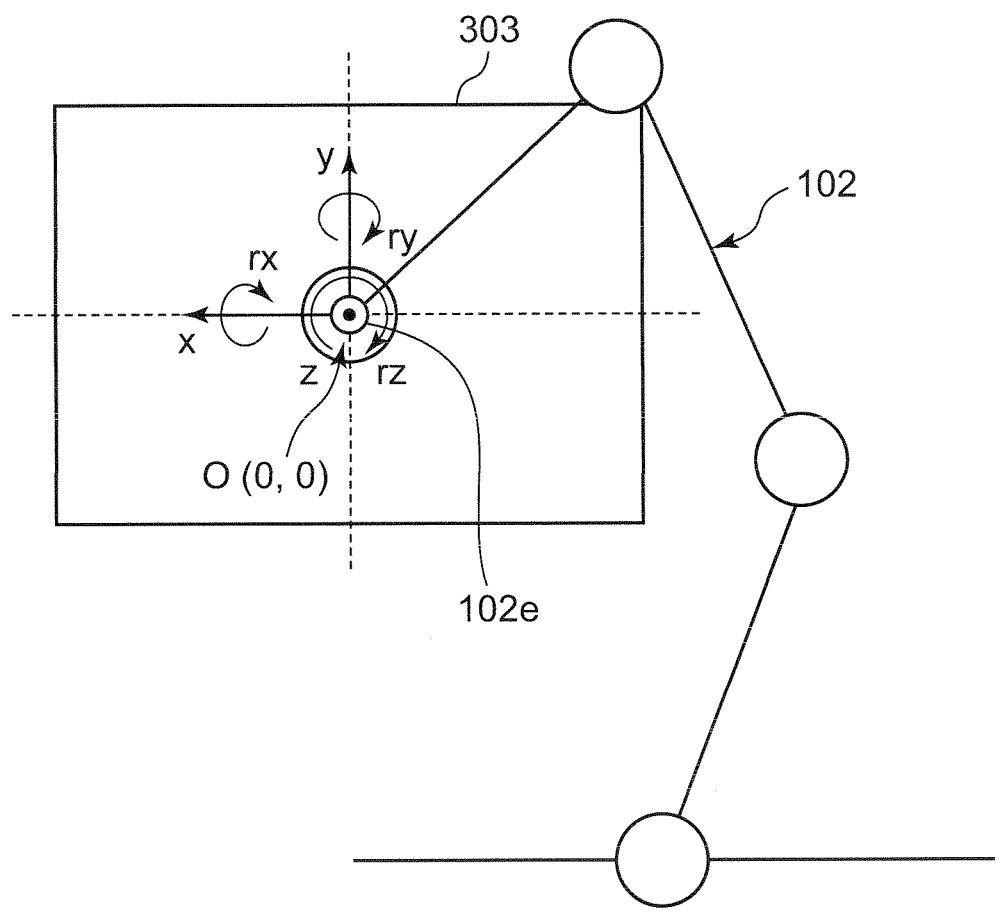
FIG. 5B is an explanatory view illustrating the coordinate system of the touch panel display in the robot according to the first embodiment of the present disclosure.

A touch sensor 115 is attached to the display portion 303a of the touch panel display 303, and the touch sensor 115 detects a touched position (touch position) according to a coordinate system in FIG. 5A. FIG. 5A and FIG. 5B illustrate a coordinate system of the touch panel display 303 and a coordinate system of an arm tip portion 102e of the arm 102. In the coordinate system of the display portion 303a of the touch panel display 303, as shown in FIG. 5A, a center portion is an origin O (0, 0). Further, the arm tip portion (an attachment portion of the touch panel display 303) 102e at the distal end of the arm 102 is attached to a center portion on a rear surface of the touch panel display 303 as shown in FIG. 5B. The setting in the coordinate system or the attachment of the arm tip portion 102e of the arm 102 can be carried out by any methods.

The touch sensor 115 is realized by, for example, using an electrostatic capacity type touch panel.

The touch position information (contact position) detected by the touch sensor 115 is output from the touch sensor 115 to the touch position information acquiring unit 108. The touch position information detected by the touch sensor 115 is information shown in FIG. 6. A touched case is indicated by 1, and an untouched case is indicated by 0.

Figure 7A:
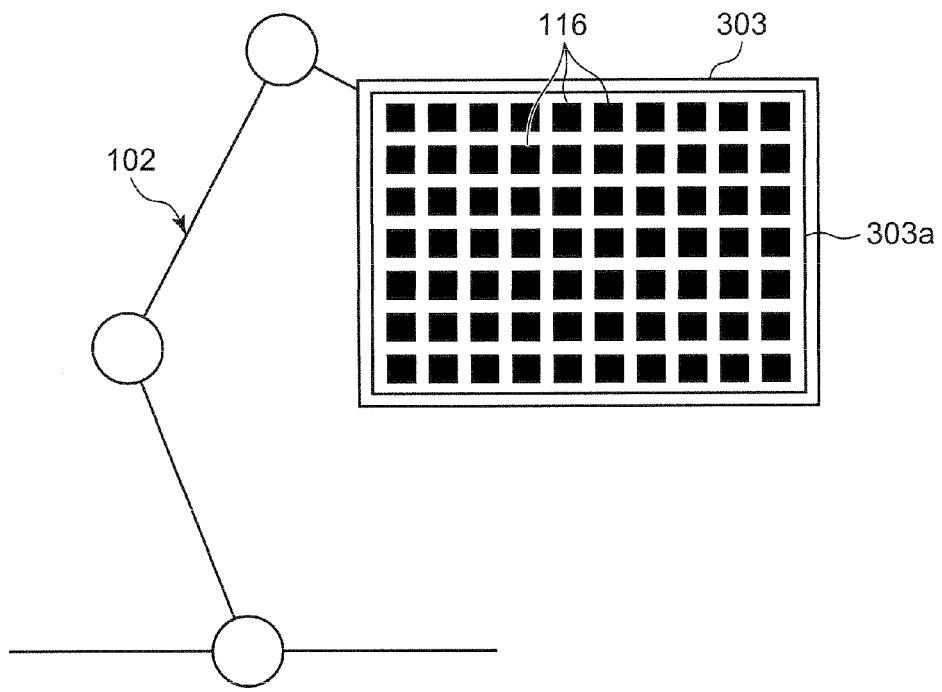
FIG. 7A is an explanatory view illustrating a method for attaching a force sensor in the robot according to the first embodiment of the present disclosure.
Figure 7B:
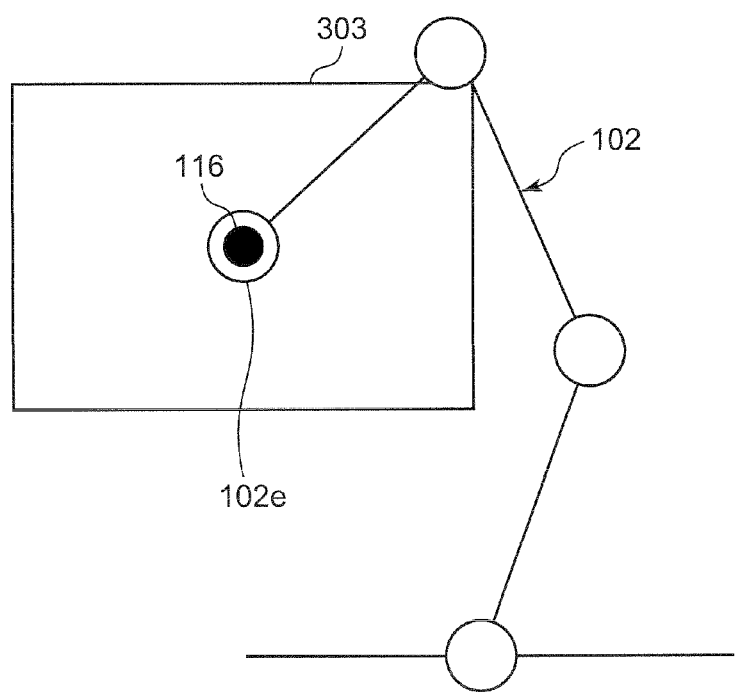
FIG. 7B is an explanatory view illustrating a method for attaching a force sensor in the robot according to the first embodiment of the present disclosure.

A force sensor 116 is attached to the display portion 303a of the touch panel display 303, and measures a force to be applied to the display portion 303a on a touched (contact) position. According to the coordinate system in FIG. 5A, forces of an x axis, a y axis, and a z axis are measured. As the force sensor 116, any one of one-axis to 6-axis force sensors can be also used. An example of the attachment of the force sensor 116 includes a method for attaching a lot of the force sensors 116 to the display portion 303a of the touch panel display 303 as shown in FIG. 7A in a matrix pattern, and a method for attaching the force sensor 116 to the arm tip portion 102e of the arm 102 as shown in FIG. 7B.

The force sensor 116 is realized by using, for example, a strain gauge type force sensor.

The force information measured by the force sensor 116 is output to the touch force information acquiring unit 109.

The touch position information from the touch sensor 115, and the time information from the timer built in the input/output IF 113 are input into the touch position information acquiring unit 108 at every predetermined time (for example, every 1 sec). In addition, for example, when the touch position information acquiring unit 108 acquires the touch position information, the touch position information and time information may be input into the touch position information acquiring unit 108. The touch position information input into the touch position information acquiring unit 108 is information shown in FIG. 6. The contact case is indicated by 1, and the non-contact case is indicated by 0.

The touch position information acquiring unit 108 can acquire the touch position information also from the touch sensor 115 via the input/output IF 113.

The touch position information and the time information acquired by the touch position information acquiring unit 108 are output to the stiffness parameter information generating unit 111 via the torque calculating unit 110.

Touch force information (contact force information) from the force sensor 116 and the time information from the timer built in the input/output IF 113 are input into the touch force information acquiring unit 109. The touch force information to be input is information shown in FIG. 8. As to the coordinate system of the touch force information, according to the coordinate system in FIG. 5A, forces Fx and Fy in x- and y-axial directions represent frictional forces with respect to the display portion 303a of the touch panel display 303, and a force Fz in a z-axial direction represents a force in a z-direction where the display portion 303a of the touch panel display 303 is pushed vertically. The forces Fx, Fy, and Fz represent the frictional forces to be horizontally applied to a surface of the screen 303a, and the pushing force to be vertically applied to the surface of the screen 303a. Further, torques Mx, My, and Mz represent torques whose axes are horizontal to the surface of the screen 303a, and a torque whose axis is vertical to the surface of the screen 303a.

The touch force information acquiring unit 109 can also acquire the touch force information from the force sensor 116 via the input/output IF 113.

The touch force information and the time information acquired by the touch force information acquiring unit 109 are output to the stiffness parameter information generating unit 111 via the torque calculating unit 110.

The torque calculating unit 110 acquires the touch position information and the time information from the touch position information acquiring unit 108, and acquires the touch force information and the time information from the touch force information acquiring unit 109.

The torque calculating unit 110 calculates a magnitude of the torque applied to the touch panel display 303 using the touch position information and touch force information that are acquired.

Figure 9:
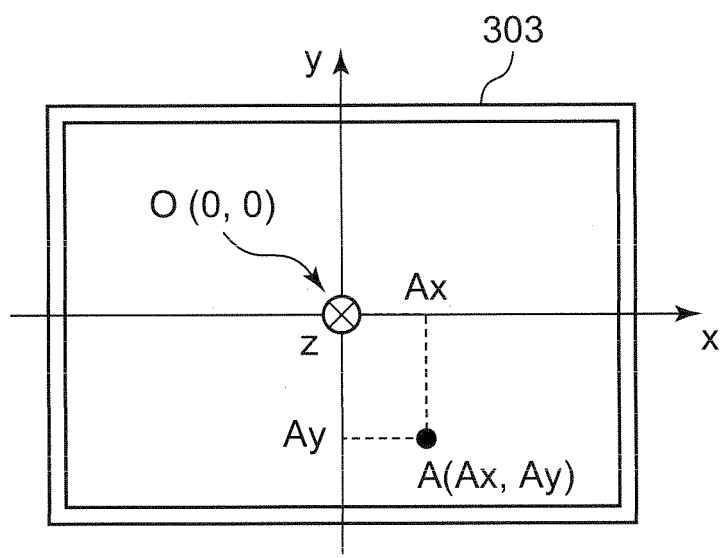
FIG. 9 is an explanatory view illustrating torque calculation in the robot according to the first embodiment of the present disclosure.

A method for generating an axis (see FIG. 5A) of the rotational direction of (rx, ry) is described. Symbol rx represents a direction of the rotation about the x axis, symbol ry represents a direction of the rotation about the y axis, and symbol rz represents a direction of the rotation about the z axis. Both the acquired touch position information and touch force information (only Fz) are used for the rotational directions. When the force Fz is applied to any position A (Ax, Ay) shown in FIG. 9, the torque about x axis is expressed by $Mx=-Ay \cdot Fz$ and the torque about y axis is expressed by $My=Ax \cdot Fz$. For example, when a force of 0.5 N is applied to a position (4 mm, 3 mm) in the z-axial direction, the torque Mx is $-1.5$ Nmm ($=-0.5$ N$\times$3 mm) and the torque My is $+2.0$ Nmm ($=0.5$ N$\times$4 mm). Details are described later.

The method for generating an axis of a rz direction (see FIG. 5A) is described. Both the acquired touch position information (x, y) and touch force information (Fx, Fy) are used in the torque calculating unit 110 for the rotational directions.

The torque Mz of the rz-directional axis to be obtained by the torque calculating unit 110 is expressed by $y \cdot Fx - x \cdot Fy$. The method for obtaining the magnitude of the torque in the torque calculating unit 110 is expressed by $Mz=Ay \cdot Fx - Ax \cdot Fy$ when the forces Fx and Fy are applied to the position A (Ax, Ay) shown in FIG. 9.

The torque calculating unit 110 outputs the torque information calculated by the torque calculating unit 110 and time information to the stiffness parameter information generating unit 111.

As shown in FIG. 7B, when a six-axis sensor is attached as one example of the force sensor 116 to the arm tip portion 102e on a position of the center portion on a rear surface of the touch panel display 303, the force sensor 116 can detect information about a three-axis force and information about a three-axis torque. For this reason, the torque calculating unit 110 does not have to be used.

The stiffness parameter information generating unit 111 acquires the touch force information and the time information from the touch force information acquiring unit 109, and acquires the torque information and the time information from the torque calculating unit 110.

The stiffness parameter information generating unit 111 generates the stiffness parameter information about the arm 102 based on the acquired touch force information and torque information so that the orientation of the touch panel display 303 does not change when the person 301 touches the touch panel display 303. To generate the stiffness parameter information about the arm 102 so that the orientation of the touch panel display 303 does not change means concretely to set the stiffness high so that the orientation does not change. Details are described later.

The stiffness parameter information is information about the stiffness parameters of respective axes (x, y, z, rx, ry, rz) in the arm tip portion (an attachment portion of the touch panel display 303) 102e of the arm 102. Symbol rx represents a direction of the rotation about the x axis, symbol ry represents a direction of the rotation about the y axis, and symbol rz represents a direction of the rotation about the z axis. This value is changed by the stiffness parameter information generating unit 111, so that the stiffness of the arm tip portion 102e of the arm 102 can be changed. As a result, the stiffness at the time when the person 301 touches the touch panel display 303 can be adjusted by the stiffness parameter information generating unit 111. Further, as shown in FIG. 5A and FIG. 5B, two kinds of the coordinate systems including a coordinate system of the display portion 303a of the touch panel display 303, and a coordinate system of the arm tip portion 102e of the arm 102 are present. The stiffness parameter information for the coordinate system is generated by the stiffness parameter information generating unit 111 based on the coordinate system of the display portion 303a of the touch panel display 303. Also when the coordinate system of the arm tip portion 102e of the arm 102 and the coordinate system of the touch panel display 303 are different from each other, the stiffness of the display portion 303a of the touch panel display 303 can be changed at any time by the stiffness parameter information generating unit 111. Further, as to the stiffness parameter information, an initial value of the stiffness is set low, and only when the stiffness of the arm 102 is to be changed, the stiffness is changed by the stiffness parameter information generating unit 111.

The heightened stiffness is set into low level in the stiffness parameter information generating unit 111 when the power of the touch panel display 303 (for example, as described later, on/off switching information about the power of the touch panel display 303 to be input by using an input/output IF 114) is turned off, or when the person 301 does not touch the display portion 303a.

The method for generating the stiffness parameter information in the stiffness parameter information generating unit 111 is described.

First, the method for generating an axis (see FIG. 5A) in a translation direction of (x, y, z) is described. In the translation direction, in the touch force information acquired by the stiffness parameter information generating unit 111, the stiffness parameter information generating unit 111 increases a feedback gain of a motor 102M for controlling the arm 102 so that the stiffness of the axis to which a force is applied is heightened. As one example where the stiffness is heightened, it is assumed that the control apparatus is constituted so that when a force of 1.0 N is applied in the z direction before the person 301 applies a force through touching of the touch panel display 303, the touch panel display 303 moves by 20 mm due to low stiffness (as a comparative example, the constitution is similar to that of the arm control apparatus 103 of the first embodiment and only the constitution of the stiffness adjustment is different). That is, in this comparative example, as one example, a coefficient of the stiffness is 1.0/20=0.05 N/mm. In this state, every time when the person 301 touches the touch panel display 303 to input, the touch panel display 303 moves to the z direction. Therefore, in the arm control apparatus 103 of the first embodiment, the feedback gain of the motor 102M for control in the z direction is increased by the stiffness parameter information generating unit 111 so that the stiffness of the arm 102 is heightened. For example, the stiffness parameter information generating unit 111 changes the stiffness of the arm 102 so that a movement amount of the touch panel display 303 is within 5 mm when a force of 2.0 N is applied in the z direction. As a result, in this example, the coefficient of the stiffness is 2.0/5=0.4 N/mm. That is, to set the stiffness high in the stiffness parameter information generating unit 111 means that the touch panel display 303 is made hard to be moved in the direction where the person 301 pushes the touch panel display 303. When the stiffness is set higher in the stiffness parameter information generating unit 111, the touch panel display 303 moves along a shorter distance than the case where the stiffness is set low even when the touch panel display 303 is pushed with the same force. In both the cases, when the person 301 does not make contact with the touch panel display 303, the touch panel display 303 does not move.

When forces are applied to a plurality of positions on the display portion 303a, the stiffness parameter information generating unit 111 sets the stiffness high relative to the forces detected on the respective positions. When forces in the same direction are applied to the plurality of positions, the stiffness parameter information generating unit 111 sets the stiffness high relative to the strongest force. In another method, when forces are applied to the plurality of positions, the stiffness parameter information generating unit 111 sets the stiffness high relative to the strongest force and sets the stiffness high relative to a resultant force of the forces on the plurality of positions.

A method for generating an axis (see FIG. 5A) of the rotational direction of (rx, ry) is described. As the rotational direction, both the acquired touch position information and touch force information (only Fz) are used in the stiffness parameter information generating unit 111. As to the position (+x, +y) where the force is applied in the z-axial direction, the stiffness parameter information generating unit 111 sets the stiffness in a +ry direction high for +x, and the stiffness parameter information generating unit 111 sets the stiffness in a −rx direction high for +y. This enables the person 301 to perform the touch manipulation on the display portion 303a while the touch panel display 303 is prevented from rotating to the touch direction.

The torque calculating unit 110 calculates the magnitude of the torque to be applied to the touch panel display 303 by the person 301 in a manner that the magnitude (Fz) of the force in the z-axial direction is multiplied by a distance from the origin O to the touch position. When the force Fz is applied to the position A (Ax, Ay) shown in FIG. 9, the torques are expressed by Mx=−Ay·Fz and My=Ax·Fz. For example, when a force of 0.5 N is applied to a position (4 mm, 3 mm) in the z-axial direction, the torque Mx is −1.5 Nmm (=−0.5 N×3 mm) and the torque My is +2.0 Nmm (=0.5 N×4 mm).

As one example of a method of setting the stiffness high, it is assumed the control apparatus is constituted so that when a force of 1.0 N is applied in the z direction to the position (100 mm, 0 mm) before the person 301 applies a force through touching of the touch panel display 303, the touch panel display 303 moves by 0.2 rad due to low stiffness (as a comparative example, the constitution is similar to that of the arm control apparatus 103 of the arm in the first embodiment and only the constitution of the stiffness adjustment is different). That is, in this comparative example, the coefficient of the stiffness is 1.0×100.0/0.2=500 Nmm/rad. In this state, every time when the person 301 performs touch input on the touch panel display 303, the touch panel di splay 303 moves to the ry direction. Therefore, in the arm control apparatus 103 in the first embodiment, the stiffness parameter information generating unit 111 increases the feedback gain of the motor 102M for controlling the ry direction, so as to heighten the stiffness. For example, the stiffness is changed so that the movement amount of the touch panel display is within 0.05 rad when the force of 2.0 N is applied to the position (100 mm, 0 mm) in the z direction. As a result, the coefficient of the stiffness is made to be 2.0×100.0/0.05=4000 Nmm/rad.

When the forces of the z direction are applied to the plurality of positions, the torques Mx and My are respectively obtained, and the stiffness is set high by the stiffness parameter information generating unit 111 so as to be capable of withstanding the torques on the respective positions. In another, manner, when the torques of the same direction are applied to the plurality of positions, the stiffness is set high by the stiffness parameter information generating unit 111 so as to be capable of withstanding the largest torque. The present disclosure can employ another method, namely, both a method in which the stiffness parameter information generating unit 111 sets high stiffness so as to withstand the largest torque when the forces of the z direction are applied to the plurality of positions, and a method in which the stiffness parameter information generating unit 111 sets high stiffness so as to withstand the resultant force of the torques on the plurality of positions.

The method for generating an axis of a rz direction (see FIG. 5A) is described. As to the rotational direction, both the acquired touch position information (x, y) and touch force information (Fx, Fy) are used in the stiffness parameter information generating unit 111.

The torque Mz at the axis of in rz direction obtained by the stiffness parameter information generating unit 111 is expressed by y·Fx−x·Fy. The magnitude of the torque is obtained by the torque calculating unit 110 according to Mz=Ay·Fx−Ax·Fy when the forces Fx and Fy are applied to the position A (Ax, Ay) shown in FIG. 9.

As one example of a method of setting the stiffness high in the stiffness parameter information generating unit 111, it is assumed that the control apparatus is constituted so that when a force of 1.0 N is applied in the x-axial direction and the force of 2.0 N is applied in the y-axial direction to the position (100 mm, 50 mm) before the person 301 applies a force through touching of the touch panel display 303, the touch panel display 303 moves by 0.2 rad due to low stiffness (as a comparative example, the constitution is similar to that of the control apparatus 103 of the arm in the first embodiment and only the constitution of the stiffness adjustment is different). That is, in this comparative example, the coefficient of the stiffness is (50×1.0−100×2.0)/0.2=−750 Nmm/rad. In this state, every time when the person 301 touches the touch panel display 303 to input, the touch panel display 303 moves to the −rz direction. Therefore, in the arm control apparatus 103 of the arm in the first embodiment, the feedback gain of the motor 102M for control in the −rz direction is increased by the stiffness parameter information generating unit 111 so that the stiffness is heightened. For example, the stiffness parameter information generating unit 111 changes the stiffness so that the movement amount of the touch panel display is within 0.05 rad when the force of 1.0 N is applied to the position (100 mm, 50 mm) in the x-axial direction and the force of 2.0 N is applied in the y-axial direction. As a result, the coefficient of the stiffness is made to be (50×1.0−100×2.0)/0.05=−3000 Nmm/rad.

When the torque Mz is applied to the plurality of positions, the torque Mz is obtained by the torque calculating unit 110, and the stiffness parameter information generating unit 111 sets the stiffness high relative to the torques on the respective positions. In another manner, when the torque is applied in the same direction to the plurality of positions, the stiffness parameter information generating unit 111 sets the stiffness high relative to the largest torque. The present disclosure can employ another method, namely, both a method in which the stiffness is set high relative to the largest torque by the stiffness parameter information generating unit 111 when the torque Mz is applied to the plurality of positions, and a method in which the stiffness is set high relative to the resultant force of the torques on the plurality of positions by the stiffness parameter information generating unit 111.

Figure 10:
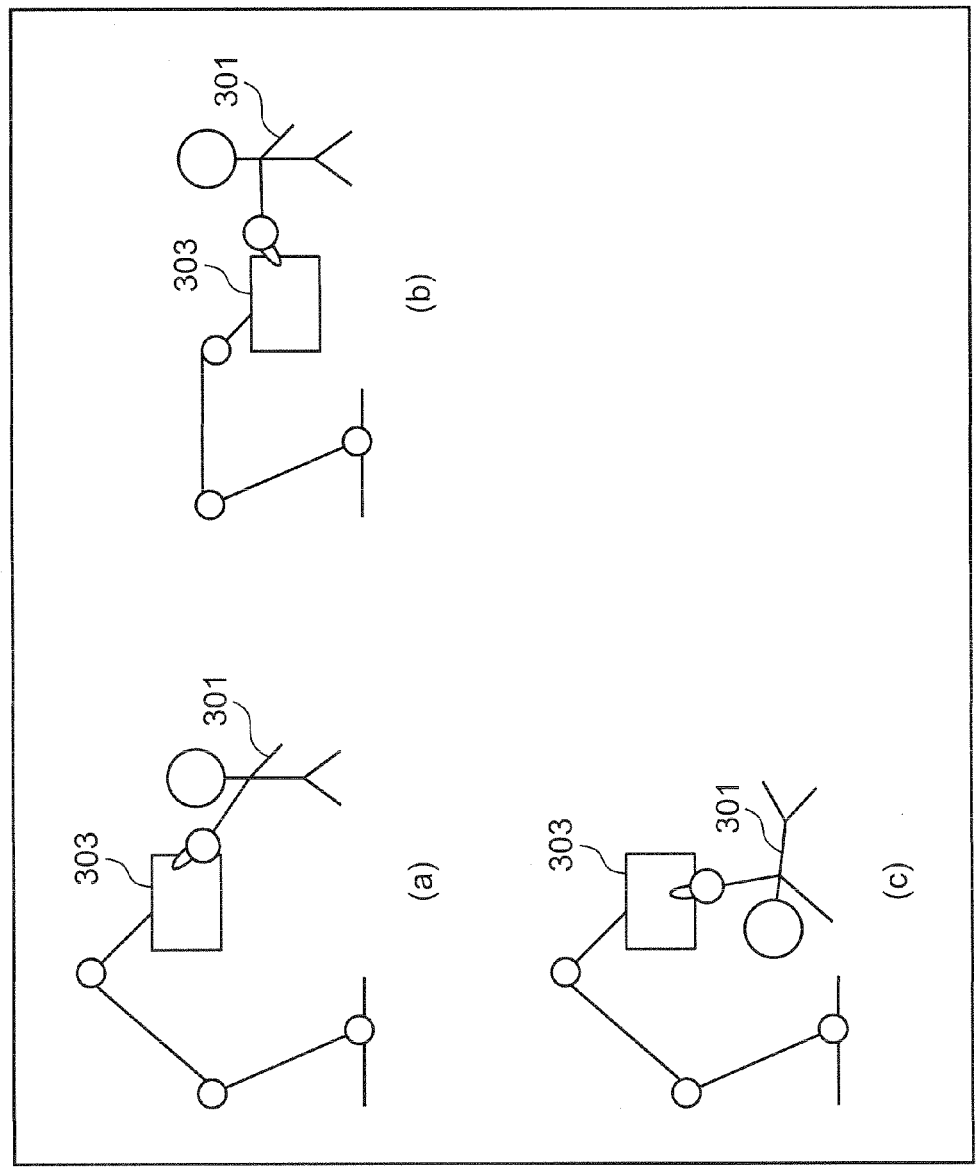
FIG. 10 is an explanatory view illustrating a positional relationship between a person and the touch panel display in the robot according to the first embodiment of the present disclosure.

Further, as shown in FIG. 10, even in the same touching manipulation or the keyboard manipulation, the force to be applied to the touch panel display 303 varies depending on a positional relationship between the person 301 and the touch panel display 303. Therefore, an adjustment amount of the stiffness is helpful to be changed by the stiffness parameter information generating unit 111 in advance according to environments where the touch panel display 303 with the arm is used. As one example of the adjusting method, the person 301 can input the adjusting amount of the stiffness into the stiffness parameter information generating unit 111 using the input/output IF 113. Further, when the stiffness is to be set low by the stiffness parameter information generating unit 111, the stiffness is set by the stiffness parameter information generating unit 111 so that the touch panel display 303 does not fall down under an influence of gravity.

A concrete example of the manipulation to be performed on the touch panel display 303 as one example of the display device by the person 301 is described below. As the manipulation to be performed on the touch panel display by the person 301, five manipulations including "touch", "page turning", "enlargement", "reduction", and "keyboard input" to be performed are described as an example.

<<Touch>>

Figure 11A:
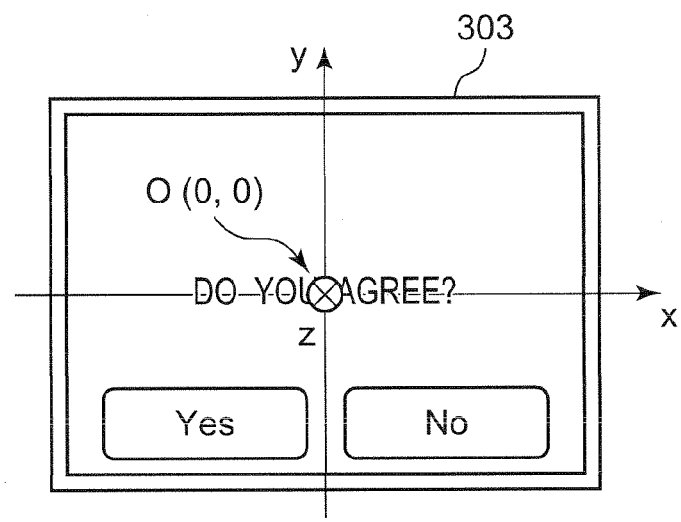
FIG. 11A is an explanatory view illustrating stiffness parameter information generation (touch) in the robot according to the first embodiment of the present disclosure.
Figure 11B:
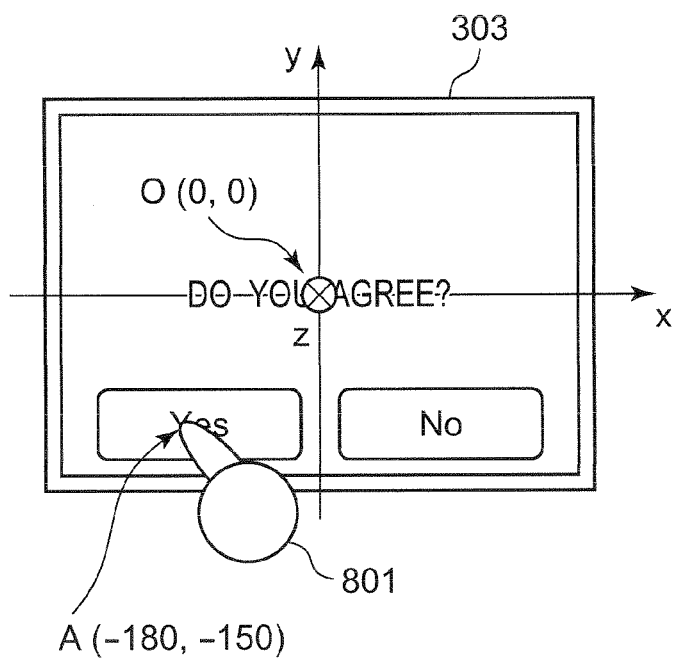
FIG. 11B is an explanatory view illustrating the stiffness parameter information generation (touch) in the robot according to the first embodiment of the present disclosure.

The touch manipulation is a motion for touching the display portion 303a (contacting with the display portion 303a) of the touch panel display 303 by the person 301 with the finger 701 or the like. As shown in FIG. 11A, an example is described by using contents selected by the person 301 through the touch manipulation (selection of Yes or No). In FIG. 11A, as contents information, a question "Do you agree?" is displayed on the center of the display portion 303a, and two buttons "Yes" and "No" are displayed as a response to this question below the question. As shown in FIG. 11B, the stiffness parameter information generating unit 111 generates the stiffness parameter information in a case of touching the position A (−180 mm, −150 mm) with a hand (finger) 701. As one example, the person's hand 701 applies a force of +1.0 N in the z direction. That is, the touch position information acquiring unit 108 acquires information shown in FIG. 11C as the touch position information, and the touch force information acquiring unit 109 acquires information shown in FIG. 11D as the touch force information.

The method in which the stiffness parameter information generating unit 111 sets the stiffness high at this time is described.

As to the translation direction, since the force of 1.0 N is applied in the z direction, the stiffness parameter information generating unit 111 increases the feedback gain of the motor 102M for controlling the arm 102 so that the stiffness in the z direction is heightened. In is assumed that the control apparatus is constituted so that when the force of 1.0N is applied in the z direction before the person 301 applies the force through the touching of the touch panel display 303, the touch panel display 303 moves by 20 mm due to the low stiffness (as a comparative example, the constitution is similar to that of the arm control apparatus 103 in the first embodiment, and only constitution of the stiffness adjustment is different). That is, in this comparative example, the coefficient of the stiffness is 1.0/20=0.05 N/mm. In this state, every time when the person 301 touches the touch panel display 303 to input, the touch panel display 303 moves to the z direction. Therefore, in the arm control apparatus 103 of the first embodiment, the stiffness parameter information generating unit 111 increases the feedback gain of the motor 102M for control in the z direction, so that the stiffness is heightened. For example, the stiffness parameter information generating unit 111 changes the stiffness so that the movement amount of the touch panel display 303 is within 5 mm when the force of 2.0 N is applied in the z direction. As a result, the coefficient of the stiffness is made to be 2.0/5=0.4 N/mm.

Similarly, as to the rotational direction of (rx, ry), since the force of 1.0 N is applied in the z direction to the position A (−180 mm, −150 mm), the stiffness parameter information generating unit 111 increases the stiffness in a rx rotational direction, and the stiffness parameter information generating unit 111 increases the stiffness in a ry rotational direction.

Therefore, in this touch manipulation, the arm control apparatus 103 operates as follows.

The touch force information acquiring unit 109 acquires information about a pushing force Fz to be applied vertically to the surface of the screen 303a of the touch panel display 303 and frictional forces Fx and Fy to be applied horizontally to the surface of the surface of the screen 303a of the touch panel display 303.

When the person 301 touches to trace the screen 303a of the touch panel display 303, the touch position information acquiring unit 108 acquires changing position information.

The torque calculating unit 110 calculates the torques Mx and My whose axes are horizontal to the surface of the screen 303a of the touch panel display 303 based on the force information about the pushing force Fz to be applied vertically to the surface of the screen 303a of the touch panel display 303 and the position information acquired by the touch position information acquiring unit 108. Subsequently, the torque calculating unit 110 calculates the torque Mz whose axis is vertical to the screen 303a of the touch panel display 303 based on the force information about the frictional forces Fx and Fy to be applied horizontally to the screen 303a of the touch panel display 303 and the position information acquired by the touch position information acquiring unit 108.

The stiffness parameter information generating unit 111 generates information about the stiffness parameter based on the torque calculated by the torque calculating unit 110.

FIG. 11E illustrates the stiffness parameter information generated by the stiffness parameter information generating unit 111.

<<Page Turning>>

Figure 12A:
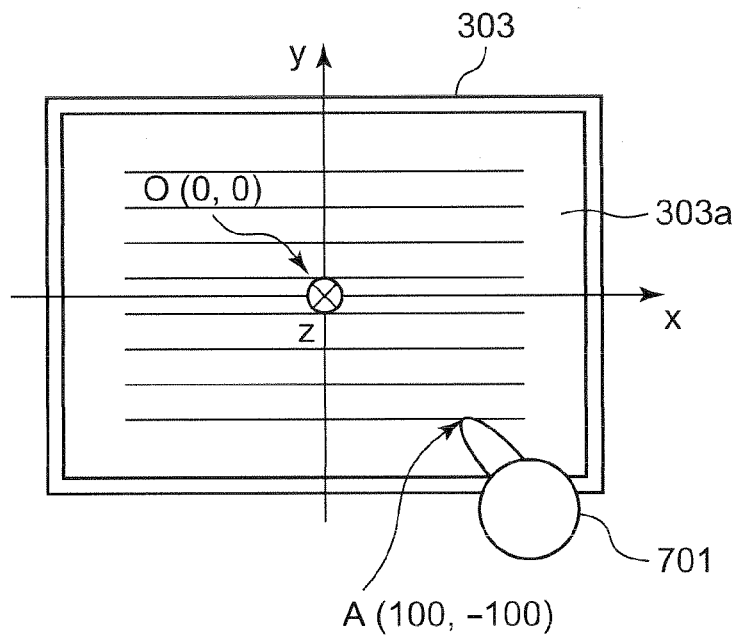
FIG. 12A is an explanatory view illustrating stiffness parameter information generation (page turning) in the robot according to the first embodiment of the present disclosure.

The page turning manipulation is a manipulation to be performed by the person 301 when pages are changed in text reading. This manipulation is performed by touches to trace the display portion 303a of the touch panel display 303 in any direction. That is, position information about page turning is position information that changes such that the screen 303a is touched by the finger 701, and while the screen 303a is being traced by the finger 701, the touch position shifts in any direction, and then the finger 701 is removed from the screen 303a. Concretely, as shown in FIG. 12A and FIG. 12B, this motion is such that, while maintaining a touch state from a time point (FIG. 12A) when the human hand 701 touches the display portion 303a of the touch panel display 303, the human hand 701 moves to a constant direction (as one example, in FIG. 12A, the −x-axial direction) (sliding motion) (see FIG. 12B).

Figure 12B:
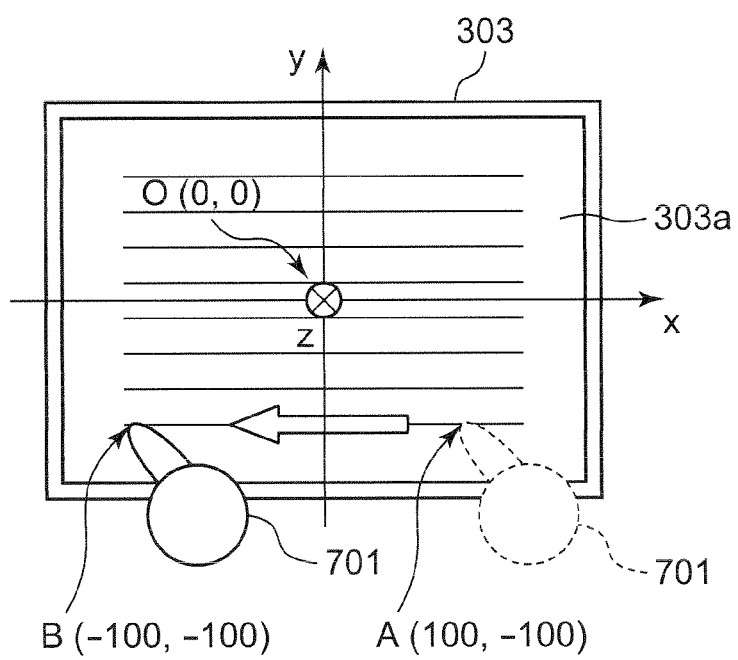
FIG. 12B is an explanatory view illustrating the stiffness parameter information generation (page turning) in the robot according to the first embodiment of the present disclosure.
Figure 13A:
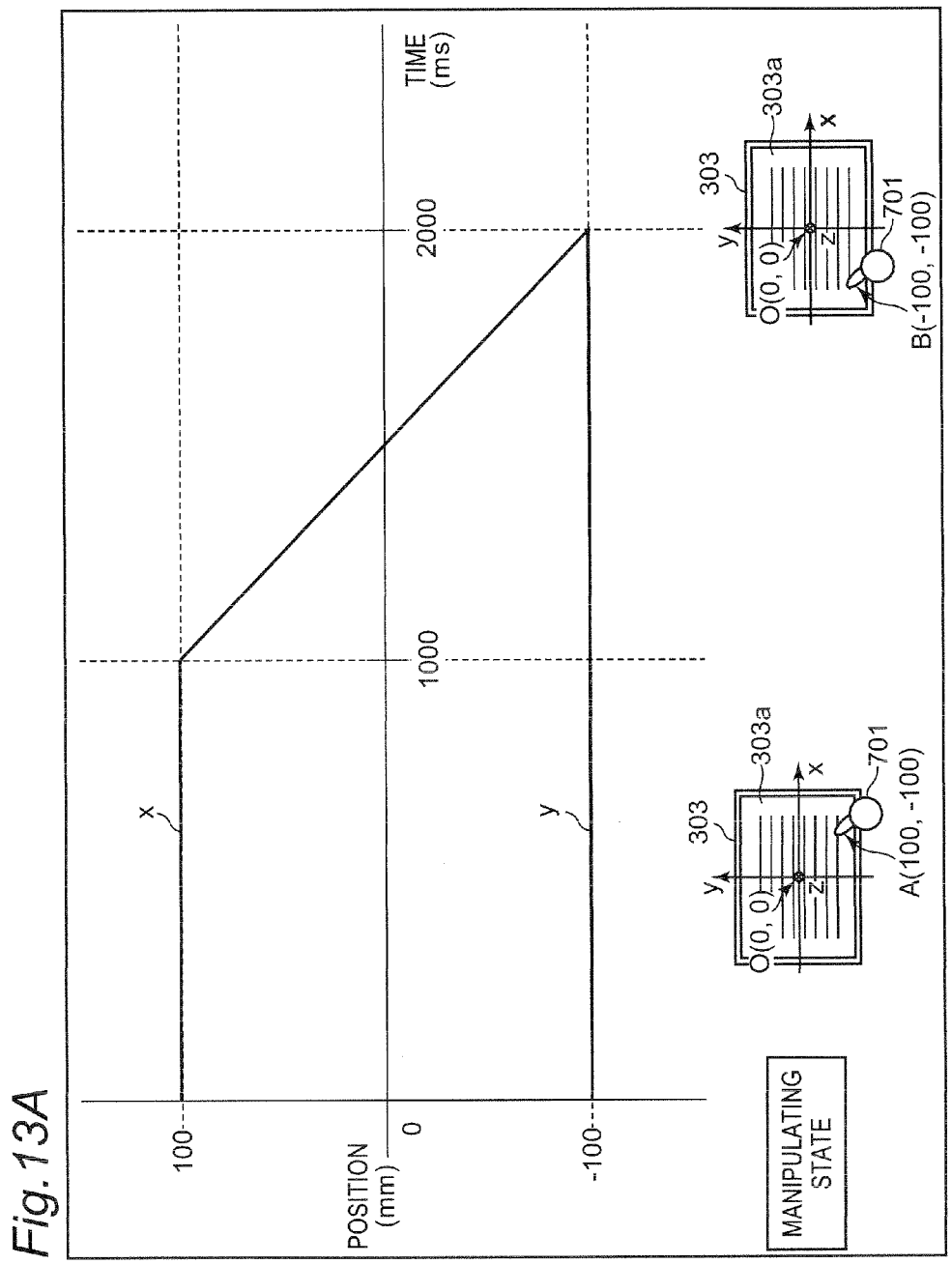
FIG. 13A is an explanatory view including a graph of the touch position information (page turning) in the robot according to the first embodiment of the present disclosure.
Figure 13B:
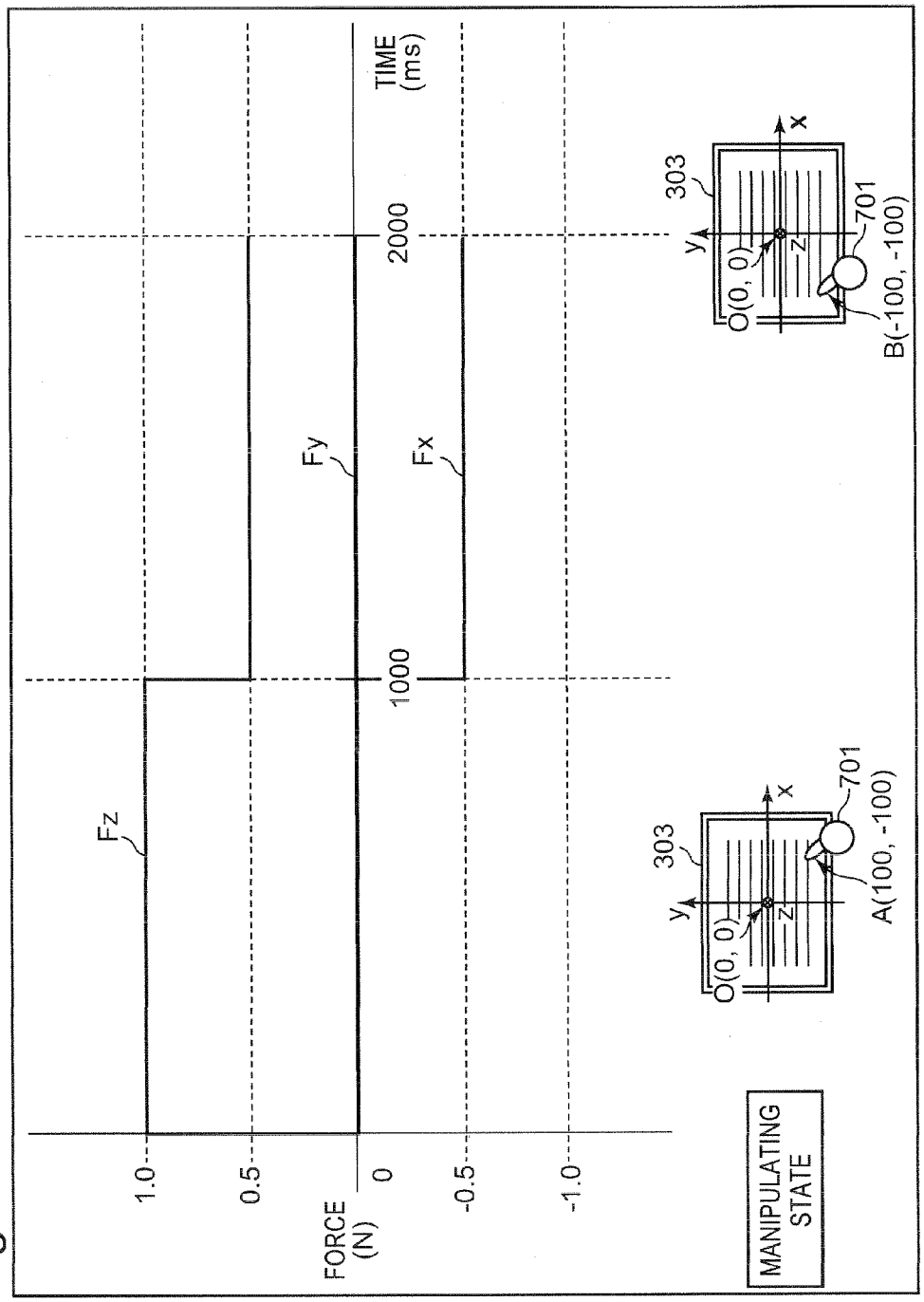
FIG. 13B is an explanatory view including a graph of the touch force information (page turning) in the robot according to the first embodiment of the present disclosure.

A method in which the stiffness parameter information generating unit 111 sets the stiffness in the page turning manipulation high is described by exemplifying the manipulation shown in FIG. 12B. The description refers to an example where the page turning manipulation is performed from the position A (100 mm, −100 mm) to the position B (−100 mm, −100 mm) with the finger 701. FIG. 13A illustrates the touch position information acquired by the touch position information acquiring unit 108. Time (ms) is plotted along a horizontal axis, and position (mm) is plotted along a vertical axis. A graph with reference symbol x represents a change in the position on an x-coordinate, and a graph with reference symbol y represents a change on a y-coordinate. FIG. 13A clarifies that the touch position moves on the x-coordinate. Further, explanatory views of manipulation states of the person 301 are given below the graph of FIG. 13A, indicating that the person 301 touches the position A between 0 ms and 1000 ms, and traces from the position A to the position B between 1000 ms to 2000 ms. FIG. 13B illustrates the touch force information acquired by the touch force information acquiring unit 109. Time (ms) is plotted along a horizontal axis, and force (N) is plotted along a vertical axis. In FIG. 13B, a graph with reference symbol Fx represents a change in the force Fx, a graph with reference symbol Fy represents a change in the force Fy, and a graph with reference symbol Fz represents a change in the force Fz. It is found that the magnitudes of the force Fx and the force Fz change. Further, explanatory views of the manipulation state of the person 301 are shown below the graph in FIG. 13B, and the force Fz of 1.0 N is applied between 0 ms and 1000 ms, the force Fx of −0.5 N is applied and the force Fz of 0.5 N is applied between 1000 ms to 2000 ms.

The method in which the stiffness parameter information generating unit 111 sets the stiffness high at this time is described.

In the translation direction, the stiffness parameter information generating unit 111 sets the stiffness high based on the touch force information (FIG. 13B) acquired by the touch force information acquiring unit 109. It is assumed that the control apparatus is constituted so that when the force of 1.0 N is applied in the x, y and z-axial directions before the force is applied to the touch panel display 303 through the touching by the person 301, the touch panel display 303 moves by 20 mm due to the low stiffness (as one example, the constitution is similar to that of the arm control apparatus 103 in the first embodiment, and only constitution of the stiffness adjustment is different). That is, in this comparative example, the coefficient of the stiffness is 1.0/20=0.05 N/mm. In this state, every time when the person 301 performs the page turning manipulation on the touch panel display 303, the touch panel display 303 moves to the x, y, and z-axial directions. Therefore, in the arm control apparatus 103 of the first embodiment, the stiffness parameter information generating unit 111 increase the feedback gain of the motor 102M for control in the x and z directions, so that the stiffness is heightened. For example, the stiffness parameter information generating unit 111 changes the stiffness so that the movement amount of the touch panel display 303 is within 5 mm when the force of 2.0 N is applied in the x and z directions. As a result, the stiffness parameter information generating unit 111 obtains the coefficient of the stiffness as information about the −x direction shown in FIG. 13C and information about the +z direction shown in FIG. 13D. Further, explanatory views of the manipulation state of the person 301 are shown below the graph in FIG. 13C. On the axis of the −x direction in FIG. 13C, the coefficient of the stiffness is 0.2 N/mm between 1000 ms and 2000 ms. On the axis of the +z direction in FIG. 13D, the coefficient of the stiffness is 0.4 N/mm at 0 ms and 1000 ms, and 0.2 N/mm at 1000 ms to 2000 ms. On the other axes, the coefficient of the stiffness is 0.05 N/mm.

The torque calculating unit 110 derives the torque for the rotational direction through the above method based on the touch position information (FIG. 13A) acquired by the touch position information acquiring unit 108 and the touch force information (FIG. 13B) acquired by the touch force information acquiring unit 109. Similarly, since the force is applied in the x-axial and z-axial directions in the rotational direction, the stiffness parameter information generating unit 111 sets the stiffness so as to increase the stiffness for rx-axis, ry-axis, and rz-axis rotational directions.

As to the stiffness parameter information generated by the stiffness parameter information generating unit 111, the stiffness parameter information in the +rx direction is shown in FIG. 13E, the stiffness parameter information in the −ry direction is shown in FIG. 13F, the stiffness parameter information in the +ry direction is shown in FIG. 13G, and the stiffness parameter information in the +rz direction is shown in FIG. 13H. Further, explanatory views of the manipulation state of the person 301 are shown below the graph in FIG. 13F. On the axis of the +rx direction in FIG. 13E, the coefficient of the stiffness is 4000 Nmm/rad at 0 ms to 1000 ms, and the coefficient of the stiffness is 2000 Nmm/rad at 1000 ms to 2000 ms. On the axis of the −ry direction in FIG. 13F, it is found that the coefficient of the stiffness monotonically increases to 2000 Nmm/rad at 1500 ms to 2000 ms. On the axis of the +ry direction in FIG. 13G, the coefficient of the stiffness is 4000 Nmm/rad at 0 ms to 1000 ms, and the coefficient of the stiffness monotonically reduces from 2000 Nmm/rad at 1000 ms to 1500 ms. On the other axes, the coefficient of the stiffness is 500 Nmm/rad.

Therefore, in this page turning manipulation, the arm control apparatus 103 operates as follows.

The touch force information acquiring unit 109 acquires force information that changes as follows. (1) The force Fz for pushing in the direction vertical to the surface of the screen 303a of the touch panel display 303 is applied. Then, (2) the force Fz for pushing vertically to the surface of the screen 303a of the touch panel display 303 is applied, and the frictional forces Fx and Fy which are horizontally applied to the surface of the screen 303a of the touch panel display 303 are applied. Then, (3) no force is applied to the touch panel display 303.

The touch position information acquiring unit 108 acquires position information as follows. (1) The screen 303a of the touch panel display 303 is touched. Then, (2) a position on the screen 303a of the touch panel display 303 that is touched while being traced by the person 301 shifts in any direction. Then, (3) the person 301 leaves from the screen 303a of the touch panel display 303.

The stiffness parameter information generating unit 111 generates a stiffness parameter that is changed as follows. (1) The torque calculating unit 110 calculates the torques Mx and My whose axes are horizontal to the surface of the screen 303a of the touch panel display 303 based on the force Fz for vertically pushing the surface of the screen 303a of the touch panel display 303 acquired by the touch force information acquiring unit 109. Next, the stiffness parameter information generating unit 111 calculates (generates) the stiffness parameter of the arm 102 based on the calculated torques so that the position and the orientation of the touch panel display 303 do not change. Then, (2) the torque calculating unit 110 calculates the torques Mx and My whose axes are horizontal to the surface of the screen 303a of the touch panel display 303 and the torque Mz whose axis is vertical to the surface of the screen 303a of the touch panel display 303 based on the force Fz for vertically pushing the surface of the screen 303a of the touch panel display 303 and the frictional forces Fx and Fy for horizontally applied to the touch panel display 303. Next, the stiffness parameter information generating unit 111 calculates (generates) the stiffness parameter of the arm 102 based on the calculated torques so that the position and the orientation of the touch panel display 303 do not change. Then, (3) the stiffness parameter information generating unit 111 calculates (generates) the stiffness parameter of the arm 102 of the case where no force is applied to the touch panel display 303.

<<Enlargement>>

The enlargement manipulation is performed by the person 301 when a photograph is to be enlarged while the photograph being viewed. This manipulation is performed by multi-touching the display portion 303a of the touch panel display 303 with a plurality of the fingers 701, and tracing and touching along two directions as mutually separating directions. That is, position information about the enlargement manipulation is such that the screen 303a is multi-touched by a plurality of fingers 701 (positions on the screen 303a multi-touched by the plurality of the fingers 701 do not move), then, the positions on the screen 303a multi-touched by the plurality of fingers 701 are shifted so as to be separated from each other, and then, the fingers 701 are removed from the screen 303a. Concretely, as shown in FIG. 14A and FIG. 14B, this manipulation is such that, from a time point (FIG. 14A) when two positions on the display portion 303a of the touch panel display 303 are touched by the plurality of fingers 701 of a human's hand, the plurality of fingers 701 move to directions where they are separated from each other while the two positions are kept to be touched.

Figure 14A:
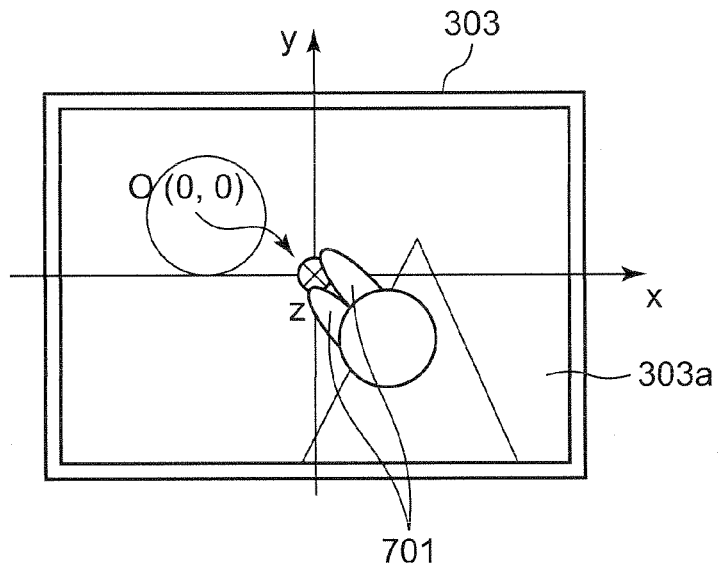
FIG. 14A is an explanatory view illustrating stiffness parameter information generation (enlargement) in the robot according to the first embodiment of the present disclosure.
Figure 14B:
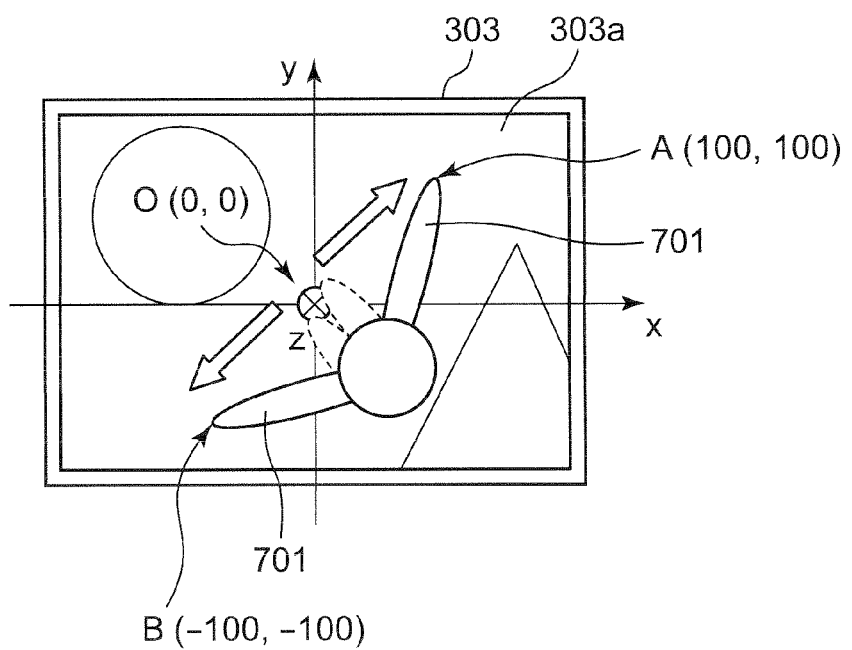
FIG. 14B is an explanatory view illustrating the stiffness parameter information generation (enlargement) in the robot according to the first embodiment of the present disclosure.
Figure 14D:
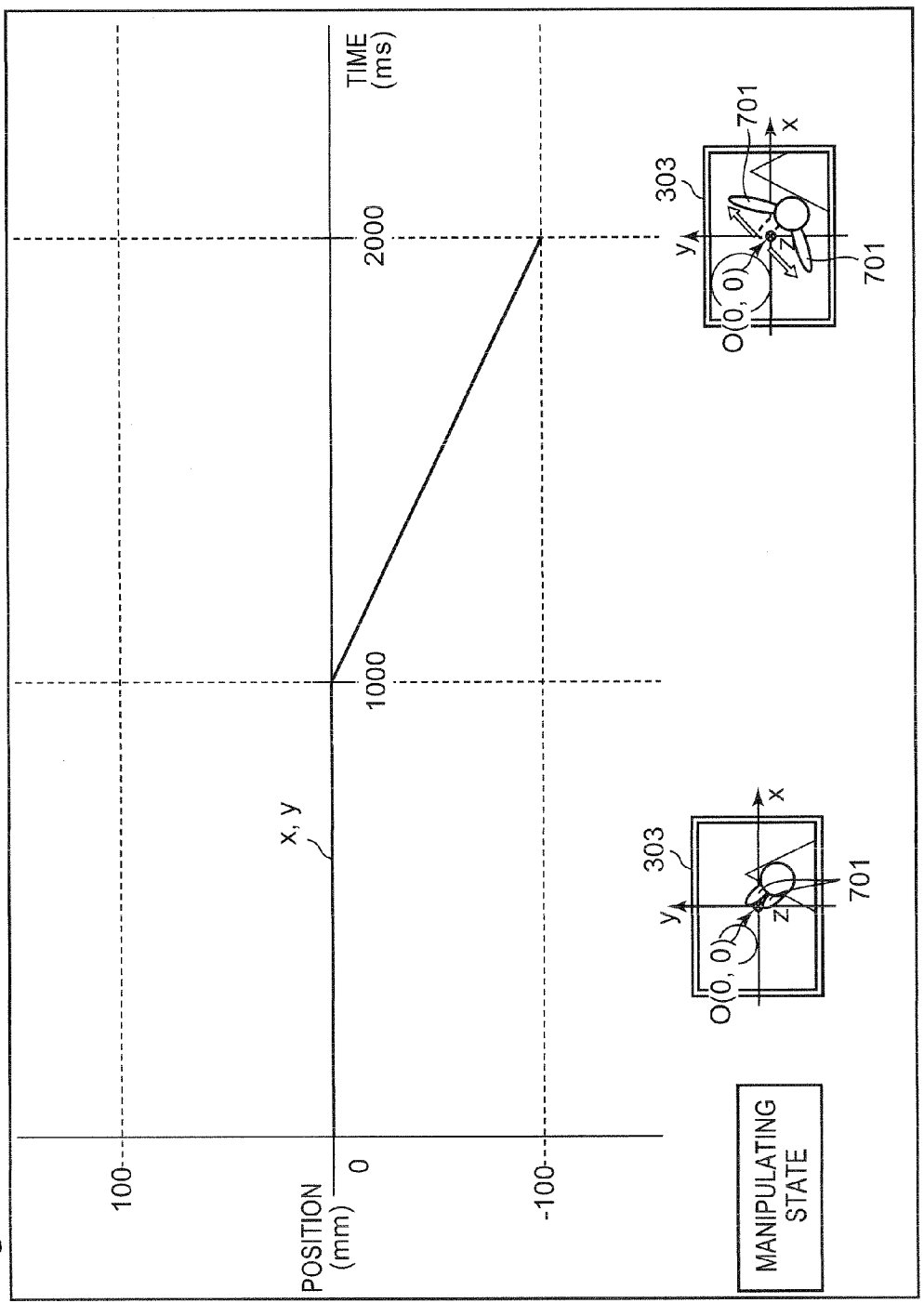
FIG. 14D is an explanatory view including a graph of the touch position information (enlargement) about a position B in the robot according to the first embodiment of the present disclosure.
Figure 14F:
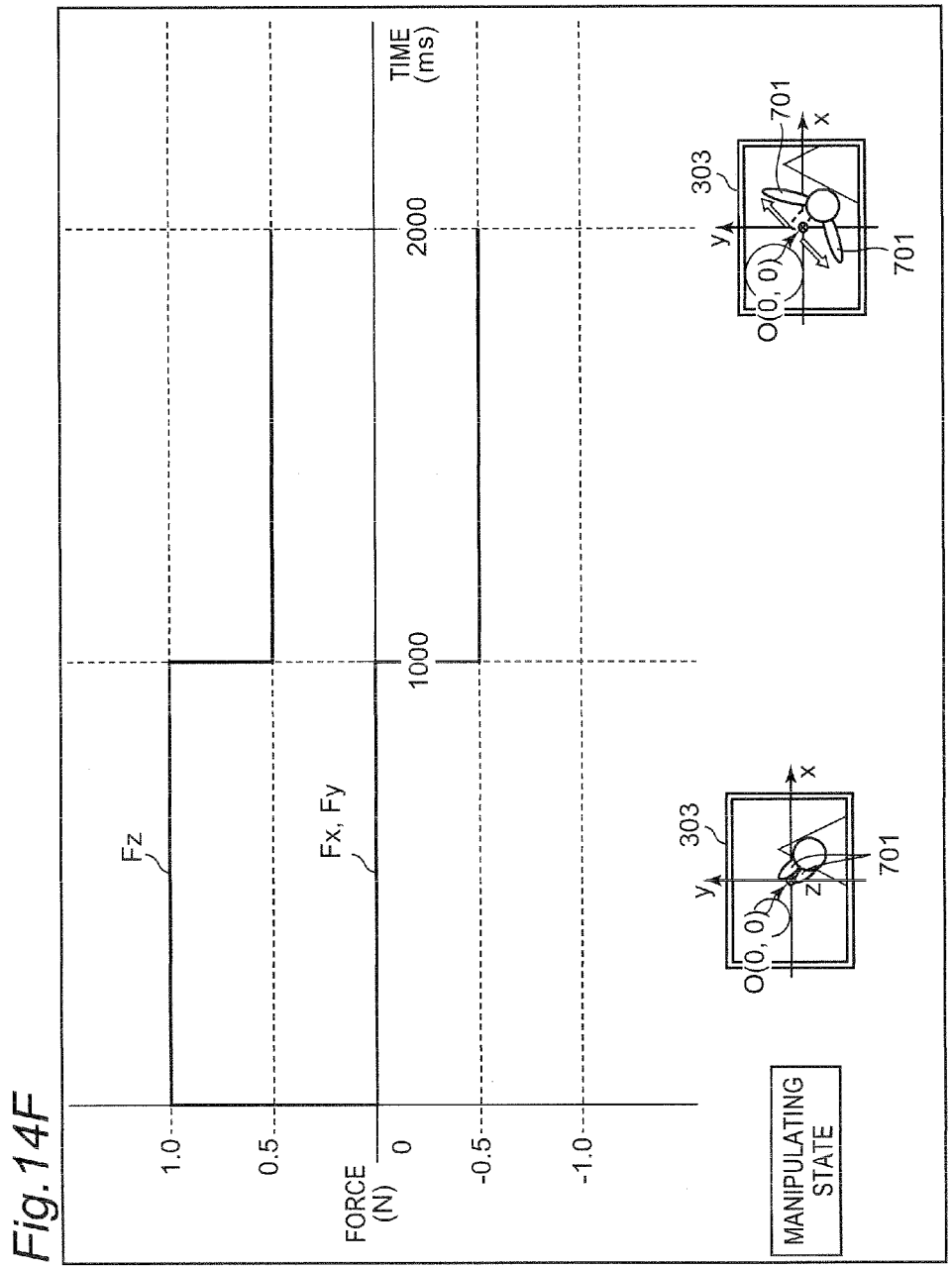
FIG. 14F is an explanatory view including a graph of the touch force information (enlargement) about the position B in the robot according to the first embodiment of the present disclosure.

The method in which the stiffness parameter information generating unit 111 sets the stiffness high at this time is described by exemplifying the manipulation shown in FIG. 14A and FIG. 14B. The enlargement manipulation is a manipulation for multi-touching with the two fingers 701, and two touches including a touch from the origin O (0 mm, 0 mm) to the position A (100 mm, 100 mm) and a touch from the origin O (0 mm, 0 mm) to the position B (−100 mm, −100 mm) occur. In the touch position information acquired by the touch position information acquiring unit 108, the touch position information about the position A is shown in FIG. 14C, and the touch position information about the position B is shown in FIG. 14D. Time (ms) is plotted along a horizontal axis, and position (mm) is plotted along a vertical axis. Reference symbol x represents a change in the position of an x-coordinate, and reference symbol y represents a change in a y-coordinate. It is found that the touched positions move on both the x and y-coordinates. Explanatory views of the manipulation state of the person 301 are shown below a graph of FIG. 14C. In this drawing, the position O is touched at 0 ms to 1000 ms, the position O to the position A and the position O to the position B are traced at 1000 ms to 2000 ms. Further, in the touch force information acquired by the touch force information acquiring unit 109, the touch force information about the position A is shown in FIG. 14E, and the touch force information about the position B is shown in FIG. 14F. Time (ms) is plotted along a horizontal axis, and force (N) is plotted along a vertical axis. Reference symbol Fx represents a change in the force Fx, reference symbol Fy represents a change in the force Fy, and reference symbol Fz represents a change in the force Fz. It is found that the magnitudes of the forces Fx, Fy, and Fz change. Further, explanatory views of the manipulation state of the person 301 are shown below a graph of FIG. 14F. The force Fz of 1.0 N is applied at 0 ms to 1000 ms, the forces Fx and Fy of 0.5 N (the position A) or –0.5 N (the position B) are applied and the force Fz of 0.5 N is applied at 1000 ms to 2000 ms.

The method in which the stiffness parameter information generating unit 111 sets the stiffness high at this time is described.

Figure 14H:
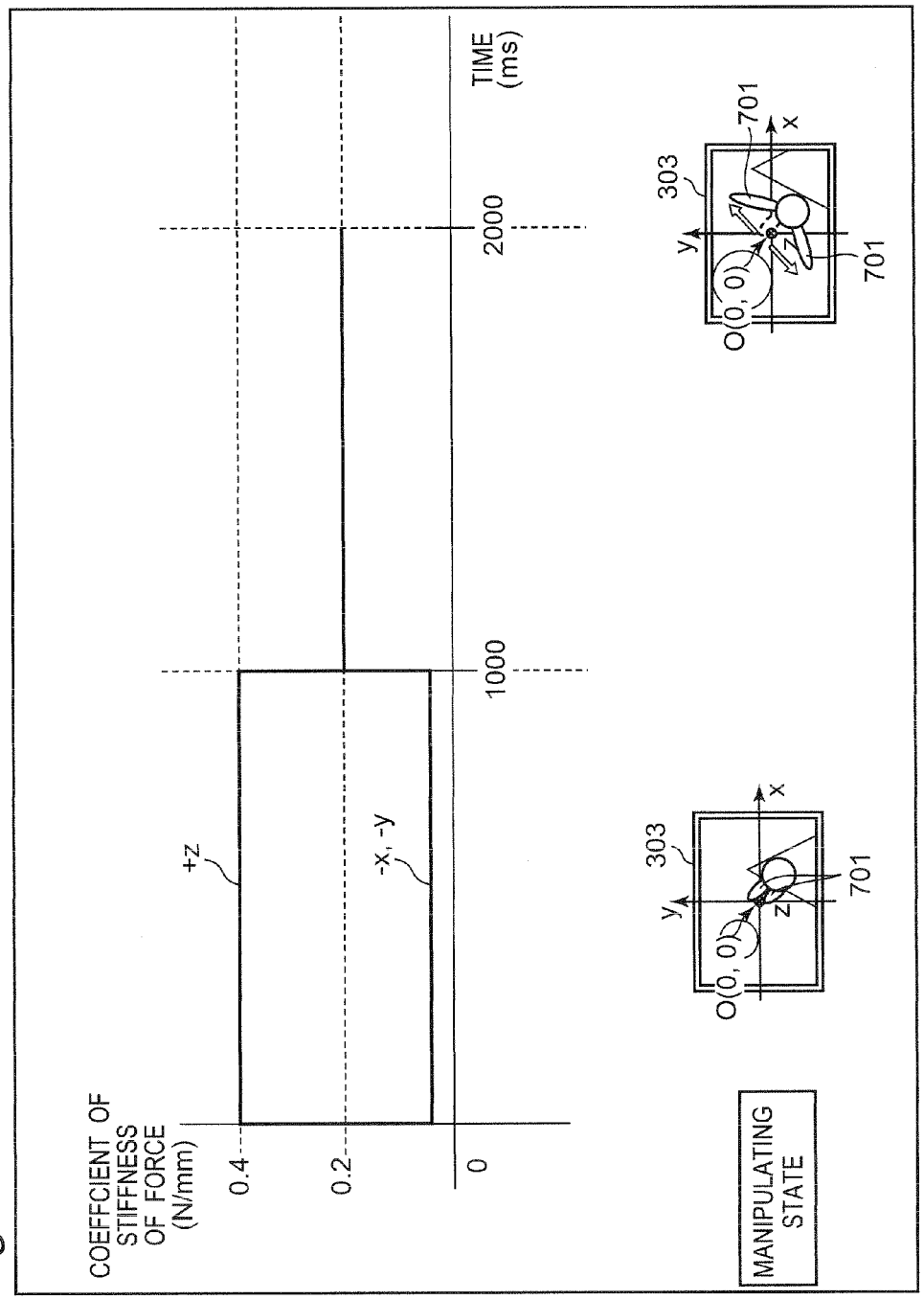
FIG. 14H is an explanatory view including a graph of the stiffness parameter information (enlargement) in a translation direction about the position B in the robot according to the first embodiment of the present disclosure.

In the translation direction, it is assumed that the control apparatus is constituted so that when the force of 1.0 N is applied in the x, y and z-axial directions before the person 301 applies the force through the touch of the touch panel display 303, the touch panel display 303 moves by 20 mm due to the low stiffness (as a comparative example, the constitution is similar to that of the arm control apparatus 103 in the first embodiment and only the constitution of the stiffness adjustment is different). That is, in this comparative example, the coefficient of the stiffness is 1.0/20=0.05 N/mm. In this state, every time when the person 301 performs the above enlargement manipulation on the touch panel display 303, the touch panel display 303 moves in the x, y and z-axial directions. Therefore, in the arm control apparatus 103 of the first embodiment, the stiffness parameter information generating unit 111 increases the feedback gain of the motor 102M for control in the x, y, and z directions, so that the stiffness is heightened. For example, the stiffness parameter information generating unit 111 changes the stiffness so that the movement amount of the touch panel display 303 is within 5 mm when the force of 2.0 N is applied in the x, y, and z directions. As a result, the stiffness parameter information generating unit 111 obtains the coefficient of the stiffness as information such that the translation direction of the position A is as shown in FIG. 14G, and the translation direction of the position B is as shown in FIG. 14H. Further, explanatory views of the manipulation state of the person 301 are shown below a graph in FIG. 14H.

FIG. 14G illustrates the stiffness parameter information about the position A generated by the stiffness parameter information generating unit 111. explanatory views of the manipulation state of the person 301 are shown below a graph in FIG. 14G. On the axes in the +x direction and the +y direction, the coefficient of the stiffness is 0.2 N/mm at 1000 ms to 2000 ms. On the axis in the +z direction, the coefficient of the stiffness is 0.4 N/mm at 0 ms to 1000 ms, and the coefficient of the stiffness is 0.2 N/mm at 1000 ms to 2000 ms. Further, on the other axes, the coefficient of the stiffness is 0.05 N/mm.

FIG. 14H illustrates the stiffness parameter information about the position B generated by the stiffness parameter information generating unit 111. explanatory views of the manipulation state of the person 301 are shown below a graph in FIG. 14H. On the axes in the –x direction and the –y direction, the coefficient of the stiffness is 0.2 N/mm at 1000 ms to 2000 ms. On the axis in the +z direction, the coefficient of the stiffness is 0.4 N/mm at 0 ms to 1000 ms, and the coefficient of the stiffness is 0.2 N/mm at 1000 ms to 2000 ms. Further, on the other axes, the coefficient of the stiffness is 0.05 N/mm.

The torque calculating unit 110 derives the torque for the rotational direction through the above method based on the touch position information (FIGS. 14C and 14D) acquired by the touch position information acquiring unit 108 and the touch force information (FIGS. 14E and 14F) acquired by the touch force information acquiring unit 109. Similarly, since the force is applied in the x-axial, y-axial, and z-axial directions as the rotational direction, the stiffness parameter information generating unit 111 sets the stiffness so as to increase the stiffness for the rx-axis, ry-axis, and rz-axis rotational directions.

Figure 14J:
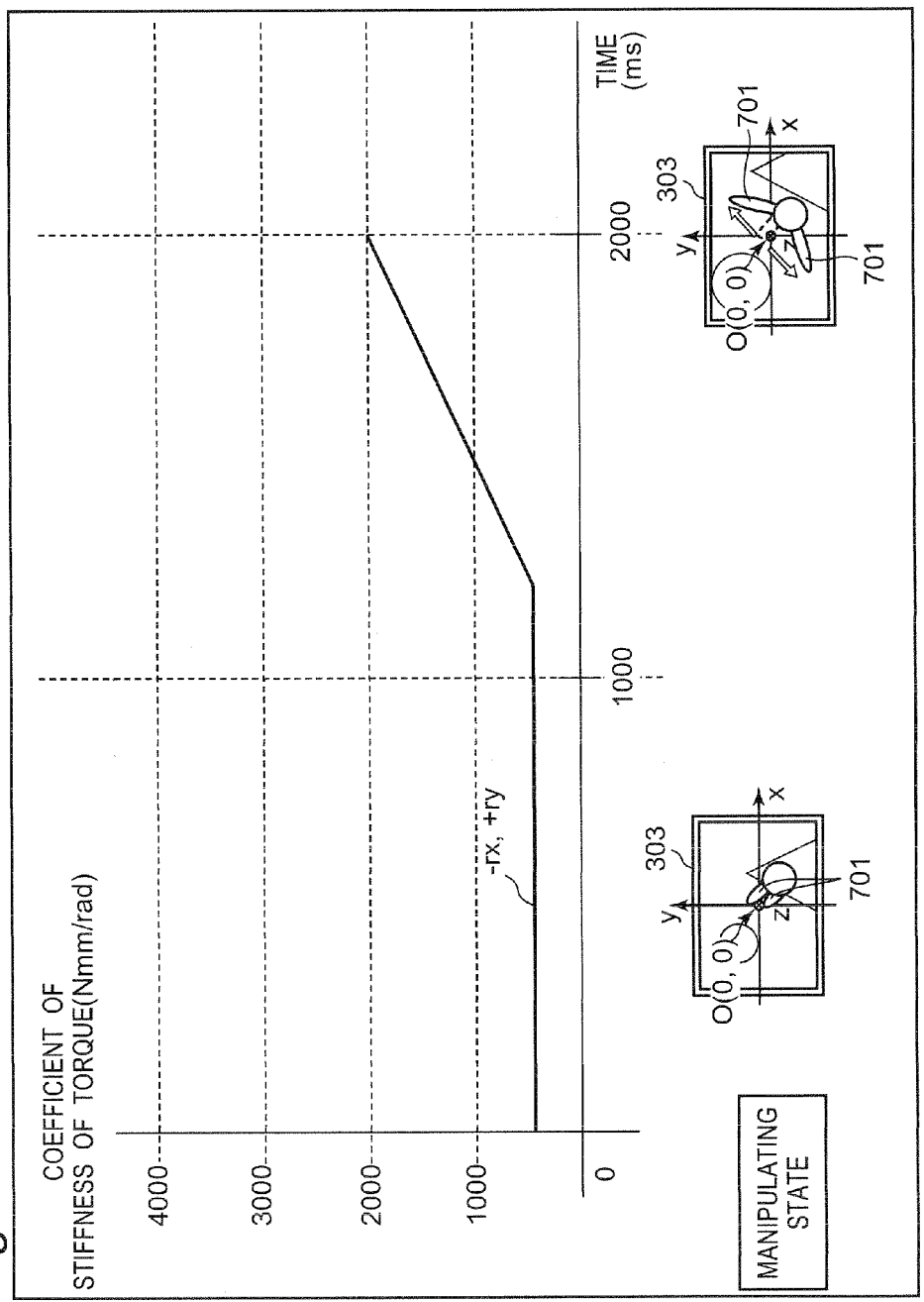
FIG. 14J is an explanatory view including a graph of the stiffness parameter information (enlargement) in a rotational direction about the position B in the robot according to the first embodiment of the present disclosure.

FIG. 14I illustrates the rotational direction of the position A relating to the stiffness parameter information generated by the stiffness parameter information generating unit 111, and FIG. 14J illustrates the rotational direction of the position B. Further, explanatory views of the manipulation state of the person 301 are shown below a graph of FIG. 14J. On the axes in the +rx direction and the –ry direction in FIG. 14I, it is found that the coefficient of the stiffness monotonically increases to 2000 Nmm/rad at 1000 ms to 2000 ms. On the axes in the –rx direction and the +ry direction in FIG. 14J, it is found that the coefficient of the stiffness monotonically increases to 2000 Nmm/rad at 1000 ms to 2000 ms. On the other axes, the coefficient of the stiffness is 500 Nmm/rad.

Therefore, in this enlargement manipulation, the arm control apparatus 103 operates as follows.

The touch force information acquiring unit 109 acquires force information that changes as follows. (1) The force Fz for pushing in the direction vertical to the surface of the screen 303a of the touch panel display 303 is applied. Then, (2) the pushing force Fz for pushing vertically to the surface of the screen 303a of the touch panel display 303 is applied, and the frictional forces Fx and Fy which are horizontally applied to the surface of the screen 303a of the touch panel display 303 are applied. Then, (3) no force is applied to the touch panel display 303.

The touch position information acquiring unit 108 acquires position information that changes as follows. (1) The person 301 multi-touches the screen 303a of the touch panel display 303. Then, (2) the positions on the screen 303a of the touch panel display 303 multi-touched by the person 301 change in directions where the positions are separated from each other. Then, (3) the person 301 leaves from the screen 303a of the touch panel display 303.

The stiffness parameter information generating unit 111 generates the stiffness parameter that changes as follows. (1) The torque calculating unit 110 calculates the torques Mx and My whose axes are horizontal to the surface of the screen 303a of the touch panel display 303 based on the force Fz for vertically pushing the surface of the screen 303a of the touch panel display 303 acquired by the touch force information acquiring unit 109. Then, the stiffness parameter information generating unit 111 calculates (generates) the stiffness parameter of the arm 102 based on the calculated torques so that the position and the orientation of the touch panel display 303 do not change. Then, (2) the torque calculating unit 110 calculates the torques Mx and My whose axes are horizontal to the surface of the screen 303a of the touch panel display 303 and the torque Mz whose axis is vertical to the surface of the screen 303a of the touch panel display 303 based on the force Fz for vertically pushing the surface of the screen 303a of the touch panel display 303 and the frictional forces Fx and Fy horizontally applied to the surface of the screen 303a of the touch panel display 303. The stiffness parameter information generating unit 111 calculates (generates) the stiffness parameter of the arm 102 based on the calculated torques so that the position and the orientation of the touch panel display 303 do not change. Then, (3) the stiffness parameter information generating unit 111 calculates (generates) the stiffness parameter of the arm 102 of the case where no force is applied to the touch panel display 303.

<<Reduction>>

The reduction manipulation is a motion performed by the person 301 when a photograph is to be reduced while the photograph being viewed. This manipulation is performed by multi-touching the display portion 303a of the touch panel display 303 with the plurality of the fingers 701, and tracing and touching along two directions as mutually approaching directions. That is, position information about the reduction manipulation is such that the screen 303a is multi-touched by the plurality of fingers 701 (positions on the screen 303a multi-touched by the plurality of the fingers 701 do not move), then, the positions on the screen 303a multi-touched by the plurality of fingers 701 are shifted so as to mutually approach, and the fingers 701 are removed from the screen 303a. Concretely, as shown in FIG. 15A and FIG. 15B, this manipulation is such that, from a time point (FIG. 15A) when two positions on the display portion 303a of the touch panel display 303 are touched by the plurality of fingers 701 of a human hand, the plurality of fingers 701 move to mutually approaching directions while the two positions are kept to be touched.

Figure 15A:
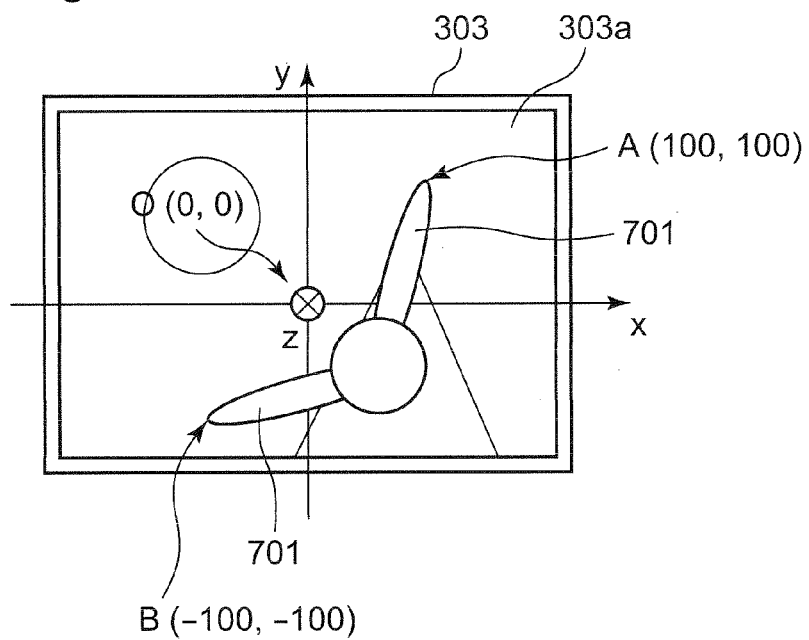
FIG. 15A is an explanatory view illustrating stiffness parameter information generation (reduction) in the robot according to the first embodiment of the present disclosure.
Figure 15B:
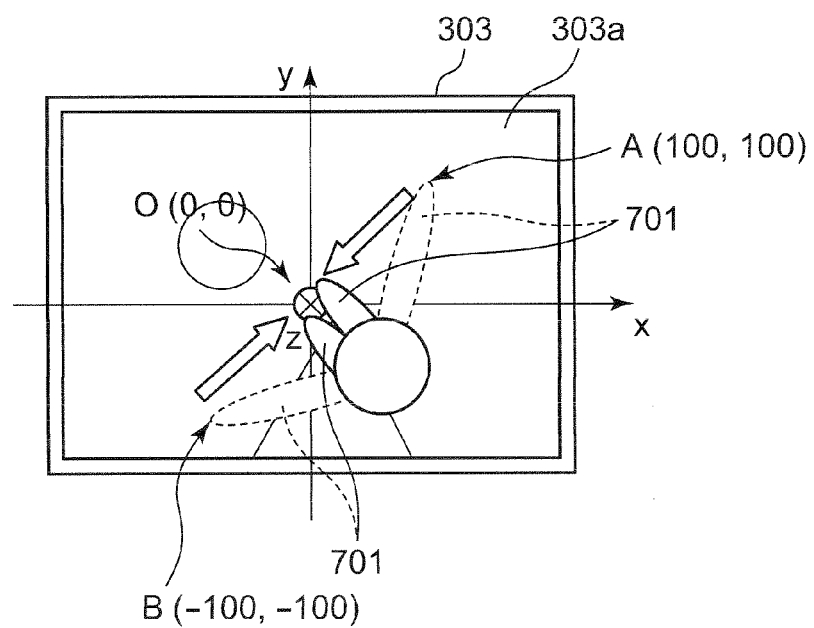
FIG. 15B is an explanatory view illustrating the stiffness parameter information generation (reduction) in the robot according to the first embodiment of the present disclosure.

The method in which the stiffness parameter information generating unit 111 sets the stiffness high at this time is described by exemplifying the manipulation shown in FIG. 15A and FIG. 15B. The reduction manipulation is a manipulation for multi-touching with the two fingers 701, and two touches including a touch from the position A (100 mm, 100 mm) to the origin O (0 mm, 0 mm) and a touch from the position B (−100 mm, −100 mm) to the origin O (0 mm, 0 mm) occur. In the touch position information acquired by the touch position information acquiring unit 108, FIG. 15C illustrates the touch position information about the position A, and FIG. 15D illustrates the touch position information about the position B. Time (ms) is plotted along a horizontal axis, and position (mm) is plotted along a vertical axis. Reference symbol x represents a change in the position of an x-coordinate, and reference symbol y represents a change in a y-coordinate. It is found that the touched positions move on both the x and y-coordinates. Explanatory views of the manipulation state of the person 301 are shown below a graph of FIG. 15D. In this drawing, the position A and the position B are touched at 0 ms to 1000 ms, the position A to the position O and the position B to the position O are traced at 1000 ms to 2000 ms. Further, in the touch force information acquired by the touch force information acquiring unit 109, FIG. 15E illustrates the touch force information about the position A, and FIG. 15F illustrates the touch force information about the position B. Time (ms) is plotted along a horizontal axis, and force (N) is plotted along a vertical axis. Reference symbol Fx represents a change in the force Fx, reference symbol Fy represents a change in the force Fy, and reference symbol Fz represents a change in the force Fz. It is found that the magnitudes of the forces Fx, Fy, and Fz change. Further, explanatory views of the manipulation state of the person 301 are shown below a graph of FIG. 15F. In the drawing, the force Fz of 1.0 N is applied at 0 ms to 1000 ms, the forces Fx and Fy of −0.5N (the position A) or 0.5 N (the position B) are applied and the force Fz of 0.5 N is applied at 1000 ms to 2000 ms.

The method in which the stiffness parameter information generating unit 111 sets the stiffness high at this time is described.

In the translation direction, it is assumed that the control apparatus is constituted so that when the force of 1.0 N is applied in the x, y and z-axial directions before the person 301 applies the force through the touch of the touch panel display 303, the touch panel display 303 moves by 20 mm due to the low stiffness (as a comparative example, the constitution is similar to that of the arm control apparatus 103 in the first embodiment and only the constitution of the stiffness adjustment is different). That is, in this comparative example, the coefficient of the stiffness is 1.0/20=0.05 N/mm. In this state, every time when the person 301 performs the reduction manipulation on the touch panel display 303, the touch panel display 303 moves to the x and z-axial directions. Therefore, in the arm control apparatus 103 of the first embodiment, the stiffness parameter information generating unit 111 increase the feedback gain of the motor 102M for control in the x, y, and z directions so as to heighten the stiffness. For example, the stiffness parameter information generating unit 111 changes the stiffness so that the movement amount of the touch panel display 303 is within 5 mm when the force of 2.0 N is applied in the x, y, and z directions. As a result, the stiffness parameter information generating unit 111 obtains the coefficient of the stiffness as information such that the translation direction of the position A is as shown in FIG. 15G, and the translation direction of the position B is as shown in FIG. 15H. Further, explanatory views of the manipulation state of the person 301 are shown below a graph of FIG. 15G.

FIG. 15G illustrates the stiffness parameter information about the position A generated by the stiffness parameter information generating unit 111. explanatory views of the manipulation state of the person 301 are shown below a graph in FIG. 15G. On the axes in the −x direction and the −y direction, the coefficient of the stiffness is 0.2 N/mm at 1000 ms to 2000 ms. On the axis in the +z direction, the coefficient of the stiffness is 0.4 N/mm at 0 ms to 1000 ms, and the coefficient of the stiffness is 0.2 N/mm at 1000 ms to 2000 ms. Further, on the other axes, the coefficient of the stiffness is 0.05 N/mm.

FIG. 15H illustrates the stiffness parameter information about the position B generated by the stiffness parameter information generating unit 111. explanatory views of the manipulation state of the person 301 are shown below a graph in FIG. 15H. On the axes in the +x direction and the +y direction, the coefficient of the stiffness is 0.2 N/mm at 1000 ms to 2000 ms. On the axis in the +z direction, the coefficient of the stiffness is 0.4 N/mm at 0 ms to 1000 ms, and the coefficient of the stiffness is 0.2 N/mm at 1000 ms to 2000 ms. Further, on the other axes, the coefficient of the stiffness is 0.05 N/mm.

The torque calculating unit 110 derives the torque for the rotational direction through the above method based on the touch position information (FIGS. 15C and 15D) acquired by the touch position information acquiring unit 108 and the touch force information (FIGS. 15E and 15F) acquired by the touch force information acquiring unit 109. Similarly, since the force is applied in the x-axial, y-axial, and z-axial directions as the rotational direction, the stiffness parameter information generating unit 111 sets the stiffness so as to increase the stiffness for the rx-axis, ry-axis, and rz-axis rotational directions.

FIG. 15I illustrates the rotational direction of the position A and FIG. 15J illustrates the rotational direction of the position B, relating to the stiffness parameter information generated by the stiffness parameter information generating unit 111. Further, explanatory views of the manipulation state of the person 301 are shown below a graph of FIG. 15J. On the axes in the −rx direction and the +ry direction in FIG. 15I, it is found that the coefficient of the stiffness monotonically decreases from 2000 Nmm/rad at 1000 ms to 2000 ms. On the axes in the +rx direction and the −ry direction in FIG. 15J, it is found that the coefficient of the stiffness monotonically decreases from 2000 Nmm/rad at 1000 ms to 2000 ms. On the other axes, the coefficient of the stiffness is 500 Nmm/rad.

Therefore, in this reduction manipulation, the arm control apparatus 103 operates as follows.

The touch force information acquiring unit 109 acquires force information that changes as follows. (1) The force Fz for pushing to the direction vertical to the surface of the screen 303a of the touch panel display 303 is applied. Then, (2) the force Fz for vertically pushing to the surface of the screen 303a of the touch panel display 303 is applied, and the frictional forces Fx and Fy which are horizontally applied to the surface of the screen 303a of the touch panel display 303 are applied. Then, (3) no force is applied to the touch panel display 303.

The touch position information acquiring unit 108 acquires position information that changes as follows. (1) The person 301 multi-touches the screen 303a of the touch panel display 303. Then, (2) the positions on the screen 303a of the touch panel display 303 multi-touched by the person 301 change in mutually approaching directions. Then, (3) the person 301 leaves from the screen 303a of the touch panel display 303.

The stiffness parameter information generating unit 111 generates the stiffness parameter that changes as follows. (1) The torque calculating unit 110 calculates the torques Mx and My whose axes are horizontal to the surface of the screen 303a of the touch panel display 303 based on the force Fz for vertically pushing the surface of the screen 303a of the touch panel display 303. Then, the stiffness parameter information generating unit 111 calculates (generates) the stiffness parameter of the arm 102 based on the calculated torques so that the position and the orientation of the touch panel display 303 do not change. Then, (2) the torque calculating unit 110 calculates the torques Mx and My whose axes are horizontal to the surface of the screen 303a of the touch panel display 303 and the torque Mz whose axis is vertical to the surface of the screen 303a of the touch panel display 303 based on the force Fz for vertically pushing the surface of the screen 303a of the touch panel display 303 and the frictional forces Fx and Fy horizontally applied to the surface of the screen 303a of the touch panel display 303. Then, the stiffness parameter information generating unit 111 calculates (generates) the stiffness parameter of the arm 102 based on the calculated torques so that the position and the orientation of the touch panel display 303 do not change. Then, (3) the stiffness parameter information generating unit 111 calculates (generates) the stiffness parameter of the arm 102 of the case where no force is applied to the touch panel display 303.

<<Keyboard Input>>

Figure 16A:
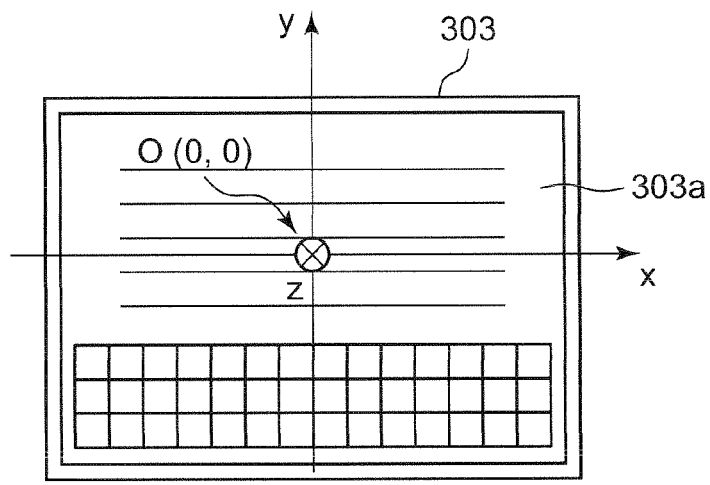
FIG. 16A is an explanatory view illustrating stiffness parameter information generation (keyboard input) in the robot according to the first embodiment of the present disclosure.
Figure 16B:
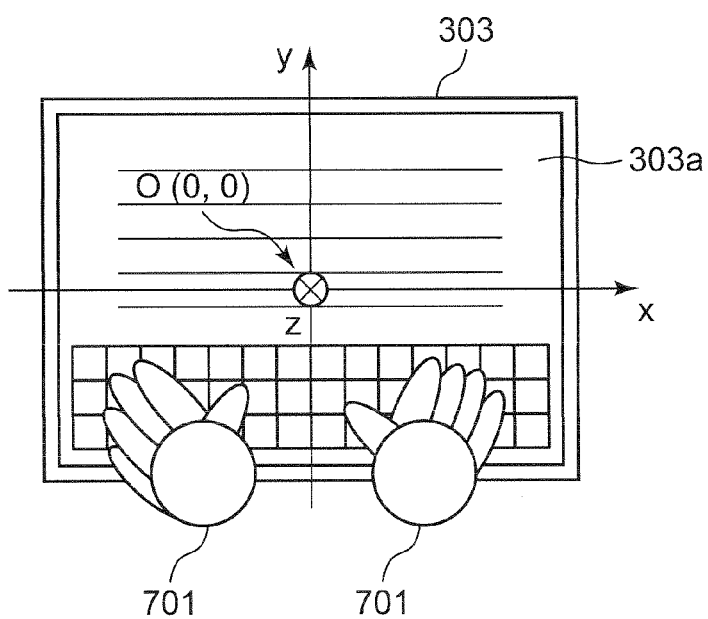
FIG. 16B is an explanatory view illustrating the stiffness parameter information generation (keyboard input) in the robot according to the first embodiment of the present disclosure.

The keyboard input manipulation is performed by the person 301 when keyboard input is performed in creation of a text. This manipulation is continuously performed by the above touch manipulation. That is, position information about an keyboard input manipulation is position information that changes repeatedly at a plurality of times in such a manner that the screen 303a is touched by the finger 701 (the position on the screen 303a touched by the finger 701 does not move), and then, the finger 701 is removed from the screen 303a. Concretely, an example shown in FIG. 16A is described by using contents for creating a text. As shown in FIG. 16B, the touch manipulation is continuously performed. This manipulation is different from the touch manipulation in that the touch manipulation is continuously performed.

FIG. 16C illustrates one example of the touch position information at a time of performing the keyboard manipulation. Time (ms) is plotted along a horizontal axis, and position (mm) is plotted along a vertical axis. Reference symbol x represents a change in the position of an x-coordinate, and reference symbol y represents a change in a y-coordinate. It is found that the keyboard input is performed three times.

Figure 16D:
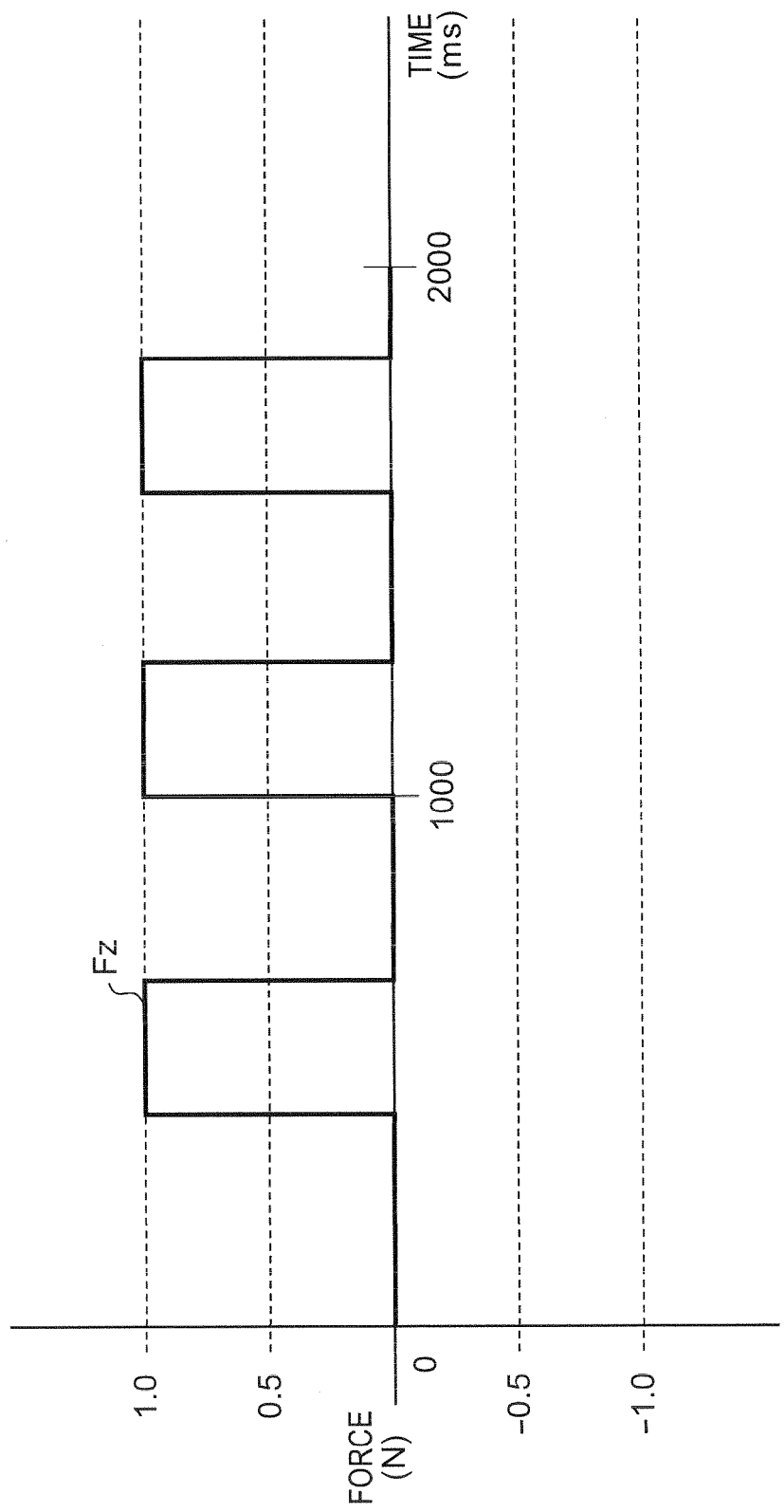
FIG. 16D is a graph of touch force information (keyboard input) in the robot according to the first embodiment of the present disclosure.

FIG. 16D illustrates the touch force information. Time (ms) is plotted along a horizontal axis, and force (N) is plotted along a vertical axis. Reference symbol Fz represents a change in the force Fz. It is found that the force Fz of 2.0 N is applied by three-time keyboard inputs.

The method in which the stiffness parameter information generating unit 111 sets the stiffness high at this time is described.

The stiffness parameter information generating unit 111 sets the stiffness high for the translation direction based on the acquired touch force information (FIG. 16D). Since the force of 1.0 N is applied in the z direction, the stiffness parameter information generating unit 111 increases the feedback gain of the motor 102M for controlling the arm 102 so as to heighten the stiffness in the z direction. It is assumed that the control apparatus is constituted so that when the force of 1.0N is applied in the z direction before the person 301 applies the force through the touching of the touch panel display 303, the touch panel display 303 moves by 20 mm due to the low stiffness (as a comparative example, the constitution is similar to that of the arm control apparatus 103 in the first embodiment, and only constitution of the stiffness adjustment is different). That is, in this comparative example, the coefficient of the stiffness is 1.0/20=0.05 N/mm. In this state, every time when the person 301 touches the touch panel display 303 to input, the touch panel display 303 moves to the z direction. Therefore, in the arm control apparatus 103 in the first embodiment, the stiffness parameter information generating unit 111 increases the feedback gain of the motor 102M for control in the z direction, so that the stiffness is heightened. For example, the stiffness parameter information generating unit 111 changes the stiffness so that the movement amount of the touch panel display 303 is within 5 mm when the force of 2.0 N is applied in the z direction. As a result, the coefficient of the stiffness is made to be 2.0/5=0.4 N/mm. FIG. 16E illustrates the stiffness parameter information generated by the stiffness parameter information generating unit 111. When the touch input is performed, the coefficient of the stiffness in the +z-axial direction is 0.4 N/mm, and when the touch input is not performed, the coefficient of the stiffness is 0.05 N/mm. Further, on the other axes, the coefficient of the stiffness is 0.05 N/mm.

The torque calculating unit 110 derives the torque in the rotational direction according to the above method based on the touch position information (FIG. 16C) acquired by the touch position information acquiring unit 108 and the touch force information (FIG. 16D) acquired by the touch force information acquiring unit 109. The stiffness parameter information generating unit 111 sets the stiffness high so that the stiffness withstands a torque that is twice as large as the derived torque. FIG. 16F illustrates the stiffness parameter information in the +rx direction generated by the stiffness parameter information generating unit 111, and FIG. 16G illustrates the stiffness parameter information in the +ry direction. On the axis of the +rx direction, the coefficient of the stiffness is set to 2000 Nmm/rad by the first and third inputs, and the coefficient of the stiffness is set to 4000 Nmm/rad by the second input. On the axis of the +ry direction, the coefficient of the stiffness is 4000 Nmm/rad by the first and third inputs, and the coefficient of the stiffness is 500 Nmm/rad by the second input. On the other axes, the coefficient of the stiffness is 500 Nmm/rad.

Therefore, in this keyboard input manipulation, the arm control apparatus 103 operates as follows.

The touch force information acquiring unit 109 acquires force information that changes as follows. (1) The vertical pushing force for vertically pushing to the surface of the screen 303a of the touch panel display 303 is applied. Then, (2) no force is applied to the screen 303a of the touch panel display 303.

The touch position information acquiring unit 108 acquires position information that changes repeatedly at a plurality of times as follows. (1) The person 301 touches the screen 303a of the touch panel display 303. Then, (2) the person 301 leaves the screen 303a of the touch panel display 303.

The stiffness parameter information generating unit 111 generates the stiffness parameter that changes as follows. (1) The torque calculating unit 110 calculates the torques Mx and My whose axes are horizontal to the surface of the screen 303a of the touch panel display 303 based on the force Fz for vertically pushing the surface of the screen 303a of the touch panel display 303. Then, the stiffness parameter information generating unit 111 calculates (generates) the stiffness parameter of the arm 102 based on the calculated torques so that the position and the orientation of the touch panel display 303 do not change. Then, (2) the stiffness parameter information generating unit 111 calculates (generates) the stiffness parameter of the arm 102 of the case where no force is applied to the screen 303a of the touch panel display 303.

When the person 301 continuously touches the screen 303a, the arm control apparatus 103 operates as follows.

The touch force information acquiring unit 109 acquires force information about the pushing force Fz to be vertically applied to the surface of the screen 303a of the touch panel display 303, and force information about a case where no force is applied to the screen 303a of the touch panel display 303.

The touch position information acquiring unit 108 acquires position information of a case where the person 301 repeats the touch on the screen 303a of the touch panel display 303 at a plurality of times.

The stiffness parameter information generating unit 111 generates the stiffness parameter that changes as follows. (1) The torque calculating unit 110 calculates the torques Mx and My whose axes are horizontal to the surface of the screen 303a of the touch panel display 303 based on the force information about the pushing force Fz to be vertically applied to the surface of the screen 303a of the touch panel display 303 and the position information acquired by the touch position information acquiring unit 108. Then, the stiffness parameter information generating unit calculates (generates) the stiffness parameter of the arm so that the position and the orientation of the touch panel display do not change, based on the calculated torques. Then, (2) when no force is applied to the touch panel display 303, the torque calculating unit 110 does not calculate the torques, but the stiffness parameter information generating unit 111 calculates (generates) the stiffness parameter of the arm 102.

The invention can be applied also to contents to be used in hospitals other than the above contents. Concrete contents are described with reference to FIG. 17A and FIG. 17B.

FIG. 17A illustrates contents of a moving image of a rehabilitation video picture. In such contents, replay/stop button or slider manipulation is performed on a portion indicated by reference symbol A.

Figure 17B:
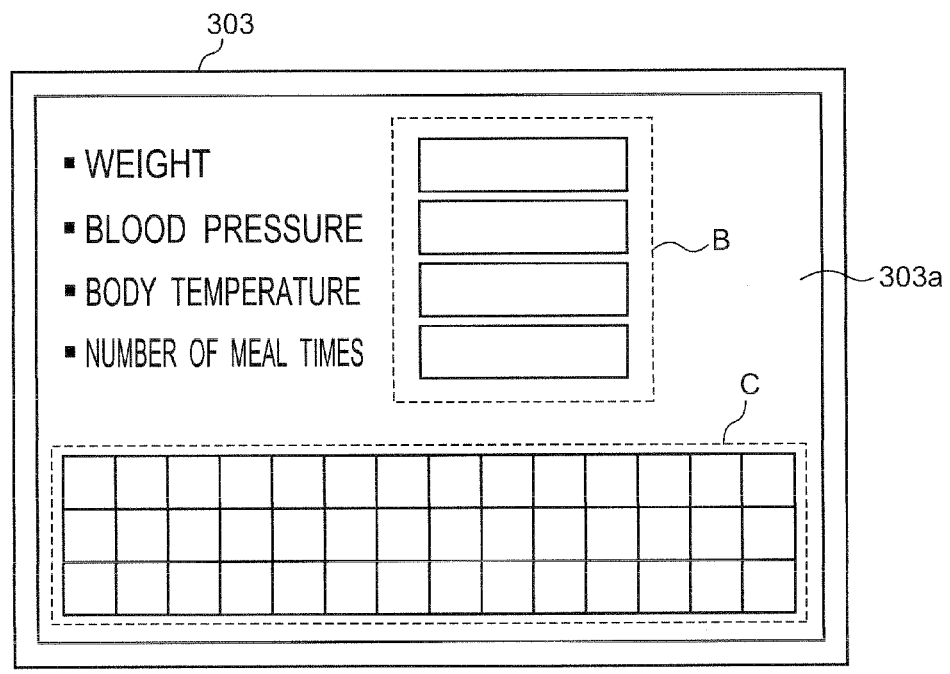
FIG. 17B is an explanatory view illustrating contents of the hospital in the robot according to the first embodiment of the present disclosure.

FIG. 17B illustrates contents for inputting physical conditions such as weight and blood pressure. In such contents, a selection or input manipulation is performed on portions indicated by reference symbols B and C where selection or input is performed.

The stiffness parameter information generating unit 111 outputs the stiffness parameter information generated by the stiffness parameter information generating unit 111 and the time information to the arm control unit 112.

The arm control unit 112 acquires the motion information and time information from the arm motion information generating unit 107. Further, the arm control unit 112 acquires the stiffness parameter information and the time information from the stiffness parameter information generating unit 111.

As the first function of the arm control unit 112, the motion information input into the arm control unit 112 is output from the arm control unit 112 to the input/output IF 113 at every constant time (for example, every 1 ms) using the timer built in the input/output IF 113, so that the motion of the arm 102 is controlled via the motor driver 114.

As the second function of the arm control unit 112, the stiffness parameter information input into the arm control unit 112 is output from the arm control unit 112 to the input/output IF 113 at every constant time (for example, every 1 ms) using the timer built in the input/output IF 113, so that the stiffness of an arm tip portion (an attachment portion of the touch panel display 303) 102e of the arm 102 is controlled by the arm control unit 112. When the stiffness parameter information is not input into the arm control unit 112, the arm control unit 112 controls the stiffness low so that the person 301 can move the arm 102 with a light force. The arm control unit 112 always controls the stiffness with respect to the display portion 303a of the touch panel display 303. That is, the arm control unit 112 controls the stiffness of the arm 102 based on the coordinate system of the display portion 303a of the touch panel display 303. The control of the stiffness through the arm control unit 112 facilitates the touch manipulation performed by the person 301. That is, when the person 301 manipulates the touch panel display, the arm control unit 112 controls the stiffness so that the position and the orientation of the touch panel display 303 do not change.

As the method for controlling the stiffness through the arm control unit 112, any control method such as impedance control or damping control can be used. For example, a force and a torque to be output are multiplied by a gain, and the arm control unit 112 controls the position and the orientation of the arm 102. At this time, the arm control unit 112 adjusts the magnitude of the gain, so that the stiffness can be adjusted.

Further, when the stiffness is reduced and the touch panel display 303 is moved, the impedance control or the damping control may be used in the arm control unit 112. On the other hand, when the stiffness is heightened, a plurality of control methods can be combined in the arm control unit 112 in such a manner that the position control is used in the arm control unit 112 in order to allow the touch panel display 303 to remain on that position.

On the other hand, the input information acquiring unit 117 acquires input information from the input/output IF 113. The input information means information that is input into the input information acquiring unit 117 by the person 301 through the input/output IF 113.

One example of the input information is switching information about powering on/off of the touch panel display 303.

Another example of the input information is proficiency information. The proficiency information is information about use history that the person 301 uses the arm control apparatus 103 in the first embodiment. For example, the person 301 selects one of three choices including the use histories "0 to 1 month", "2 to 5 months", and "6 or more months", and inputs the proficiency information into the input information acquiring unit 117 through the input/output IF 113.

The stiffness parameter information generating unit 111 adjusts the stiffness parameter information based on the proficiency information input into the input information acquiring unit 117.

The proficiency information is acquired by input from the person 301, but the stiffness parameter information generating unit 111 may store the number of times at which the touch panel display 303 is powered on or the number of times at which the touch panel display 303 is touched so as to be capable of estimating the proficiency information.

<Description about Peripheral Devices>

The input/output IF 113 outputs the motion information input form the arm control unit 112 to the motor driver 114. Further, the position information and orientation information about the arm 102 are obtained by calculating units inside the encoders based on input values acquired by the encoders 102E of the respective axes of the arm 102, and then, are input into the input/output IF 113. The position information and orientation information input into the input/output IF 113 and the time information from the timer built in the input/output IF 113 are output from the input/output IF 113 to the motion information acquiring unit 106.

The touch sensor 115 detects the touch position information, and the detected touch position information and the time information from the timer built in the input/output IF 113 are output to the touch position information acquiring unit 108. The force sensor 116 detects the touch force information, and the detected touch force information and the time information from the timer built in the input/output IF 113 are output to the touch force information acquiring unit 109.

Figure 18:
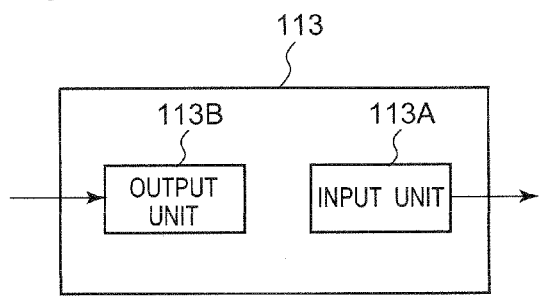
FIG. 18 is a block diagram illustrating an input/output IF in the robot according to the first embodiment of the present disclosure.

Further, the input/output IF 113 is composed of an input unit 113A and an output unit 113B as shown in FIG. 18. The input unit 113A is an input IF, and the input unit 113A is used when the person 301 selects an item through a keyboard, a mouse, the touch panel display, or voice input, or the person 301 inputs numerical values through a keyboard, a mouse, the touch panel display, or voice input. The output unit 113B is an output IF, and the output unit 113B is used when the acquired information is output to the outside or is displayed on a display. The output unit 113B is composed of a display, a speaker, or a lamp, and the output unit 113B can output the acquired information to the outside through display, voice, illuminating of light, or flickering of light.

The motor driver 114 outputs command values of the axes of the arm 102 to the motor 102M to the arm 102 in order to control the arm 102 based on the motion information and stiffness parameter information acquired from the input/output IF 113.

<Description about the Arm>

The motion information about the arm 102 is obtained by the calculating units inside the encoders 102E of the arm 102 at every certain constant time (for example, every 1 ms) using the timer built in the input/output IF 113 in the arm 102 so as to be output to the input/output IF 113. Further, the motor 102M of the axes of the arm 102 is controlled according to a command value from the motor driver 114.

Figure 19:
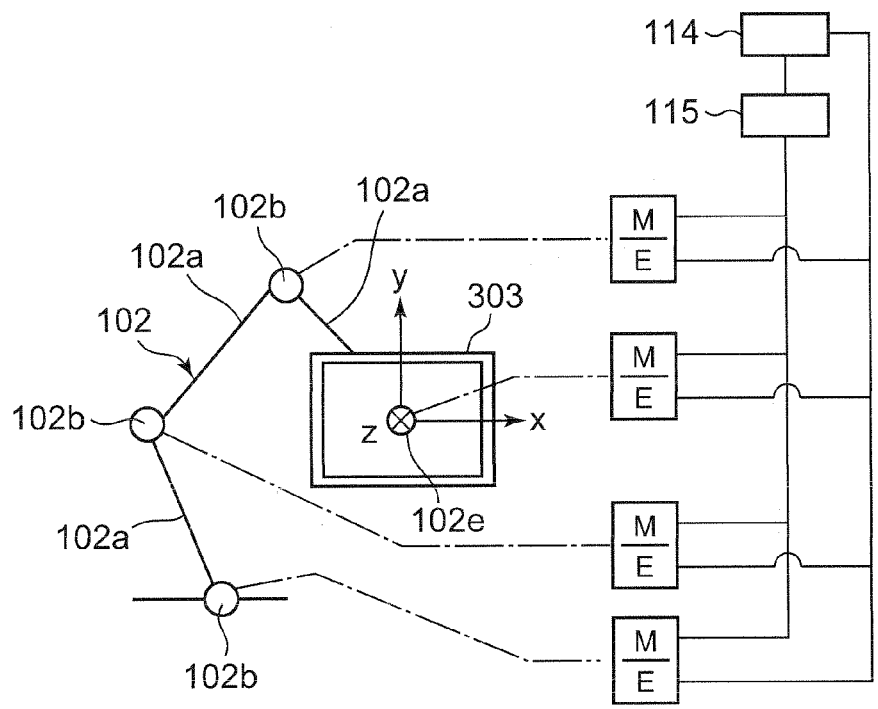
FIG. 19 is an explanatory view illustrating an arm in the robot according to the first embodiment of the present disclosure.

The motor 102M and the encoder 102E are disposed at each joint of the arm 102. More concretely, each of joint portions 102b for jointing the arm members 102a of the arm 102 is provided with a rotation driving device such as the motor 102M for driving the joint portion, and the encoder 102E (actually, disposed inside each of the joint portions 102b of the arm 102) for detecting a rotational phase angle (namely, a joint angle) of a rotational shaft of each motor 102M and calculating the position information and the orientation information using the internal calculating units so as to output the position information and the orientation information. The motor 102M (actually, disposed inside each of the joint portions 102b of the arm 102) is provided to one of a pair of the arm members 102a (for example, the arm member 102a on a turning side and the arm member 102a on a supporting side for supporting the arm member 102a on the turning side) composing each of the joint portions 102b, and is driven to be controlled by the motor driver 114. The rotational shaft of the motor 102M provided to one of the arm members 102a of each joint portion 102b is jointed to the other arm member 102a of each joint portion 102b, and the rotational shaft is rotated forward and reversely, so that the other arm member 102a can be rotated about each shaft with respect to the one arm member 102a. In such a constitution, the motors 102M and the encoders 102E can control the arm 102 to a desired position and orientation. A multi-link manipulator of six-degree-of-freedom having six joints is considered herein. The coordinate system of the arm tip portion 102e of the arm 102 is similar to the coordinate system of the touch panel display 303 according to a coordinate system shown in FIG. 19. The number of joints and the degree of freedom of the arm 102 are not limited to the numbers in the first embodiment, and can be any number of 1 or greater.

<Description about the Motion Procedure>

The motion procedure in the first embodiment is described. As an example of contents to be displayed, contents for reading texts are described.

An exemplary procedure for moving the arm 102 so as to adjust the stiffness through the arm control apparatus 103 according to contents is described with reference to FIG. 20A to FIG. 20G.

Figure 20A:
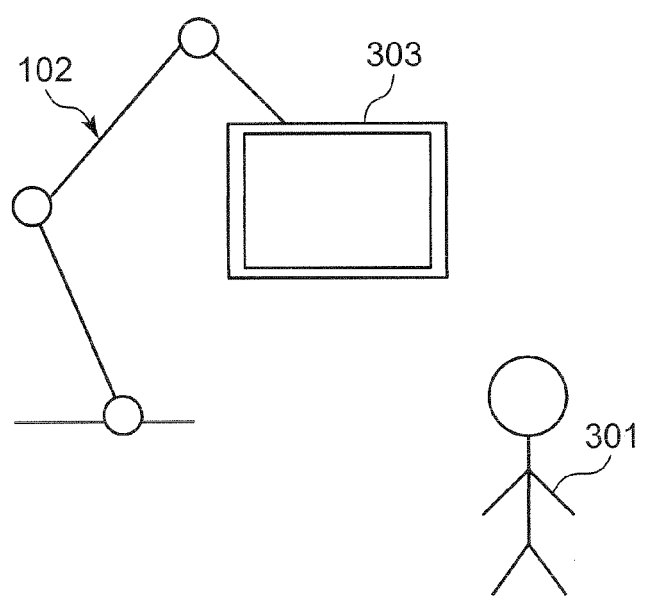
FIG. 20A is an explanatory view illustrating a motion procedure in the robot according to the first embodiment of the present disclosure.

FIG. 20A shows a time point at which the touch panel display 303 is separated from the person 301. The power of the touch panel display 303 is off, and the stiffness parameter information generating unit 111 sets the stiffness of all the axes of the arm 102 low. This is because the initial value of the stiffness of the arm 102 is set low by the stiffness parameter information generating unit 111.

Figure 20B:
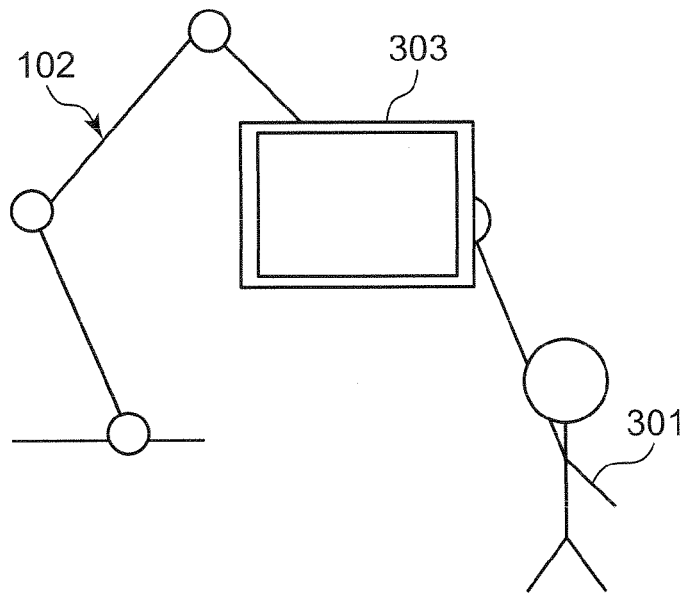
FIG. 20B is an explanatory view illustrating a motion procedure in the robot according to the first embodiment of the present disclosure.

FIG. 20B illustrates a time point at which the person 301 holds a side portion of the touch panel display 303 and moves the touch panel display 303 to an easily viewable position. Since the stiffness parameter information generating unit 111 sets the stiffness of all the axes of the arm 102 low, the person 301 can move the touch panel display 303 to an easily viewable position with a light force.

Figure 20C:
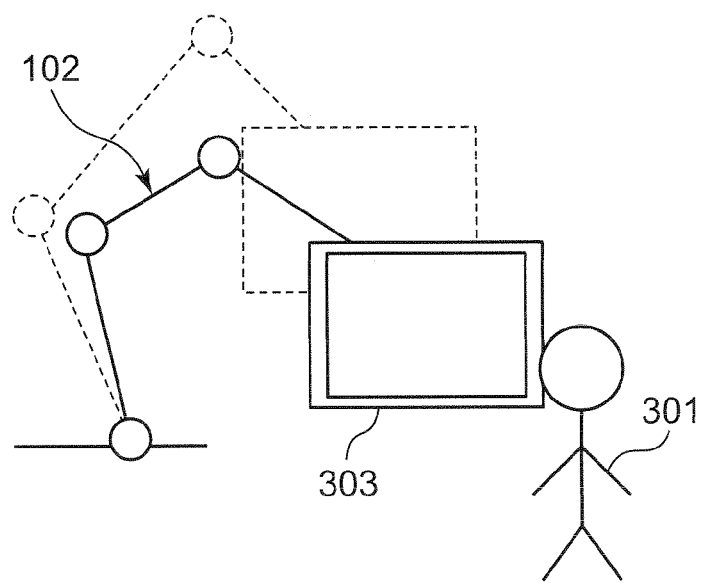
FIG. 20C is an explanatory view illustrating a motion procedure in the robot according to the first embodiment of the present disclosure.

FIG. 20C illustrates a time point at which the person 301 has moved the touch panel display 303 to an easily viewable position.

Figure 20D:
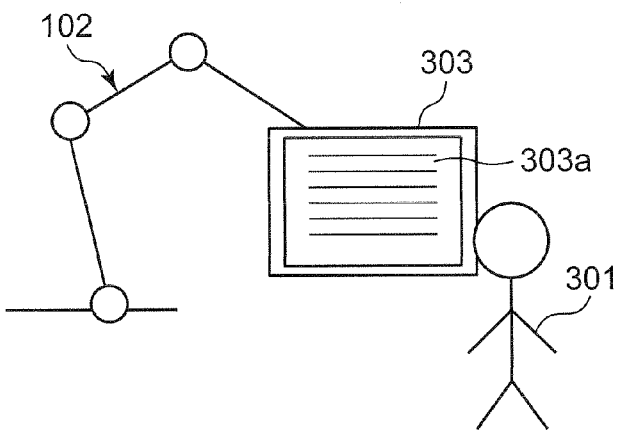
FIG. 20D is an explanatory view illustrating a motion procedure in the robot according to the first embodiment of the present disclosure.

FIG. 20D illustrates a time point at which the person 301 has powered on the touch panel display 303. At this time point, the contents for reading texts are displayed on the display portion 303a.

Figure 20E:
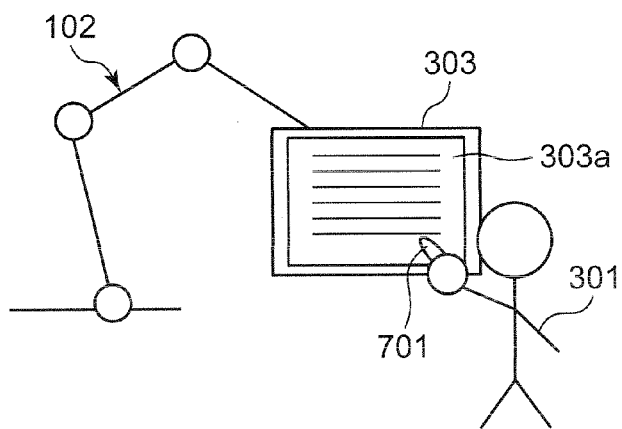
FIG. 20E is an explanatory view illustrating a motion procedure in the robot according to the first embodiment of the present disclosure.

FIG. 20E illustrates a time point at which the person 301 touches the display portion 303a of the touch panel display 303. At this time point, the position touched by the person 301 and the touch force are detected by the touch sensor 115 and the force sensor 116, respectively, and the force and torque that act on the touch panel display 303 are derived by the torque calculating unit 110. The stiffness parameter information generating unit 111 sets the stiffness of the axes, to which the derived force and torque are applied, high. When the stiffness is heightened by the stiffness parameter information generating unit 111 in the above manner, the person 301 can touch the touch panel display 303 while the touch panel display 303 does not move to a direction where the display portion 303a of the touch panel display 303 is pushed. Further, when the person 301 does not touch the display portion 303a of the touch panel display 303, the stiffness parameter information generating unit 111 sets the stiffness low.

Figure 20F:
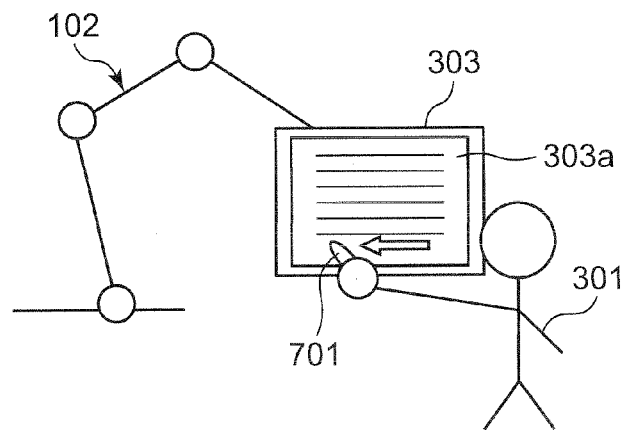
FIG. 20F is an explanatory view illustrating a motion procedure in the robot according to the first embodiment of the present disclosure.

FIG. 20F illustrates a time point at which the person 301 performs the page turning manipulation on the display portion 303a of the touch panel display 303. The stiffness parameter information generating unit 111 changes the stiffness based on the touch position information and the touch force information, and the stiffness parameter information generating unit 111 sets the stiffness high according to the touch manipulation performed by the person 301.

Figure 20G:
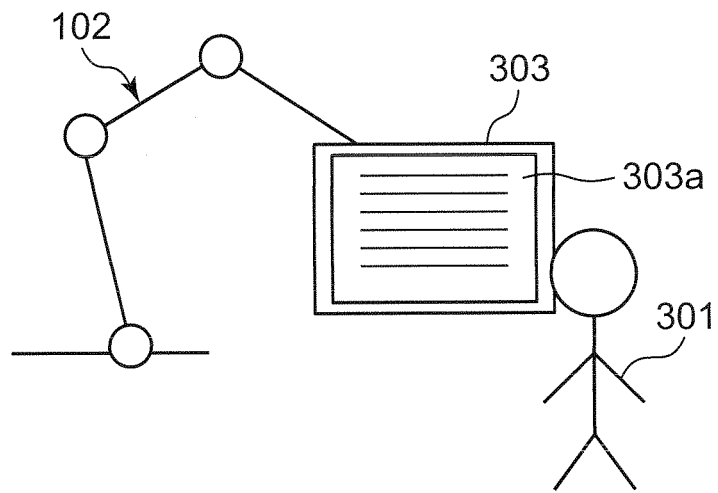
FIG. 20G is an explanatory view illustrating a motion procedure in the robot according to the first embodiment of the present disclosure.

FIG. 20G illustrates a time point at which the person 301 reads displayed texts without touching the touch panel display 303. At this time point, since the person 301 does not touch the touch panel display 303, the stiffness parameter information generating unit 111 sets the stiffness low.

The stiffness parameter information generating unit 111 can set the stiffness low according to any method including a case where the stiffness is set low when a constant time passes after the stiffness is set high.

The stiffness of the arm 102 is adjusted by the stiffness parameter information generating unit 111 according to the position and the force on the display portion 303a touched by the person 301, so that the person 301 easily performs the manipulation. Concretely, when the person 301 touches the display portion 303a, the touch manipulation is easily performed, and when not touch, the touch panel display 303 is easily moved.

<Flowchart>

The manipulation procedure of the control apparatus 103 of the arm 102 according to the first embodiment is described with reference to flowcharts in FIG. 21 and FIG. 22.

Figure 21:
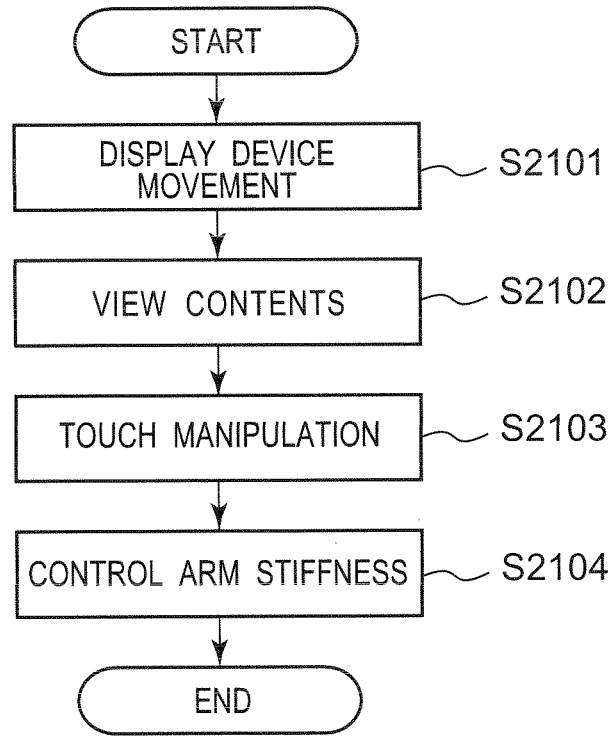
FIG. 21 is a flowchart illustrating a manipulation procedure of a control apparatus in the robot according to the first embodiment of the present disclosure.

FIG. 21 illustrates one example of the manipulation of the control apparatus 103 of the arm 102 according to the first embodiment.

Firstly, the person 301 moves the touch panel display 303 to easily viewable position and orientation at step S2101, and the sequence goes to step S2102.

Next, the person 301 views contents displayed on the touch panel display 303 at step S2102, and the sequence goes to step S2103.

Next, the person 301 touches the display portion 303a of the touch panel display 303 at step S2103, and the sequence goes to step S2104.

Next, the arm control unit 112 controls the stiffness of the arm 102 via the input/output IF 113 and the motor driver 114 at step S2104 based on the force information and the position information of the time when the person 301 performs the touch manipulation. The stiffness parameter information generating unit 111 sets the stiffness of the arm 102 high according to the touch manipulation, so that the display portion 303a can be touched with the touch panel display 303 not being moved.

Figure 22:
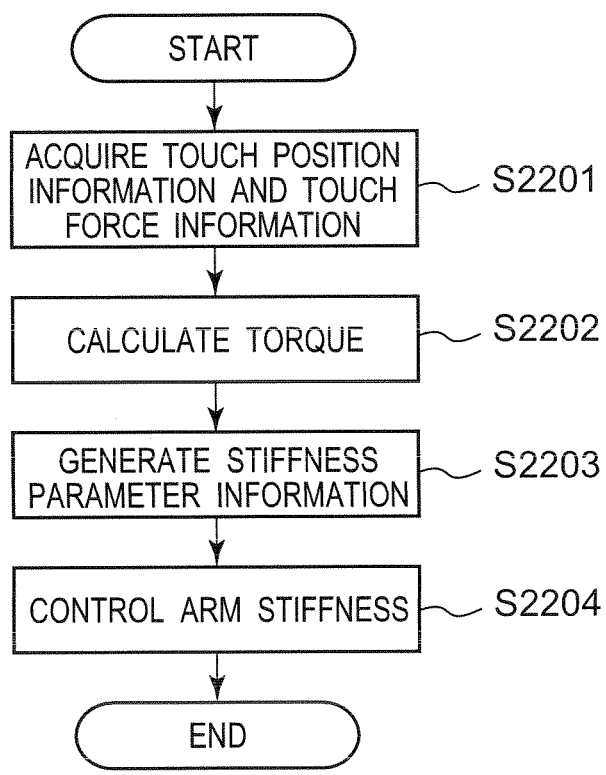
FIG. 22 is a flowchart illustrating the manipulation procedure of the control apparatus in the robot according to the first embodiment of the present disclosure.

In FIG. 22, the control of the arm stiffness at step S2104 in the flowchart of FIG. 21 is described in detail.

Firstly, the touch position information acquiring unit 108 acquires the touch position information and the touch force information acquiring unit 109 acquires the touch force information at step S2201, and the sequence goes to step S2202.

Next, the torque calculating unit 110 calculates a torque applied to the touch panel display 303 at step S2202 based on the touch position information acquired from the touch position information acquiring unit 108 and the touch force information acquired from the touch force information acquiring unit 109, and the sequence goes to step S2203.

Next, the stiffness parameter information generating unit 111 generates the stiffness parameter information at step S2203 based on the touch force information acquired from the touch force information acquiring unit 109 and the torque information acquired from the torque calculating unit 110, and the sequence goes to step S2204.

Next, the arm control unit 112 controls the stiffness of the arm 102 via the input/output IF 113 and the motor driver 114 at step S2204 according to the stiffness parameter information acquired from the stiffness parameter information generating unit 111.

Effect of the First Embodiment

The stiffness parameter information generating unit 111 adjusts the stiffness of the arm 102 according to the position and the force at the time when the person 301 touches the display portion 303a. With this manner, when the person 301 moves the touch panel display 303, the touch panel display 303 can be moved by a light force, and when the display portion 303a is touched to be manipulated, the stiffness parameter information generating unit 111 heightens the stiffness. As a result, the person 301 can touch the display portion 303a with the touch panel display 303 not moving to the pushing direction. Therefore, the maneuverability of the touch panel display 303 can be improved.

Second Embodiment

Figure 23:
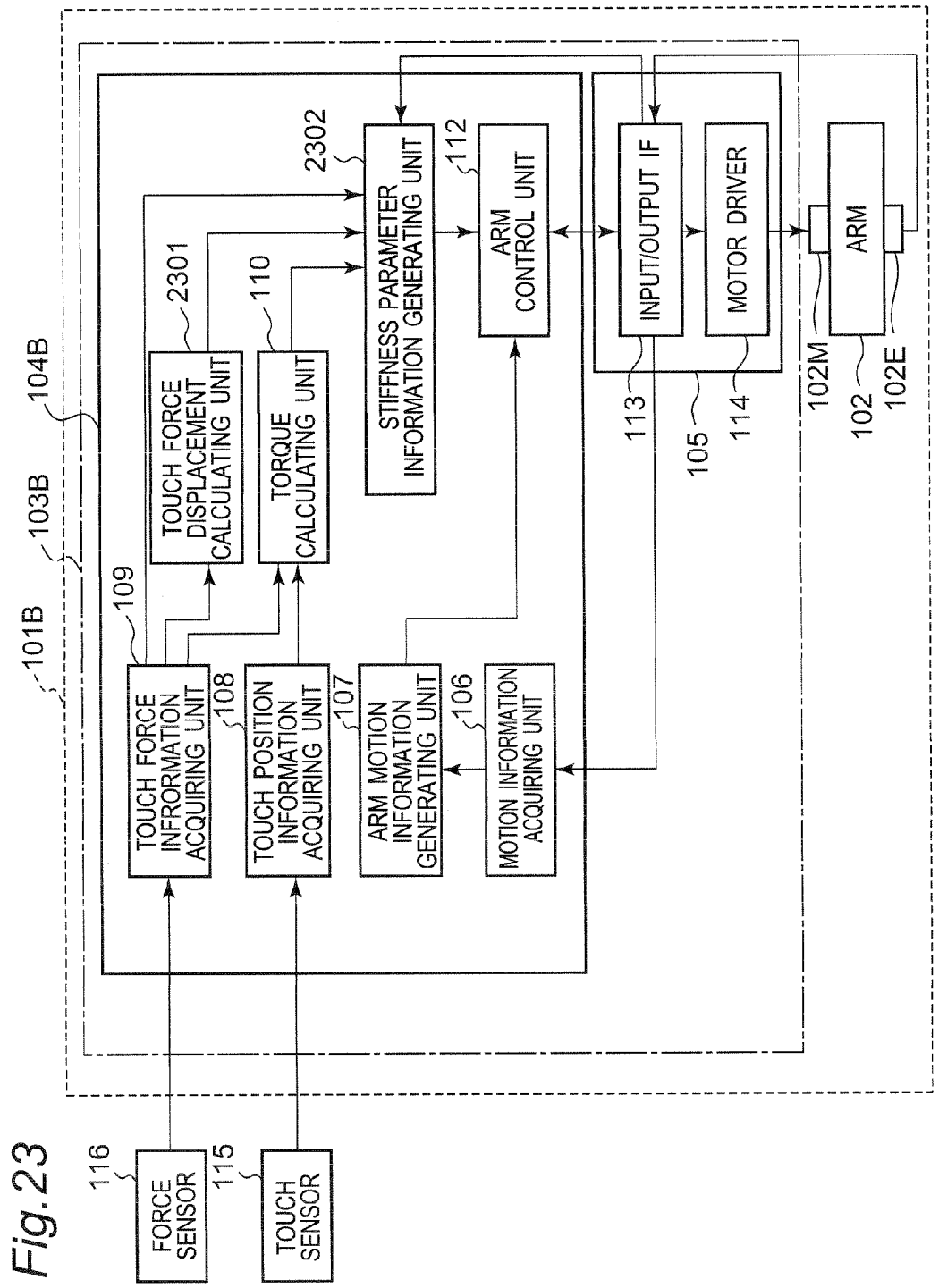
FIG. 23 is a block diagram illustrating a robot arm in a robot according to a second embodiment of the present disclosure.

FIG. 23 is a block diagram illustrating a robot 101B according to a second embodiment of the present disclosure. In the robot 101B according to the second embodiment of the present disclosure, the arm 102, the peripheral device 105, the motion information acquiring unit 106, the arm motion information generating unit 107, the touch position information acquiring unit 108, the touch force information acquiring unit 109, and the arm control unit 112 in a control apparatus main body 104B of a control apparatus 103B are similar to those in the first embodiment. For this reason, members common with those in the first embodiment are denoted by the same reference symbols, the description thereof is omitted, and only different portions are described in detail below.

A touch force displacement calculating unit 2301 acquires force information from the touch force information acquiring unit 109, and calculates displacement of the force based on the acquired force information. Concretely, the touch force displacement calculating unit 2301 acquires the touch force information and the time information from the touch force information acquiring unit 109. The touch force displacement calculating unit 2301 generates touch force displacement information based on the acquired touch force information and time information. The touch force displacement information represents displacement of the touch force information per unit time (for example, 1 ms).

For example, when the touch force displacement calculating unit 2301 acquires the touch force information shown in FIG. 24A, the touch force displacement calculating unit 2301 calculates the displacement of the touch force information per unit time. The touch force displacement calculating unit 2301 generates the touch force displacement information shown in FIG. 24B.

The touch force displacement calculating unit 2301 outputs the touch force displacement information generated by the touch force displacement calculating unit 2301 and time information to a stiffness parameter information generating unit 2302.

The stiffness parameter information generating unit 2302 is provided to the control apparatus main body 104B instead of the stiffness parameter information generating unit 111 according to the first embodiment. The stiffness parameter information generating unit 2302 has the function for generating the stiffness parameter information for changing the stiffness according to the touch force displacement information acquired from the touch force displacement calculating unit 2301 in addition to a function in the stiffness parameter information generating unit 111 according to the first embodiment. The added function is described below.

Based on the displacement of the force acquired from the touch force displacement calculating unit 2301, when the displacement of the force exceeds a predetermined threshold value, the stiffness parameter information generating unit 2302 generates the stiffness parameter of the arm 102 so that the position and the orientation of the touch panel display 303 change. When the displacement of the force does not exceed the predetermined threshold value, the stiffness parameter information generating unit 2302 generates the stiffness parameter of the arm 102 so that the position and the orientation of the touch panel display 303 do not change. Concretely, the stiffness parameter information generating unit 2302 acquires the touch force displacement information and the time information from the touch force displacement calculating unit 2301. The stiffness parameter information generating unit 2302 derives displacements of forces (Fx, Fy, Fz) and torques (Mx, My, Mz) at a time when the person 301 makes contact with the touch panel display 303 based on the acquired touch force displacement information. The stiffness parameter information generating unit 2302 compares absolute values of the derived displacements of the forces and the torques with threshold values. The magnitudes of the threshold values are, for example, 10.0 N/ms for the displacements of the forces (Fx, Fy, Fz), and 1000.0 Nmm/ms for the displacements of the torques (Mx, My, Mz). The person 301 inputs them to the stiffness parameter information generating unit 2302 using the input/output IF 113. The user tunes the threshold values based on threshold values provided by a manufacture of a robot arm control apparatus using the input/output IF 113. When the stiffness parameter information generating unit 2302 decides that the derived displacements of the forces and the torques are larger than the threshold values, the stiffness of the forces and the torques on the axes is not set high by the stiffness parameter information generating unit 2302.

The stiffness on the axes that exceed the threshold values is set low by the stiffness parameter information generating unit 2302, but the stiffness on all the axes can be set low by the stiffness parameter information generating unit 2302.

In this manner, the stiffness parameter information generating unit 2302 compares the displacements of the forces and the torques with the threshold values so as to decide whether the person 301 touches or collides with the touch panel display 303. As a result of the decision in the stiffness parameter information generating unit 2302, when the stiffness parameter information generating unit 2302 decides that the person 301 collides with the touch panel display 303 (when the stiffness parameter information generating unit 2302 decides that the displacements of the forces and the torques are larger than the threshold values), the stiffness parameter information generating unit 2302 does not set the stiffness high but sets the stiffness low so that safety is heightened.

Figure 25:
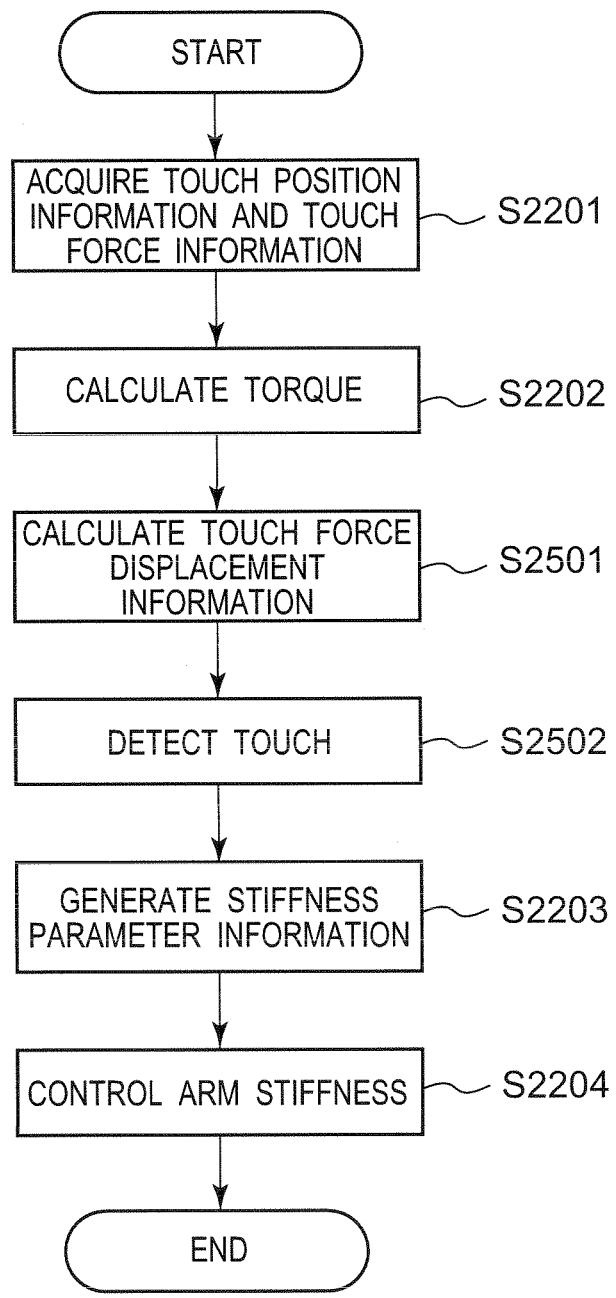
FIG. 25 is a flowchart illustrating a manipulation procedure of a control apparatus of the robot according to the second embodiment of the present disclosure.

<Flowchart>
The manipulation procedure of the control apparatus 103B of the arm 102 according to the second embodiment is described with reference to a flowchart in FIG. 25.

One example of the manipulation in the control apparatus 103B of the arm 102 according to the second embodiment is similar to that in FIG. 21. The arm stiffness control at step S2104 in the flowchart of FIG. 21 is described with reference to FIG. 25.

Firstly, the touch position information acquiring unit 108 acquires the touch position information and the touch force information acquiring unit 109 acquires the touch force information at step S2201, and the sequence goes to step S2202.

Next, the torque calculating unit 110 calculates a torque applied to the touch panel display 303 at step S2202 based on the touch position information and the touch force information acquired from the touch position information acquiring unit 108 and the touch force information acquiring unit 109, respectively, and the sequence goes to step S2501.

Next, the touch force displacement calculating unit 2301 calculates the touch force displacement information at step S2501 based on the touch force information acquired from the touch force information acquiring unit 109, and the sequence goes to step S2502.

Next, the stiffness parameter information generating unit 2302 detects the touch on the touch panel display 303 by the person 301 at step S2502 based on the touch force displacement information acquired from the touch force displacement calculating unit 2301, and the sequence goes to step S2203.

Next, the stiffness parameter information generating unit 2302 generates the stiffness parameter information at step S2203 based on the touch force information acquired from the touch force information acquiring unit 109 and the torque information acquired from the torque calculating unit 110, and the sequence goes to step S2204.

Next, the arm control unit 112 controls the stiffness of the arm 102 at step S2204 according to the stiffness parameter information acquired from the stiffness parameter information generating unit 2302 via the input/output IF 113 and the motor driver 114.

Effect of Second Embodiment

The stiffness parameter information generating unit 2302 decides whether the person 301 touches or collides with the display portion 303a based on the displacement of the force at the time when the person 301 makes contact with the display portion 303a. When the stiffness parameter information generating unit 2302 decides that the person 301 collides with the display portion 303a, the stiffness of the arm 102 is set low, so that safety can be improved.

Third Embodiment

Figure 26:
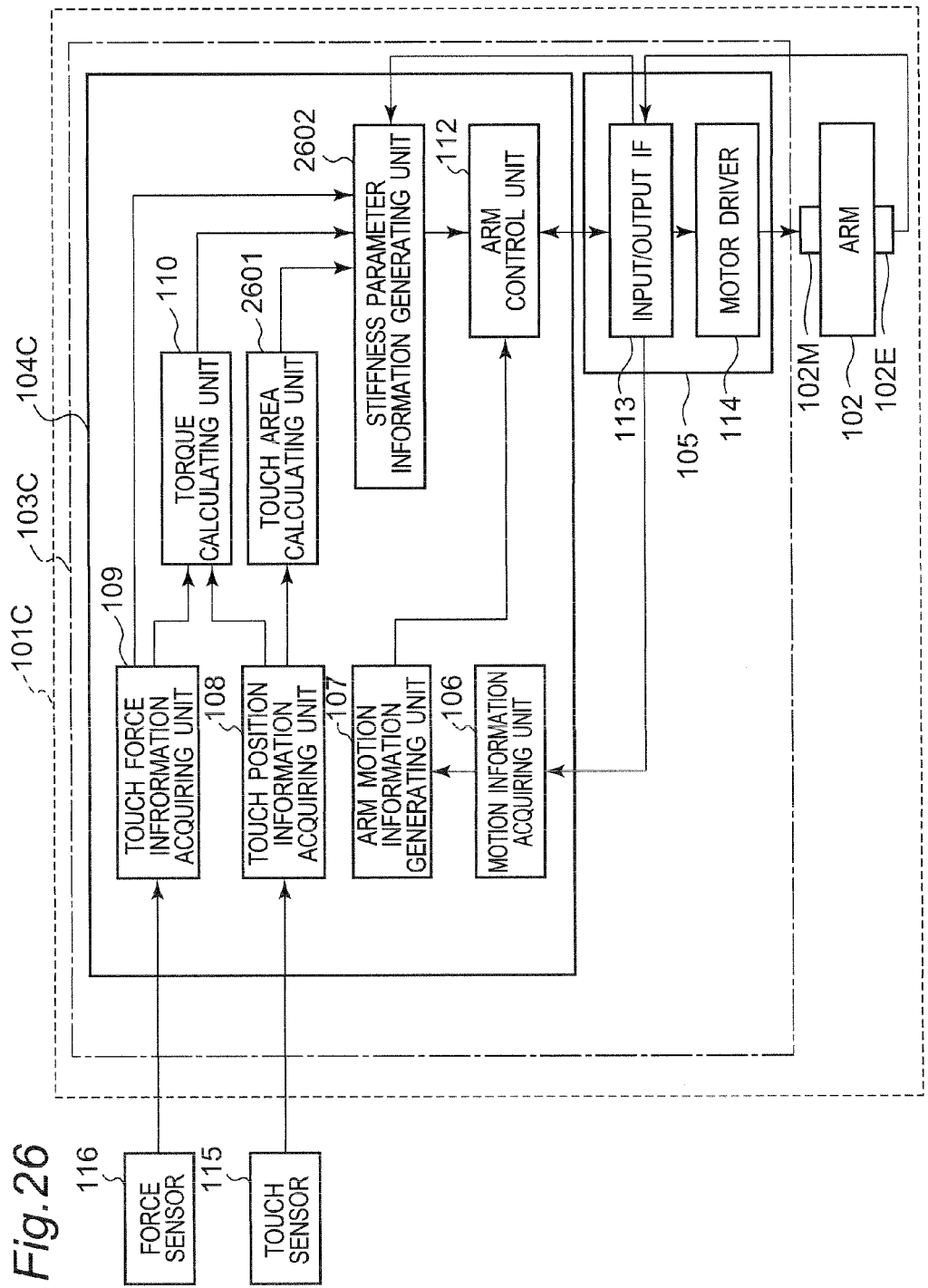
FIG. 26 is a block diagram illustrating a robot arm in a robot according to a third embodiment of the present disclosure.

FIG. 26 is a block diagram illustrating the robot 101C according to a third embodiment of the present disclosure. In a robot 101C according to the third embodiment of the present disclosure, the arm 102, the peripheral device 105, the motion information acquiring unit 106, the arm motion information generating unit 107, the touch position information acquiring unit 108, the touch force information acquiring unit 109, and the arm control unit 112 in a control apparatus main body 104C of a control apparatus 103C are similar to those in the first embodiment. For this reason, members common with those in the first embodiment are denoted by the same reference symbols, the description thereof is omitted, and only different portions are described in detail below.

A touch area calculating unit 2601 acquires position information from the touch position information acquiring unit 108, and calculates a touch area based on the acquired position information. Concretely, the touch area calculating unit 2601 acquires touch position information and time information from the touch position information acquiring unit 108.

The touch area calculating unit 2601 generates touch area information based on the acquired touch position information and time information. The touch area information represents an area on the touch panel display 303 touched by the person 301.

A method for calculating the touch area information in the touch area calculating unit 2601 is described.

Figure 27A:
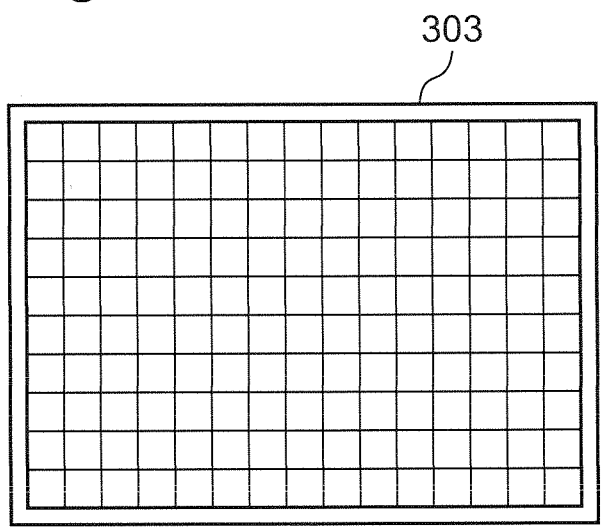
FIG. 27A is an explanatory view illustrating a method for calculating touch area information in the robot according to the third embodiment of the present disclosure.
Figure 27B:
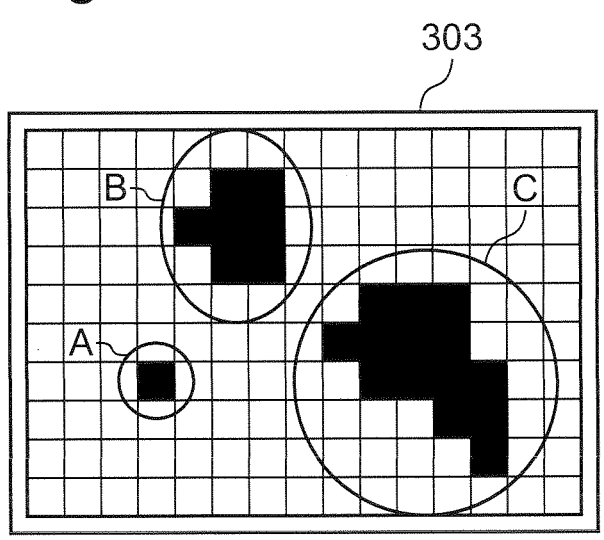
FIG. 27B is an explanatory view illustrating a method for calculating touch area information in the robot according to the third embodiment of the present disclosure.

As one example, the touch panel display 303 of the display portion 303a with 15 mm×10 mm shown in FIG. 27A is described. As one example, it is assumed that the contact with the touch panel display 303 shown in FIG. 27B occurs. In FIG. 27B, black cells represent contacted portions (the touch position information indicates 1), and white cells represent non-contact portions (the touch position information indicates 0). Therefore, a total of the contacted cells (area) is obtained, so that the touch area information is derived by the touch area calculating unit 2601. In FIG. 27B, since the number of black cells is 22, the touch area information indicates 22 mm$^2$.

As the method for calculating the touch areas in the touch area calculating unit 2601, an area of continuous position information may be obtained by the touch area calculating unit 2601, and then, the largest area in the obtained areas may be calculated as the touch area by the touch area calculating unit 2601. As a concrete example, in FIG. 27B, since the continuous position information indicates three places of 1 mm$^2$ (reference symbol A in FIG. 27B), 7 mm$^2$ (reference symbol B in FIG. 27B), and 14 mm$^2$ (reference symbol C in FIG. 27B), the largest area of 14 mm$^2$ is calculated as the touch area information by the touch area calculating unit 2601.

The touch area calculating unit 2601 outputs the calculated touch area information and time information to a stiffness parameter information generating unit 2602.

The stiffness parameter information generating unit 2602 is provided to a control apparatus main body 104C instead of the stiffness parameter information generating unit 111 according to the first embodiment. The stiffness parameter information generating unit 2602 has a function for generating the stiffness parameter information for changing the stiffness according to the touch area information acquired from the touch area calculating unit 2601 in addition to the function of the stiffness parameter information generating unit 111 according to the first embodiment. The added function is described below.

Based on the touch area acquired from the touch area calculating unit 2601, when the touch area exceeds the predetermined threshold value, the stiffness parameter information generating unit 2602 generates the stiffness parameter of the arm 102 so that the position and the orientation of the touch panel display 303 change. When the touch area does not exceed the predetermined threshold value, the stiffness parameter information generating unit 2602 generates the stiffness parameter of the arm 102 so that the position and the orientation of the touch panel display 303 do not change. Concretely, the stiffness parameter information generating unit 2602 acquires the touch area information and the time information from the touch area calculating unit 2601. The stiffness parameter information generating unit 2602 compares the acquired touch area information with the threshold value. The person 301 inputs the magnitude of the threshold value of, for example, 100 mm$^2$ into the stiffness parameter information generating unit 2602 using the input/output IF 113. The user tunes the threshold value based on a threshold value provided by a manufacture of a robot arm control apparatus using the input/output IF 113. When the stiffness parameter information generating unit 2602 decides that the acquired touch area information is larger than the threshold value, the stiffness parameter information generating unit 2602 does not set the stiffness of all the axes high.

When the stiffness parameter information generating unit 2602 decides that the touch area information exceeds the threshold value, the stiffness parameter information generating unit 2602 can set the stiffness low for only the axis whose force and the torque to be applied to the touch panel display 303 exceeds the threshold values. The magnitude of the threshold value is, for example, 10.0 N for the force, and 1000 Nmm for the torque, and the person 301 can input the threshold values into the stiffness parameter information generating unit 2602 using the input/output IF 113.

In this manner, the stiffness parameter information generating unit 2602 compares the touch area with the threshold value so as to decide whether the person 301 touches or collides with the touch panel display 303. As a result of the decision in the stiffness parameter information generating unit 2602, when the stiffness parameter information generating unit 2602 decides as collision (when the stiffness parameter information generating unit 2602 decides that the touch area is larger than the threshold value), the stiffness parameter information generating unit 2602 does not set the stiffness high so that safety can be heightened.

Further, when the touch area calculating unit 2601 detects the contact, the touch area calculating unit 2601 may calculate the time displacement of the touch area, and when the time displacement is large, the stiffness parameter information generating unit 2602 can set the stiffness low. When the time displacement is small, the stiffness parameter information generating unit 2602 can set the stiffness high. In such a manner, the stiffness parameter information generating unit 2602 sets the stiffness low at the time of the contact, and when the touch panel display 303 is held by a hand that does not perform the touch manipulation, the stiffness parameter information generating unit 2602 can set the stiffness high.

Figure 28A:
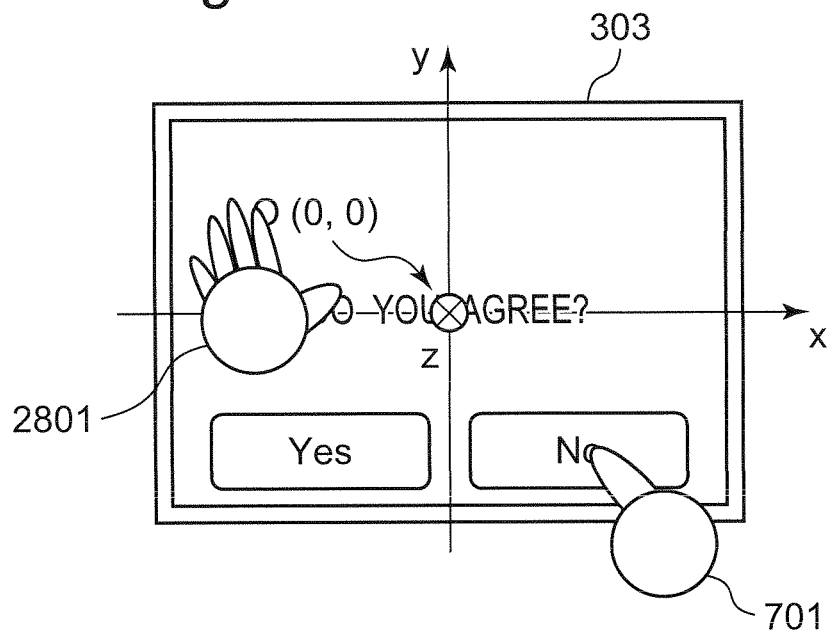
FIG. 28A is an explanatory view illustrating time displacement of the touch area information in the robot according to the third embodiment of the present disclosure.
Figure 28B:
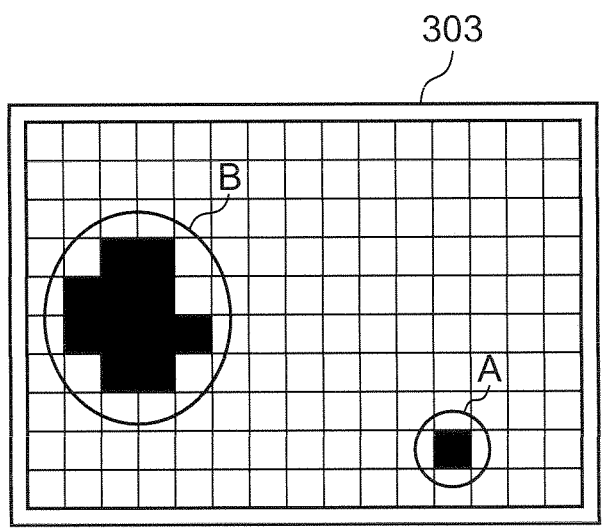
FIG. 28B is an explanatory view illustrating time displacement of the touch area information in the robot according to the third embodiment of the present disclosure.

For example, when the touch panel display 303 is held by a hand 2801 that is not the hand 701 performing the touch manipulation as shown in FIG. 28A, the touch area of reference symbol B in FIG. 28B is large but the time displacement is small. For this reason, the stiffness parameter information generating unit 2602 sets the stiffness high. When the stiffness parameter information generating unit 2602 sets the stiffness high, the touch panel display 303 does not move to a direction where the touch panel display 303 is held, so that the touch manipulation is easily performed.

Figure 28C:
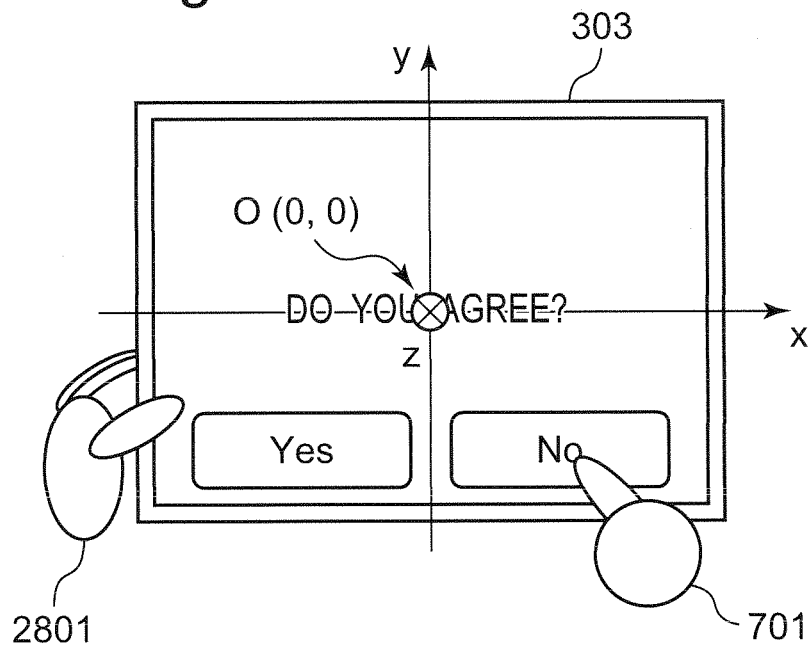
FIG. 28C is an explanatory view illustrating time displacement of the touch area information in the robot according to the third embodiment of the present disclosure.
Figure 28D:
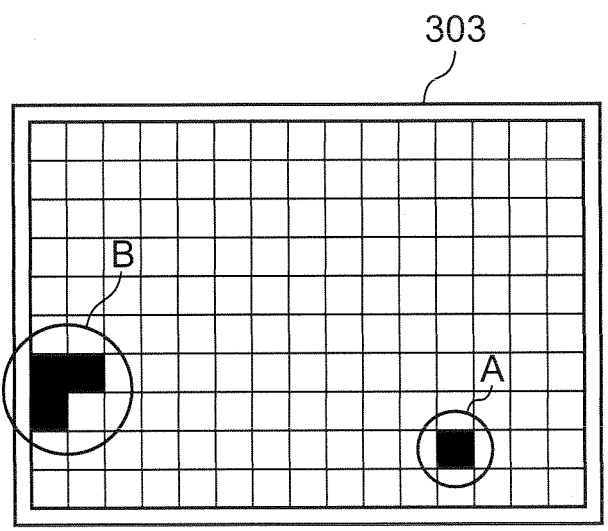
FIG. 28D is an explanatory view illustrating time displacement of the touch area information in the robot according to the third embodiment of the present disclosure.

Further, in another example, when the side portion of the touch panel display 303 is held by the hand 2801 as shown in FIG. 28C, the touch area of reference symbol B in FIG. 28D is large but the time displacement is small. For this reason, the stiffness parameter information generating unit 2602 sets the stiffness high. When the stiffness parameter information generating unit 2602 sets the stiffness high, the touch panel display 303 does not move to a direction where the touch panel display 303 is held, so that the touch manipulation is easily performed.

<Flowchart>

Figure 29:
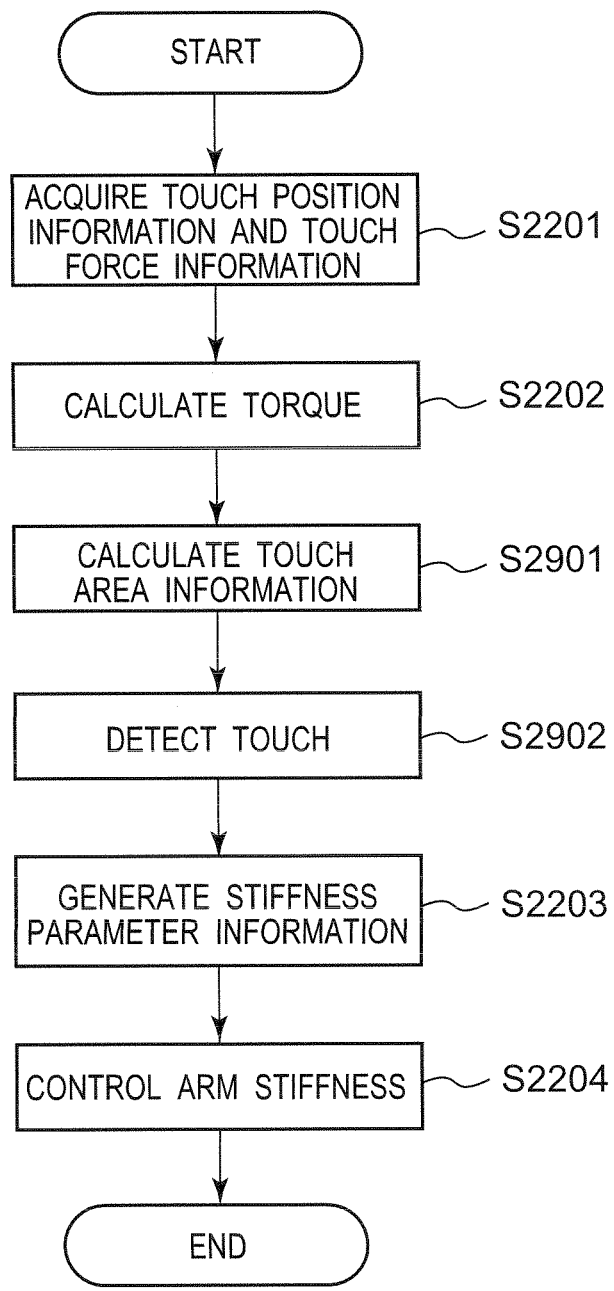
FIG. 29 is a flowchart illustrating a manipulation procedure of a control apparatus of the robot according to the third embodiment of the present disclosure.

A manipulation procedure of the control apparatus 103C of the arm 102 according to the third embodiment is described with reference to a flowchart of FIG. 29.

One example of the manipulation in the control apparatus 103C of the arm 102 according to the third embodiment is similar to that in FIG. 21. The control of the stiffness of the arm at step S2104 in the flowchart shown in FIG. 21 is described with reference to FIG. 29.

Firstly, the touch position information acquiring unit 108 acquires the touch position information and the touch force information acquiring unit 109 acquires the touch force information at step S2201, and the sequence goes to step S2202.

Next, the torque calculating unit 110 calculates the torque to be applied to the touch panel display 303 at step S2202 based on the touch position information and the touch force information acquired by the touch position information acquiring unit 108 and the touch force information acquiring unit 109, respectively, and the sequence goes to step S2901.

Next, the touch area calculating unit 2601 calculates the touch area information at step S2901 based on the touch position information acquired from the touch force information acquiring unit 109, and the sequence goes to step S2902.

Next, the stiffness parameter information generating unit 2602 detects the touch on the touch panel display 303 by the person 301 at step S2902 based on the touch area information acquired from the touch force area calculating unit 2601, and the sequence goes to step S2203.

Next, the stiffness parameter information generating unit 111 generates the stiffness parameter information at step S2203 based on the touch force information acquired from the touch force information acquiring unit 109 and the torque information acquired from the torque calculating unit 110, and the sequence goes to step S2204.

Next, the arm control unit 112 controls the stiffness of the arm 102 via the input/output IF 113 and the motor driver 114 at step S2204 according to the stiffness parameter information acquired from the stiffness parameter information generating unit 111.

Effect of the Third Embodiment

The stiffness parameter information generating unit 2602 decides whether the person 301 touches or collides with the display portion 303a based on the touch area at the time when the person 301 makes contact with the display portion 303a. When the stiffness parameter information generating unit 2602 decides that the person 301 collides with the display portion 303a, the stiffness parameter information generating unit 111 sets the stiffness low, so that safety can be improved.

Fourth Embodiment

In the first embodiment, the stiffness of the arm 102 is set high based on the force information and the position information at the time when the touch panel display 303 is touched. By contrast, in a fourth embodiment, a decision is made whether the person 301 touches or does not touch the touch panel display 303 based on the acquired force information and position information. Only when the touch panel display 303 is touched, the stiffness of the arm 102 is set high.

Figure 32:
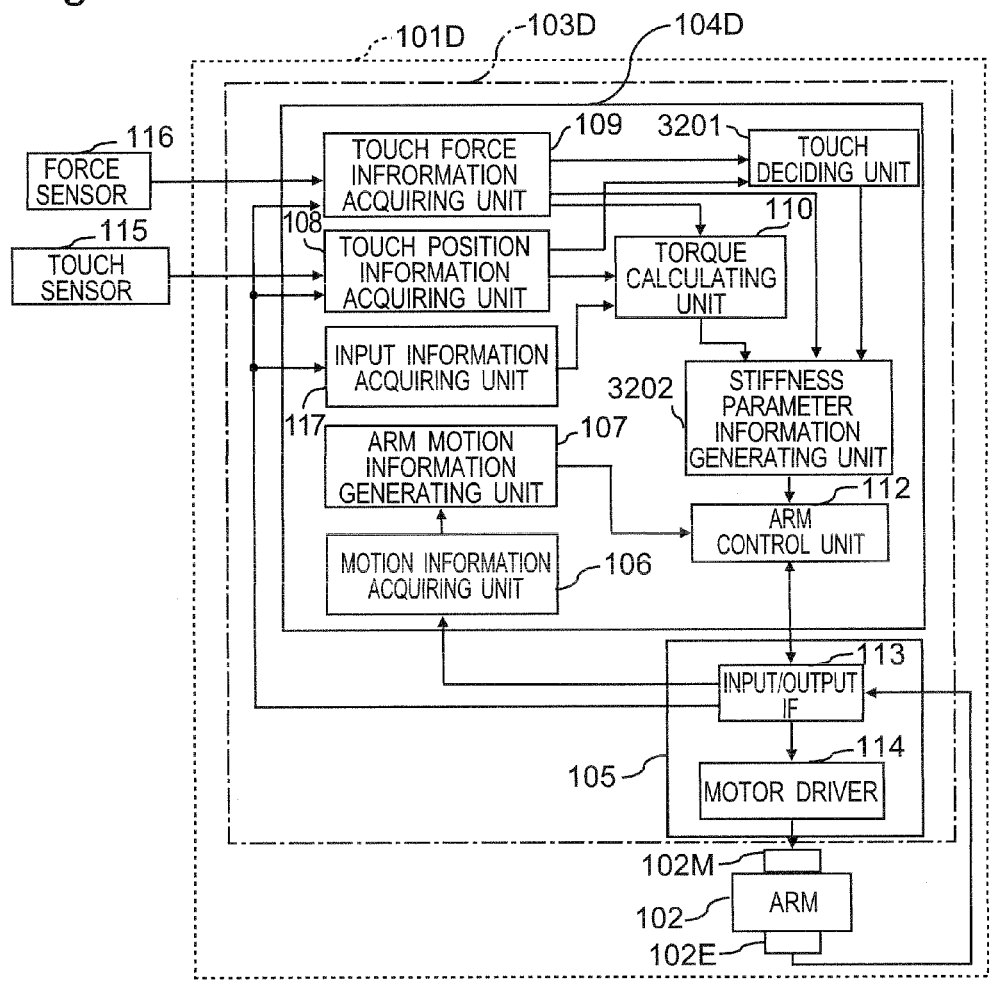
FIG. 32 is a block diagram illustrating an arm in a robot according to a fourth embodiment.

FIG. 32 is a block diagram illustrating a robot 101D according to the fourth embodiment of the present disclosure. In the robot 101D according to the fourth embodiment of the present disclosure, the robot arm 102, the peripheral device 105, the motion information acquiring unit 106, the arm motion information generating unit 107, the touch position information acquiring unit 108, the touch force information acquiring unit 109, the torque calculating unit 110, the arm control unit 112 in a control apparatus 104D, and the input information acquiring unit 117 are similar to those in the first embodiment. For this reason, the common portions are denoted by the same reference symbols and the description thereof are omitted, and only different portions are described in detail below.

A touch deciding unit 3201 acquires touch position information and time information from the touch position information acquiring unit 108, and touch force information and time information from the touch force information acquiring unit 109 so as to decide whether the person 301 touches the touch panel display 303.

A deciding method in the touch deciding unit 3201 is described. The touch deciding unit 3201 decides whether touch is performed using the touch position information from the touch position information acquiring unit 108 and the touch force information from the touch force information acquiring unit 109. Only when the touch position information acquiring unit 108 detects contact on at least one or more positions in the touch position information (the position information indicates 1), and the touch force information acquiring unit 109 detects a force on at least one or more positions in the touch force information (the information that a value of the force sensor is not 0), the touch deciding unit 3201 detects that the touch occurs. In the other states, the touch deciding unit 3201 decides that the touch does not occur. For example, when the touch position information acquiring unit 108 detects that the touch position information indicates no contact on all the positions (the position information indicates 0) and the touch force information acquiring unit 109 detects that the touch force information indicates at least one or more position to which the force is applied (the information representing that the value of the force sensor is not 0), the touch deciding unit 3201 decides that no touch occurs. In this example, the person 301 applies the force to a display 303, but does not make contact with a screen (a display portion 303a). That is, this is a state where the person 301 holds an edge of the display 303.

When the touch deciding unit 3201 decides that the touch occurs, the touch deciding unit 3201 generates the touch detection information that indicates 1, and when the touch deciding unit 3201 decides that no touch occurs, the touch deciding unit 3201 generates the touch detection information that indicates 0. The touch deciding unit 3201 outputs the touch detection information and time information generated by the touch deciding unit 3201 to a stiffness parameter information generating unit 3202.

The stiffness parameter information generating unit 3202 is provided to the control apparatus main body 104D instead of the stiffness parameter information generating unit 111 in the first embodiment. In addition to the function of the stiffness parameter information generating unit 111 in the first embodiment, the stiffness parameter information generating unit 3202 generates the stiffness parameter information based on the touch detection information acquired from the touch deciding unit 3201.

When the touch detection information acquired from the touch deciding unit 3201 by the stiffness parameter information generating unit 3202 indicates 1 (touch occurs), the stiffness parameter information generating unit 3202 generates the stiffness parameter information so that the stiffness is set high in the method similar to the first embodiment. When the touch detection information acquired from the touch deciding unit 3201 by the stiffness parameter information generating unit 3202 indicates 0 (no touch occurs), the stiffness parameter information generating unit 3202 generates the stiffness parameter information so that the stiffness does not change.

Only when the touch deciding unit 3201 decides that the touch occurs, the stiffness parameter information generating unit 3202 sets the stiffness high. As a result, when the person 301 touches the touch panel display 303, the person 301 can touch the touch panel display 303 while the touch panel display 303 does not move. Further, when the touch deciding unit 3201 decides that no touch occurs, the stiffness parameter information generating unit 3202 does not change the stiffness. For this reason, when the person 301 holds the edge of the touch panel display 303, the touch panel display 303 can be moved with a light force.

<Flowchart>

A manipulation procedure of the control apparatus 103D of an arm 102 in the fourth embodiment is described with reference to a flowchart in FIG. 33.

One example of the manipulation of the control apparatus 103D of the arm 102 in the fourth embodiment is similar to that in FIG. 21. Control of the stiffness of the arm at step S2104 in the flowchart shown in FIG. 21 is described with reference to FIG. 33.

Firstly, the touch position information acquiring unit 108 acquires the touch position information and the touch force information acquiring unit 109 acquires the touch force information at step S2201, and the sequence goes to step S2202.

Next, at step S2202, the torque calculating unit 110 acquires the touch position information acquired from the touch position information acquiring unit 108 and the touch force information acquired from the touch force information acquiring unit 109, calculates a torque to be applied to the touch panel display 303 based on these information, and outputs the calculated torque information to the stiffness parameter information generating unit 3202. The sequence then goes to step S3301.

Next, at step S3301, the touch deciding unit 3201 acquires the touch position information acquired from the touch position information acquiring unit 108 and the touch force information acquired from the touch force information acquiring unit 109, and decides whether or not the touch occurs based on these information so as to output information about the decided result to the stiffness parameter information generating unit 3202. When the touch deciding unit 3201 decides that the touch occurs, the sequence goes to step S3302. When the touch deciding unit 3201 decides that no touch occurs, the sequence goes to step S3303.

Next, the stiffness parameter information generating unit 3202 generates the stiffness parameter information at step S3302 so that the stiffness is set high, based on the torque information acquired from the torque calculating unit 110 and the decided result in the touch deciding unit 3201, and the sequence goes to step S2204.

Next, the stiffness parameter information generating unit 3202 generates the stiffness parameter information at step S3303 so that the stiffness does not change, based on the torque information acquired from the torque calculating unit 110 and the decided result in the touch deciding unit 3201, and the sequence goes to step S2204.

Next, the arm control unit 112 controls the stiffness of the arm 102 via the input/output IF 113 and the motor driver 114 at step S2204 according to the stiffness parameter information acquired from the stiffness parameter information generating unit 3202.

Step S2202 may be executed simultaneously with above step 3301.

Effect of the Fourth Embodiment

Only when the touch deciding unit 3201 decides whether the touch occurs or not, and the touch deciding unit 3201 decides that the touch occurs, the stiffness parameter information generating unit 3202 generates the stiffness parameter information so that the stiffness is set high. For this reason, maneuverability of the touch panel display 303 can be improved more accurately.

An example where the touch panel display 303 is integral with the arm 102 is described, but a configuration such that the touch panel display 303 is attachable to the arm 102 can be adopted. For example, when the touch panel display 303 is a mobile device with a touch panel display, such as a tablet or a smart phone, such a configuration can be used.

In the first to fourth embodiments, as to the stiffness adjustment amount, when interaction takes place between the person 301 and the touch panel display 303, the movement amount of the touch panel display 303 is desirably set within a sufficiently small range. The stiffness adjustment amount is helpful to be set particularly depending on the state of the touch panel display 303 with respect to the person 301. For example as shown in FIG. 10, even in the same touching manipulation or the keyboard manipulation, the force to be applied to the touch panel display 303 varies depending on a positional relationship between the person 301 and the touch panel display 303. Therefore, the adjustment amount of the stiffness is helpful to be changed by the stiffness parameter information generating units 111, 2302 and 2602 in advance according to environments where the touch panel display 303 with the arm is used.

In the second embodiment and the third embodiment, collision is detected, and the stiffness is set low. In another manner, by moving back the touch panel display 303 once at a time point when the contacts with the touch panel display 303 is detected and, based on time series data obtained thereafter, the stiffness parameter information generating units 2302 or 2602 may set the stiffness high in a case where the stiffness parameter information generating unit 2302 or 2602 decides as a touch manipulation. When the stiffness parameter information generating unit 2302 or 2602 decides as collision, the stiffness parameter information generating unit 2302 or 2602 may set the stiffness low. That is, a countermeasure can be taken by using the motion of the touch panel display 303.

Though the present disclosure has been described above based on the above first to fourth embodiments and modifications, the present disclosure should not be limited to the above-described first to fourth embodiments and modifications. For example, the present disclosure also includes the following cases.

Part or entirety of each of the above-described control apparatuses is actually a computer system that includes, for example, a microprocessor, ROM, RAM, hard disk unit, display unit, keyboard, mouse, and the like. A computer program is stored on the RAM or the hard disk unit. Functions of each of the apparatuses can be achieved by the microprocessor operating according to the computer program. The computer program mentioned here is a combination of a plurality of instruction codes that indicate commands to a computer for achieving predetermined functions.

For example, each component can be implemented as a result that a program executing section (part/unit) such as a CPU reads and executes software programs recorded in a recording medium such as a hard disk or semiconductor memory. Here, software that implements a part or entirety of the apparatus according to each of the above-mentioned embodiments is a following program. That is to say, this program has a computer execute the sections (parts/units) defined in claims. The program has a computer execute the units/steps defined in claims. That is, such a program is an arm control program for controlling a position and an orientation of a touch panel display, the program allows a computer to function as:

a touch position information acquiring unit that acquires a position on a screen of the touch panel display touched by a person;

a touch force information acquiring unit that acquires a force on the screen touched by the person;

a torque calculating unit that calculates a torque to be applied to the touch panel display based on the position acquired by the touch position information acquiring unit and the force acquired by the touch force information acquiring unit;

a stiffness parameter information generating unit that generates information about a stiffness parameter for controlling the arm so that the position and the orientation of the touch panel display do not change based on the torque calculated by the torque calculating unit; and an arm control unit that controls the arm based on the information about the stiffness parameter generated by the stiffness parameter information generating unit.

In addition, it may be possible to execute the program by downloading it from a server or reading it from a predetermined storage medium (an optical disc such as a CD-ROM, a magnetic disc, a semiconductor memory, or the like).

Further, one or more computers can be used to execute the program. That is, centralized processing or distributed processing can be performed.

By properly combining the arbitrary embodiment (s) or modification(s) of the aforementioned various embodiments and modifications, the effects possessed by the embodiment (s) or modification(s) can be produced.

INDUSTRIAL APPLICABILITY

An arm control apparatus, an arm control method, a robot, an arm control program, and an integrated electronic circuit for arm control of the present disclosure have the following characteristics. The stiffness of the arm is adjusted according to the position and the force at the time when the person makes contact with the display portion, so that the person can move a touch panel display with a light force, and the person can touch the display portion such that the touch panel display does not move to the direction where the person pushes the touch panel display at the time of touch. For this reason, the arm control apparatus and control method, the robot, the arm control program, and the integrated electronic circuit for arm control of the present disclosure are useful as an arm control apparatus and control method, a robot, an arm control program, and an integrated electronic circuit for arm control in a touch panel display with arm for home use. Further, the arm control apparatus and control method, the robot, the arm control program, and the integrated electronic circuit for arm control of the present disclosure are not limited to a device for home use, and can be applied as an arm control apparatus and control method, a robot, an arm control program, and an integrated electronic circuit for arm control in a touch panel display with arm for industrial use or a touch panel display with arm for medical use.

The entire disclosure of Japanese Patent Application No. 2012-256518 filed on Nov. 22, 2012, including specification, claims, drawings, and summary are incorporated herein by reference in its entirety.

Although the present disclosure has been fully described in connection with the embodiments thereof with reference to the accompanying drawings, it is to be noted that various changes and modifications are apparent to those skilled in the art. Such changes and modifications are to be understood as included within the scope of the present disclosure as defined by the appended claims unless they depart therefrom.

What is claimed is:

1. An arm control apparatus for controlling a position and an orientation of a touch panel display, the apparatus comprising:

a touch position information acquiring unit that acquires a position on a screen of the touch panel display touched by a person;

a touch force information acquiring unit that acquires a force on the screen touched by the person;

a torque calculating unit that calculates a torque to be applied to the touch panel display based on the position acquired by the touch position information acquiring unit and the force acquired by the touch force information acquiring unit;

a stiffness parameter information generating unit that generates information about a stiffness parameter for controlling the arm so that the position and the orientation of the touch panel display do not change based on the torque calculated by the torque calculating unit; and an arm control unit that controls the arm based on the information about the stiffness parameter generated by the stiffness parameter information generating unit.

2. The arm control apparatus according to claim 1, wherein the touch force information acquiring unit acquires force information about a pushing force to be vertically applied to a surface of the screen of the touch panel display and a frictional force to be horizontally applied to the surface of the screen of the touch panel display, the touch position information acquiring unit acquires position information that is changed when the person traces along the screen of the touch panel display while touching, the torque calculating unit:

calculates a torque whose axis is horizontal to the surface of the screen of the touch panel display based on the force information about the pushing force to be vertically applied to the surface of the screen of the touch panel display and the position information acquired by the touch position information acquiring unit; and calculates a torque whose axis is vertical to the screen of the touch panel display based on the force information about the frictional force to be horizontally applied to the screen of the touch panel display and the position information acquired by the touch position information acquiring unit.

3. The arm control apparatus according to claim 2, wherein the touch force information acquiring unit acquires the force information that changes such that:

(1) the pushing force is applied that vertically pushes to the surface of the screen of the touch panel display;

(2) the pushing force is applied that pushes vertically to the surface of the screen of the touch panel display and the frictional force is applied that is horizontally applied to the surface of the screen of the touch panel display; and (3) the force is not applied to the touch panel display, the touch position information acquiring unit acquires the position information that changes such that:

(1) the screen of the touch panel display is touched;

(2) a position on the screen of the touch panel display touched while being traced by the person changes in any direction; and (3) the person leaves the screen of the touch panel display, the stiffness parameter information generating unit generates the stiffness parameter that changes such that:

(1) the torque calculating unit calculates the torque whose axis is horizontal to the surface of the screen of the touch panel display based on the force for vertically pushing the surface of the screen of the touch panel display acquired by the touch force information acquiring unit, and the stiffness parameter information generating unit calculates the stiffness parameter of the arm based on the calculated torque so that the position and the orientation of the touch panel display do not change;

(2) the torque calculating unit calculates the torque whose axis is horizontal to the surface of the screen of the touch panel display and the torque whose axis is vertical to the surface of the screen of the touch panel display based on the force for vertically pushing the surface of the screen of the touch panel display and the frictional force horizontally applied to the touch panel display, and the stiffness parameter information generating unit calculates the stiffness parameter of the arm based on the calculated torque so that the position and the orientation of the touch panel display do not change; and (3) the stiffness parameter information generating unit calculates the stiffness parameter of the arm of a case where the force is not applied to the touch panel display.

4. The arm control apparatus according to claim 2, wherein the touch force information acquiring unit acquires the force information that changes such that:

(1) the pushing force is applied that pushes vertically to the surface of the screen of the touch panel display;

(2) the pushing force is applied that pushes vertically to the surface of the screen of the touch panel display and the frictional force is applied that is horizontally applied to the surface of the screen of the touch panel display; and (3) the force is not applied to the touch panel display, the touch position information acquiring unit acquires the position information that changes such that:

(1) the person multi-touches the screen of the touch panel display;

(2) positions on the screen of the touch panel display multi-touched by the person are shifted so as to be separated from each other; and (3) the person leaves the screen of the touch panel display, the stiffness parameter information generating unit generates the stiffness parameter that changes such that:

(1) the torque calculating unit calculates the torque whose axis is horizontal to the surface of the screen of the touch panel display based on the force for vertically pushing the surface of the screen of the touch panel display, and the stiffness parameter information generating unit calculates the stiffness parameter of the arm based on the calculated torque so that the position and the orientation of the touch panel display do not change;

(2) the torque calculating unit calculates the torque whose axis is horizontal to the surface of the screen of the touch panel display and the torque whose axis is vertical to the surface of the screen of the touch panel display based on the force for vertically pushing the surface of the screen of the touch panel display and the frictional force horizontally applied to the surface of the screen of the touch panel display, and the stiffness parameter information generating unit calculates the stiffness parameter of the arm based on the calculated torque so that the position and the orientation of the touch panel display do not change; and (3) the stiffness parameter information generating unit calculates the stiffness parameter of the arm of a case where the force is not applied to the touch panel display.

5. The arm control apparatus according to claim 2, wherein the touch force information acquiring unit acquires the force information that changes such that:

(1) the pushing force is applied that pushes vertically to the surface of the screen of the touch panel display;

(2) the pushing force is applied that pushes vertically to the surface of the screen of the touch panel display and the frictional force is applied that is horizontally applied to the surface of the screen of the touch panel display; and (3) the force is not applied to the touch panel display, the touch position information acquiring unit acquires the position information that changes such that:

(1) the person multi-touches the screen of the touch panel display;

(2) positions on the screen of the touch panel display multi-touched by the person are shifted so as to come closer to each other; and (3) the person leaves the screen of the touch panel display, the stiffness parameter information generating unit calculates the stiffness parameter that changes such that:

(1) the torque calculating unit calculates the torque whose axis is horizontal to the surface of the screen of the touch panel display based on the force for vertically pushing the surface of the screen of the touch panel display, and the stiffness parameter information generating unit calculates the stiffness parameter of the arm based on the calculated torque so that the position and the orientation of the touch panel display do not change;

(2) the torque calculating unit calculates the torque whose axis is horizontal to the surface of the screen of the touch panel display and a torque whose axis is vertical to the surface of the screen of the touch panel display based on the force for vertically pushing the surface of the screen of the touch panel display and the frictional force horizontally applied to the surface of the screen of the touch panel display, and the stiffness parameter information generating unit calculates the stiffness parameter of the arm based on the calculated torque so that the position and the orientation of the touch panel display do not change; and (3) the stiffness parameter information generating unit generates the stiffness parameter of the arm of a case where a force is not applied to the touch panel display.

6. The arm control apparatus according to claim 1, wherein the touch force information acquiring unit acquires force information about a pushing force vertically applied to a surface of the screen of the touch panel display and about a case where the force is not applied to the screen of the touch panel display, the touch position information acquiring unit acquires position information of a case where the person repeats touch on the screen of the touch panel display at a plurality of times, the stiffness parameter information generating unit generates the stiffness parameter that changes such that:

(1) the torque calculating unit calculates a torque whose axis is horizontal to the surface of the screen of the touch panel display based on the force information about the pushing force vertically applied to the surface of the screen of the touch panel display and the position information acquired by the touch position information acquiring unit, and the stiffness parameter information generating unit calculates the stiffness parameter of the arm based on the calculated torque so that the position and the orientation of the touch panel display do not change; and (2) when the force is not applied to the touch panel display, the torque calculating unit does not calculate the torque and the stiffness parameter information generating unit calculates the stiffness parameter of the arm.

7. The arm control apparatus according to claim 2, wherein the touch force information acquiring unit acquires the force information that changes such that:

(1) the pushing force is applied that is vertically applied to the surface of the screen of the touch panel display; and
(2) no force is applied to the screen of the touch panel display,
the touch position information acquiring unit acquires the position information that repeatedly changes at a plurality of times such that:
(1) the person touches the screen of the touch panel display; and
(2) the person leaves the screen of the touch panel display,
the stiffness parameter information generating unit generates the stiffness parameter that changes such that:
(1) the torque calculating unit calculates the torque whose axis is horizontal to the surface of the screen of the touch panel display based on the force for vertically pushing the surface of the screen of the touch panel display, and the stiffness parameter information generating unit calculates the stiffness parameter of the arm based on the calculated torque so that the position and the orientation of the touch panel display do not change; and
(2) the stiffness parameter information generating unit calculates the stiffness parameter of the arm of a case where no force is applied to the screen of the touch panel display.

8. The arm control apparatus according to claim 1, further comprising:
a touch force displacement calculating unit that acquires force information from the touch force information acquiring unit and calculates a displacement of the force based on the acquired force information, wherein
the stiffness parameter information generating unit generates the stiffness parameter of the arm so that the position and the orientation of the touch panel display change in a case where the displacement of the force exceeds a predetermined threshold value, and generates the stiffness parameter of the arm so that the position and the orientation of the touch panel display do not change in a case where the displacement of the force does not exceed the predetermined threshold value, based on the displacement of the force acquired from the touch force displacement calculating unit.

9. The arm control apparatus according to claim 1, further comprising:
a touch area calculating unit that acquires position information from the touch position information acquiring unit and calculates a touch area based on the acquired position information, wherein
the stiffness parameter information generating unit generates the stiffness parameter of the arm so that the position and the orientation of the touch panel display change in a case where the touch area exceeds a predetermined threshold value, and generates the stiffness parameter of the arm so that the position and the orientation of the touch panel display do not change in a case where the touch area does not exceed the predetermined threshold value, based on the touch area acquired from the touch area calculating unit.

10. The arm control apparatus according to claim 1, further comprising:
a touch deciding unit that decides that contact occurs in a case where the contact is detected based on the position acquired by the touch position information acquiring unit and the contact is detected based on the force acquired by the touch force information acquiring unit, and decides that no contact occurs in other cases, wherein the stiffness parameter information generating unit generates the stiffness parameter information for controlling the arm so that the position and the orientation of the touch panel display do not change only in a case where the touch deciding unit decides that the contact occurs.

11. A robot comprising:
the arm control apparatus according to claim 1 for controlling the arm; and
the arm.

12. A robot comprising:
the arm control apparatus according to claim 2 for controlling the arm; and
the arm.

13. A robot comprising:
the arm control apparatus according to claim 3 for controlling the arm; and
the arm.

14. A robot comprising:
the arm control apparatus according to claim 4 for controlling the arm; and
the arm.

15. A robot comprising:
the arm control apparatus according to claim 5 for controlling the arm; and
the arm.

16. An arm control method for controlling a position and an orientation of a touch panel display, the method comprising:
acquiring a position on a screen of the touch panel display touched by a person through a touch position information acquiring unit,
acquiring a force on the screen touched by the person through a touch force information acquiring unit;
calculating a torque to be applied to the touch panel display through a torque calculating unit based on the position acquired by the touch position information acquiring unit and the force acquired by the touch force information acquiring unit;
generating information about a stiffness parameter for controlling the arm through a stiffness parameter information generating unit so that the position and the orientation of the touch panel display do not change based on the torque calculated by the torque calculating unit; and
controlling the arm through an arm control unit based on the information about the stiffness parameter generated by the stiffness parameter information generating unit.

17. A computer-readable recording medium including an arm control program for controlling a position and an orientation of a touch panel display, the program allows
a computer to function as:
a touch position information acquiring unit that acquires a position on a screen of the touch panel display touched by a person;
a touch force information acquiring unit that acquires a force on the screen touched by the person;
a torque calculating unit that calculates a torque to be applied to the touch panel display based on the position acquired by the touch position information acquiring unit and the force acquired by the touch force information acquiring unit;
a stiffness parameter information generating unit that generates information about a stiffness parameter for controlling the arm so that the position and the orientation of the touch panel display do not change based on the torque calculated by the torque calculating unit; and
an arm control unit that controls the arm based on the information about the stiffness parameter generated by the stiffness parameter information generating unit.

18. An arm control integrated electronic circuit for controlling a position and an orientation of a touch panel display, the circuit configured to:
  acquires a position on a screen of the touch panel display touched by a person through a touch position information acquiring unit;
  acquires a force on the screen touched by the person through a touch force information acquiring unit;
  calculates a torque to be applied to the touch panel display through a torque calculating unit based on the position acquired by the touch position information acquiring unit and the force acquired by the touch force information acquiring unit;
  generates information about a stiffness parameter for controlling the arm through a stiffness parameter information generating unit so that the position and the orientation of the touch panel display do not change based on the torque calculated by the torque calculating unit; and
  controls the arm through an arm control unit based on the information about the stiffness parameter generated by the stiffness parameter information generating unit.

* * * * *